United States Patent
Miyabe et al.

(10) Patent No.: US 6,934,485 B2
(45) Date of Patent: Aug. 23, 2005

(54) PROCESS CARTRIDGE, ELECTROPHOTOGRAPHIC IMAGE FORMING APPARATUS AND FIXING METHOD OF ELECTRICAL CONTACT PART

(75) Inventors: Shigeo Miyabe, Numazu (JP); Hiroomi Matsuzaki, Mishima (JP); Akira Suzuki, Odawara (JP); Kazuo Chadani, Shizuoka-ken (JP); Daisuke Abe, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/128,333

(22) Filed: Apr. 24, 2002

(65) Prior Publication Data

US 2002/0191981 A1 Dec. 19, 2002

(30) Foreign Application Priority Data

Apr. 27, 2001 (JP) ........................................ 2001-131619

(51) Int. Cl.⁷ .......................... G03G 15/00; G03G 21/18
(52) U.S. Cl. .............................. 399/90; 399/13; 399/27; 399/106; 399/113
(58) Field of Search ........................... 399/90, 107, 110, 399/111, 113, 109, 13, 27, 103, 106; 29/592.1, 428

(56) References Cited

U.S. PATENT DOCUMENTS

| | | | |
|---|---|---|---|
| 5,331,373 A | 7/1994 | Nomura et al. | 399/111 |
| 5,452,056 A | 9/1995 | Nomura et al. | 399/111 |
| 5,463,446 A | 10/1995 | Watanabe et al. | 399/111 |
| 5,585,889 A | 12/1996 | Shishido et al. | 399/113 |
| 5,640,650 A | 6/1997 | Watanabe et al. | 399/117 |
| 5,839,028 A | 11/1998 | Nomura et al. | 399/109 |
| 5,873,012 A | 2/1999 | Miyabe et al. | 399/90 |
| 5,878,309 A | 3/1999 | Nomura et al. | 399/111 |
| 5,878,310 A | 3/1999 | Noda et al. | 399/117 |
| 5,926,666 A | 7/1999 | Miura et al. | 399/25 |
| 5,943,529 A | 8/1999 | Miyabe et al. | 399/111 |
| 5,946,531 A | 8/1999 | Miura et al. | 399/111 |
| 5,950,047 A | 9/1999 | Miyabe et al. | 399/111 |

(Continued)

FOREIGN PATENT DOCUMENTS

| | | | |
|---|---|---|---|
| JP | 2-163761 A | 6/1990 |
| JP | 7-92883 A | 4/1995 |
| JP | 9-43925 A | 2/1997 |
| JP | 10-3241 A | 1/1998 |
| JP | 10-20743 A | 1/1998 |
| JP | 11-73009 A | 3/1999 |
| JP | 11-231757 A | 8/1999 |
| JP | 2001-34146 A | 2/2001 |

*Primary Examiner*—Sophia S. Chen
(74) *Attorney, Agent, or Firm*—Fitzpatrick, Cella, Harper & Scinto

(57) ABSTRACT

A process cartridge detachably mountable to a main assembly of an electrophotographic image forming apparatus, includes an electrophotographc photosensitive drum; a developlng member for developing an electrostatic latent image formed on the electrophotographic photosensitive drum with a developer; charging member for electrically charging the drum; a drum frame supporting the charging member and the drum; a developer accomodation frame having a developer accomodating portion for accomodating the developer; a supporting frame supporting the drum frame and the developer accomodation frame adjacent one logitudinal end of the drum; a developing bias contact, provided on the supporting frame, for receiving a developing bias voltage applied to the developing member from the main assembly of the apparatus when the process cartridge is mounted to the main assembly of the apparatus; and a charging bias contact, provided on the supporting frame, for receiving a charging bias applied to the charging member from the main assembly when the process cartridge is mounted to the main assembly.

34 Claims, 34 Drawing Sheets

U.S. PATENT DOCUMENTS

| | | | |
|---|---|---|---|
| 5,966,567 A | 10/1999 | Matsuzaki et al. | 399/111 |
| 6,011,941 A | 1/2000 | Takashima et al. | 399/111 |
| 6,029,031 A | 2/2000 | Yokomori et al. | 399/109 |
| 6,064,843 A | 5/2000 | Isobe et al. | 399/111 |
| 6,072,968 A | 6/2000 | Nomura et al. | 399/113 |
| 6,097,096 A | 8/2000 | Gardner et al. | 257/777 |
| 6,128,452 A | 10/2000 | Miyabe et al. | 399/90 |
| 6,144,815 A | 11/2000 | Chadani et al. | 399/27 |
| 6,154,623 A | 11/2000 | Suzuki et al. | 399/111 |
| 6,167,219 A | 12/2000 | Miyamoto et al. | 399/90 |
| 6,173,140 B1 | 1/2001 | Suzuki et al. | 399/113 |
| 6,173,145 B1 | 1/2001 | Chadani et al. | 399/265 |
| 6,178,302 B1 | 1/2001 | Nagashima et al. | 399/106 |
| 6,226,476 B1 | 1/2001 | Nagashima et al. | 399/111 |
| 6,201,935 B1 * | 3/2001 | Terada et al. | 399/13 |
| 6,205,305 B1 | 3/2001 | Suzuki et al. | 399/106 |
| 6,215,969 B1 | 4/2001 | Nomura et al. | 399/111 |
| 6,219,504 B1 | 4/2001 | Matsuzaki et al. | 399/92 |
| 6,246,853 B1 | 6/2001 | Suzuki et al. | 399/262 |
| 6,256,467 B1 | 7/2001 | Yokomori et al. | 399/119 |
| 6,272,299 B1 | 8/2001 | Numagami et al. | 399/111 |
| 6,282,389 B1 | 8/2001 | Matsuzaki et al. | 399/111 |
| 6,282,390 B1 | 8/2001 | Miyabe et al. | 399/111 |
| 6,289,189 B1 * | 9/2001 | Numagami et al. | 399/111 |
| 6,301,457 B1 | 10/2001 | Chadani et al. | 399/167 |
| 6,317,572 B1 | 11/2001 | Miyabe et al. | 399/111 |
| 6,334,035 B1 | 12/2001 | Abe et al. | 399/106 |
| 6,336,017 B1 | 1/2002 | Miyamoto et al. | 399/116 |
| 6,351,620 B1 | 2/2002 | Miyabe et al. | 399/111 |
| 6,377,759 B1 | 4/2002 | Abe et al. | 399/27 |
| 6,415,121 B1 * | 7/2002 | Suzuki et al. | 399/111 |
| 6,512,895 B2 * | 1/2003 | Sakurai et al. | 399/13 |
| 6,519,431 B1 | 2/2003 | Toba et al. | 399/111 |

* cited by examiner

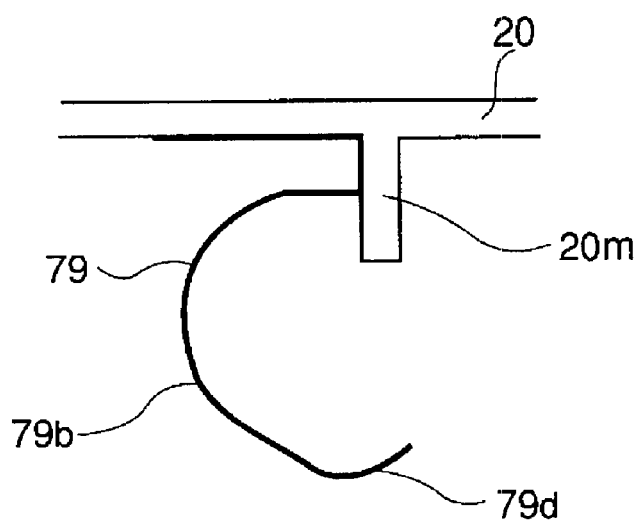
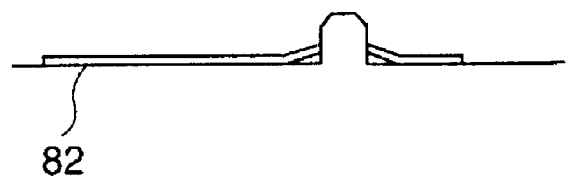
FIG. 19
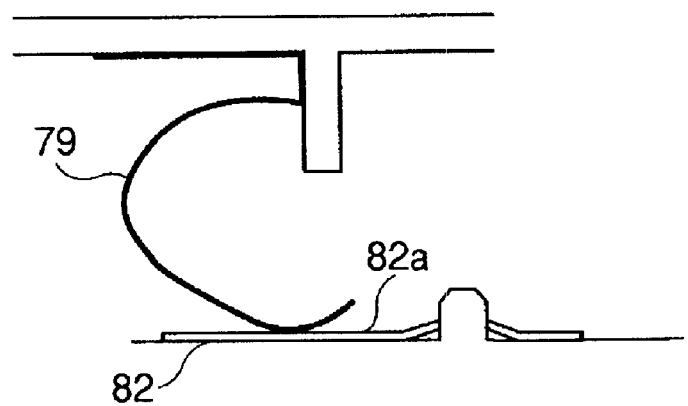
FIG. 20

PROCESS CARTRIDGE, ELECTROPHOTOGRAPHIC IMAGE FORMING APPARATUS AND FIXING METHOD OF ELECTRICAL CONTACT PART

BACKGROUND OF THE INVENTION

Field of the Invention

The present invention relates to a copying machine, a process cartridge, electrophotographic image forming apparatus and a fixing method for an electrical contact part.

The electrophotographic image forming apparatus forms an image on a recording material through an electrophotographic image formation type process. The electrophotographic image forming apparatus may be an electrophotographic copying machine, an electrophotographic printer (an LED printer, a laser beam printer or the like), an electrophotographic printer type facsimile machine, an electrophotographic printer type word processor or the like.

The process cartridge is a cartridge which contains as a unit charging means, developing means and an electrophotographic photosensitive member and which is detachably mountable to a main assembly of an image forming apparatus.

When an image forming apparatus of an electrophotographic type is used for a long term, it is necessary to exchange the photosensitive drum, to replenish or exchange a developer, to adjust, clean or exchange the charging means, cleaning means and the like.

In such an image forming apparatus, the process cartridge type is used in which the electrophotographic photosensitive member and process means actable on the electrophotographic photosensitive member are contained as a unit in a cartridge which is detachably mountable to the main assembly of the image forming apparatus. With this process cartridge type, the maintenance operations of the apparatus do not require service persons, but may be carried out by the user. Therefore, the process cartridge type is widely used in the field of image forming apparatuses.

If the maintenance operation is required by the process means, the user can easily do the maintenance operations, so that high image quality can be provided and maintained inexpensively and easily.

To the process cartridge, electric energy has to be supplied to a developing device, a charging device and the like provided therein. Recently, means is provided to detect the remaining amount of the toner substantially in real time, or means is provided for automatic winding-up of the toner seal. These means also require electric energy supply.

On the other hand, with the demand for the large capacity of the developer in the process cartridge, a toner accommodating container and a developing device are supported separately to reduce the load on the developing sleeve by the toner. The electric energy supply to the charging device, developing device and the like has to be assured with such an arrangement.

SUMMARY OF THE INVENTION

Accordingly, it is a principal object of the present invention to provide a process cartridge, an electrophotographic image forming apparatus and a fixing method for an electrical contact part, in which when the process cartridge is mounted to the main assembly of the electrophotographic image forming apparatus, the electrical connections with the main assembly of the apparatus is assured. It is another object of the present invention to provide a process cartridge, an electrophotographic image forming apparatus and a fixing method for an electrical contact part, in which when the process cartridge is mounted to the main assembly of the electrophotographic image forming apparatus, the electrical connection between the process cartridge and the main assembly of apparatus is stable. It is a further object of the present invention to provide a process cartridge, an electrophotographic image forming apparatus and a fixing method for an electrical contact part, in which a mounting load resulting from an electrical contact which is required at the time when the process cartridge is mounted to or demounted from the main assembly of the electrophotographic image forming apparatus, is reduced. It is a further object of the present invention to provide a process cartridge, an electrophotographic image forming apparatus and a fixing method for an electrical contact part in which when the process cartridge is mounted to the main assembly of the electrophotographic image forming apparatus, the process cartridge can be stably mounted. It is a further object of the present invention to provide a fixing method for an electrical contact part with which an electrical contact can be mounted with certainty, a process cartridge, and an electrophotographic image forming apparatus to which the process cartridge is detachably mountable, using the fixing method.

It is a further object of the present invention to provide a process cartridge and an electrophotographic image forming apparatus to which said process cartridge is detachably mountable, in which an electrical contact part is fixed firmly using a frame connecting method. According to an aspect of the present invention, there is provided a process cartridge and an electrophotographic image forming apparatus wherein said process cartridge comprises an electrophotographic photosensitive drum; a developing member for developing an electrostatic latent image formed on said electrophotographic photosensitive drum with a developer; charging member for electrically charging said electrophotographic photosensitive drum; a drum frame supporting said charging member and said electrophotographic photosensitive drum; a developer accommodation frame having a developer accommodating portion for accommodating the developer; a supporting frame supporting said drum frame and said developer accommodation frame adjacent one longitudinal end of said electrophotographic photosensitive drum; a developing bias contact, provided on said supporting frame, for receiving a developing bias voltage applied to said developing member from the main assembly of the apparatus when said process cartridge is mounted to the main assembly of the apparatus; and a charging bias contact, provided on said supporting frame, for receiving a charging bias applied to said charging member from the main assembly of the apparatus when said process cartridge is mounted to the main assembly of the apparatus.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 19 illustrates contact of an electrode of the side cover and an electrode of the frame (toner seal detection contact).

FIG. 20 illustrates contact of an electrode of the side cover and an electrode of the frame (toner seal detection contact).

DESCRIPTION OF THE PREFERRED EMBODIMENTS (Embodiment 1)

Referring to FIGS. 1–31, Embodiment 1 of the present invention will be described.

(The Process Cartridge and the Main Assembly of the Apparatus)

Figure 1:
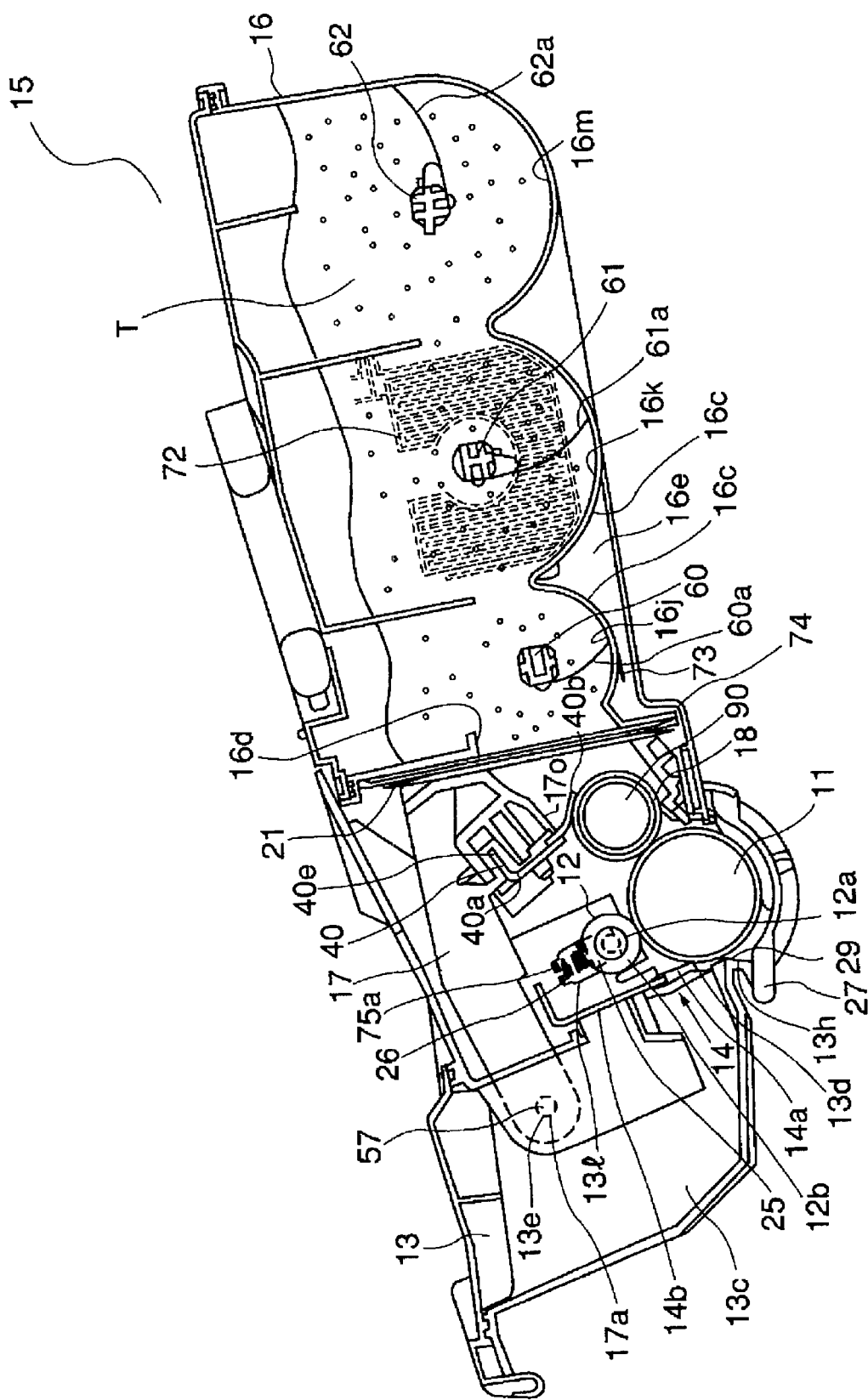
FIG. 1 is a schematic main sectional view of a process cartridge according to an embodiment of the present invention.
Figure 2:
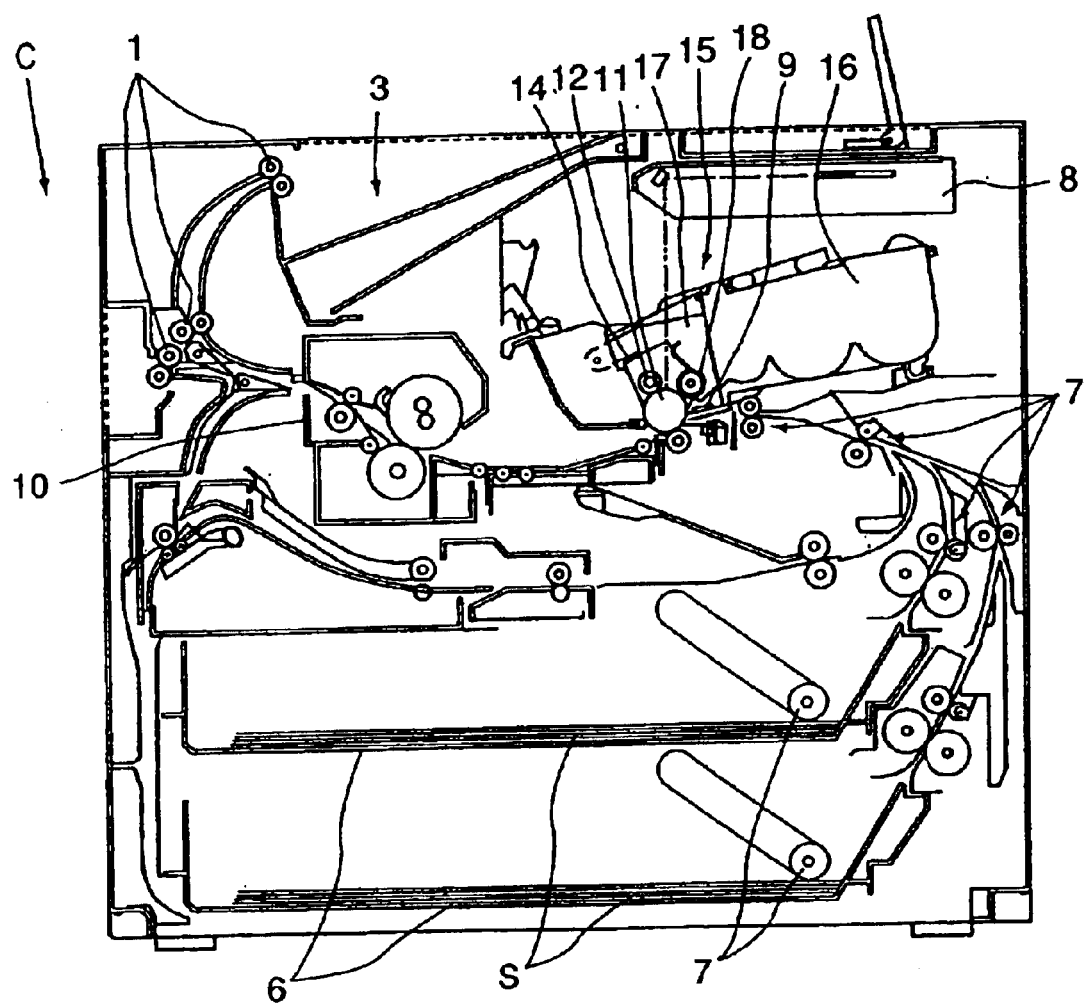
FIG. 2 is a schematic main sectional view of a main assembly of an apparatus according to an embodiment of the present invention.

FIG. 1 is a main sectional view of a process cartridge according to an embodiment of the present invention, and FIG. 2 is a main sectional view of an image forming apparatus according to the embodiment of the present invention. The process cartridge includes an electrophotographic photosensitive drum (image bearing member) and process means actable on said electrophotographic photosensitive drum. The process means may be charging means for electrically charging a surface of the electrophotographic photosensitive drum, a developing device for forming a toner image on the electrophotographic photosensitive drum, or cleaning means for removing toner remaining on the surface of the electrophotographic photosensitive drum.

As shown in FIG. 1, the process cartridge 15 of this embodiment comprises a charging roller 12 which is the charging means, a developing sleeve 18 which is the developing device, a toner accommodation frame 16 accommodating the toner as a developer, and a cleaning blade 14 which is the cleaning means. They are disposed around the electrophotographic photosensitive drum 11. They are contained in a housing to form a process cartridge 15 as a unit which is detachably mountable to the main assembly C of the image forming apparatus.

As shown in FIG. 2, the process cartridge 15 functions for image formations when it is mounted to the main assembly C of the image forming apparatus. In the image forming operation, a sheet S which is a recording material is fed by a feeding roller 7 out of a sheet cassette 6 disposed at a lower position of the apparatus, and in synchronism with the sheet feeding, the photosensitive drum 11 is imagewisely exposed to light by an exposure device 8 to form a latent image. The toner accommodated in the toner accommodation frame 16 is applied on the surface of the developing sleeve 18 by a developing blade 40 into a thin layer. The latent image is developed by the toner in the thin layer by application of a developing bias to the developing sleeve 18. The toner image is transferred onto the sheet S by application of a bias voltage to the transfer roller 9. The sheet S now having the toner image transferred thereonto is fed to a fixing device 10 which fixes the image. The sheet S is then discharged to a discharging portion 3 disposed at the upper position of the apparatus by sheet discharging rollers 1.

(Frame Structure of Process Cartridge)

Figure 3:
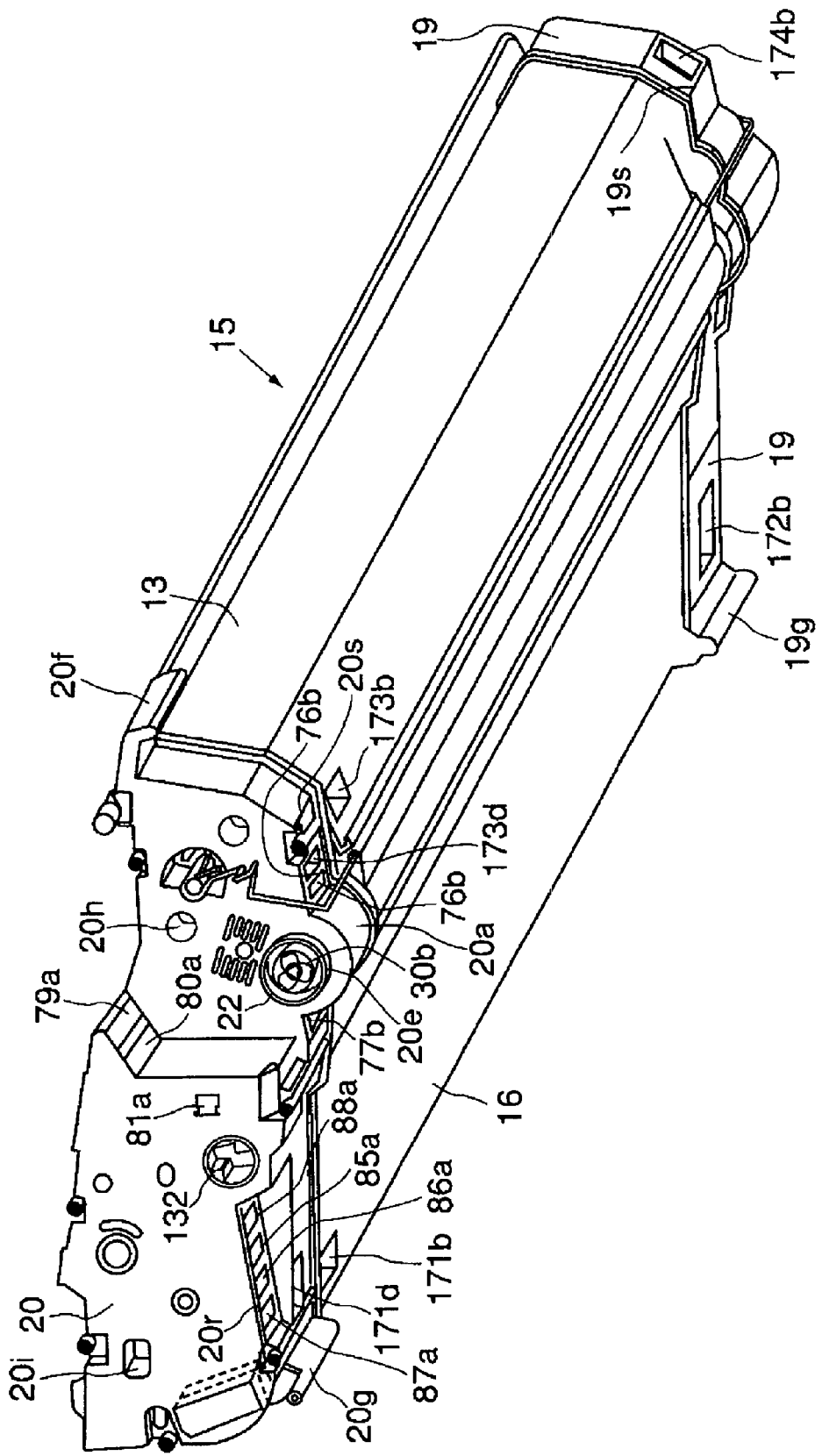
FIG. 3 is a perspective view of the process cartridge according to an embodiment of the present invention.
Figure 4:
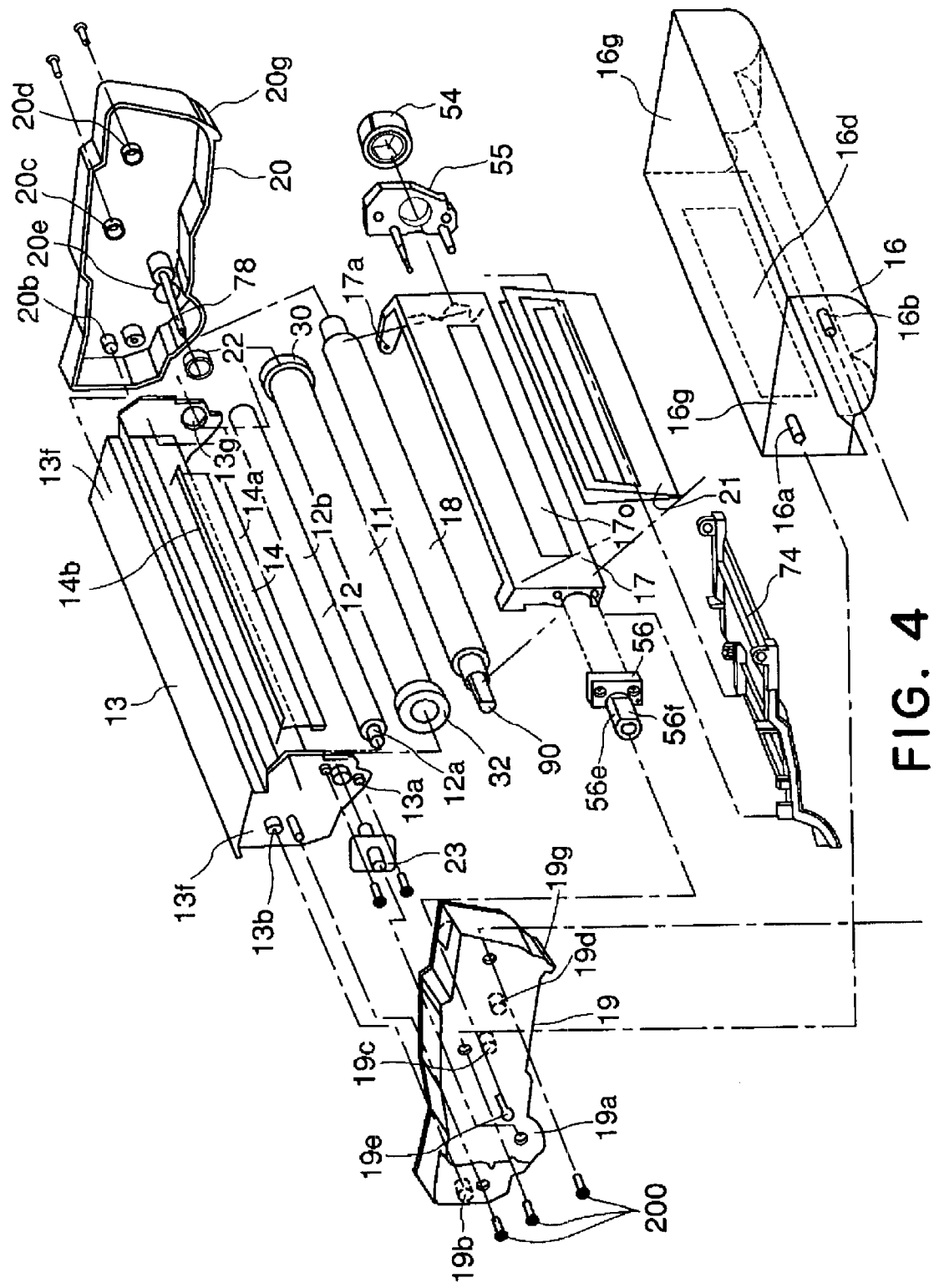
FIG. 4 is an exploded perspective view illustrating a structure of a frame of the process cartridge according to an embodiment of the present invention.

Referring to FIGS. 1, 3 and 4, the structure of the process cartridge will be described. FIG. 3 is a perspective view of the process cartridge, and FIG. 4 is an exploded perspective view of the process cartridge. In this specification, the rear side means the rear side as seen in the longitudinal direction of the photosensitive drum, and a side at which the driving force is transmitted from the main assembly of the apparatus is called the driving side, and the longitudinally opposite side is called the front side or non-driving side.

Referring to FIGS. 1 and 4, the process cartridge 15 comprises three frames, namely, a drum frame 13 integrally supporting a photosensitive drum 11 rotatably supported by a drum frame 13 through drum shaft reception members 22, 23, a charging roller 12, a cleaning blade 14 and a removed toner accommodating portion 13c; a developing device frame 17 integrally supporting a developing sleeve 18 and a developing blade 40 (unshown in FIG. 4); and a drum frame 13 toner accommodation (developer accommodation frame) frame 16 having a developer accommodating portion accommodating toner. The process cartridge further comprises side covers 19, 20 provided at opposite sides to support as a unit the three frames. The side covers 19, 20 function to support the drum frame 13 and the toner accommodation frame 16. The detailed structures of the frames (unit) will be described hereinafter.

The non-driving side cover 19 is large enough to cover the main section of the process cartridge 15 and is disposed at one longitudinal end portion of the process cartridge to integrate the drum frame 13 and toner accommodation frame 16 with each other. A hole portion 19a of the side cover 19 is positioned coaxially with the axis of the photosensitive drum provided in the drum frame 13. The side cover 19 is correctly positioned through the drum shaft reception member 23. Additionally, a positioning portion 19b in the form of a dowel disposed at a position which is remote as much as possible from the photosensitive drum 11, is engaged with a positioning portion 13b in the form of a hole formed in a side surface of the drum frame 13 to position in the rotational direction about a hole portion 19a of the side cover 19. The side cover 19 is fixed to the drum frame 13 by small screws 200. The toner accommodation frame 16 is provided at one end surface with positioning portions 16a, 16b which cooperate with positioning portions 19c, 19d in the side cover 16. The toner accommodation frame 16 is fixed by small screws 200. The driving side cover 20 has the same functions to correctly position the drum frame 13 and the toner accommodation frame 16 in the similar manner.

The bearing members 22, 23 also functions to position the process cartridge 15 relative to the main assembly C of the image forming apparatus.

The bearing members 22, 23 are engaged with the holes 13g and, 13a of the drum frame 13, respectively, and are also engaged with the holes 20e, 19a of the side covers 20, 19 (frames), by which they are supported by the drum frame 13 and the frame, respectively.

The drum shutter 27 (unshown in FIG. 4) functions to protect the exposed portion of the photosensitive drum 11 which is to be opposed to the transfer roller 9 from being touched by a hand of the user or from being exposed to light by which the photosensitive drum 11 may be electrically charged. The drum shutter 27 is retracted to permit the photosensitive drum 11 to be exposed by loading the process cartridge 15 to a predetermined position in the main assembly C of the image forming apparatus through an unshown opening and closing mechanism.

The covering member 74 covers the bottom portion of the developing device frame 17 and the bottom portion of the toner accommodation frame 16. The covering member 74 functions to prevent the user from directly touching the sealing member 21 or a second toner amount detecting member 73 (unshown in FIG. 4). The covering member 74 is supported on the toner accommodation frame 16 and the drum frame 13 so as not to be contacted to the developing device frame 17.

Referring to FIGS. 1, 4, the positioning of the developing device frame 17 will be described briefly (it will be described in detail hereinafter). The developing device frame 17 is swingable about a hook-shaped hole 17a formed at a driving side of the developing sleeve 18 such that the center of the developer carrying member is biased toward the center of the image bearing member. In other words, the developing device frame 17 including the developing sleeve 18 is swingable about the hook-shaped hole 17a at the driving side of the cleaning frame, and the drum frame 13 and the toner accommodation frame 16 are fixed to prevent relative movement therebetween as described hereinbefore, and therefore, the developing device frame 17 is movable relative to the toner accommodation frame 16.

The non-driving side of the developing device frame 17 is provided with a projection 56e extended coaxially with the developing sleeve 18, and the projection 56e is pressed toward the center of the electrophotographic photosensitive drum.

The projection 56e is inserted into the groove 19e formed in the side cover 19 at the non-driving side (a linear elongated hole toward the center of the image bearing member in this embodiment) so as to be movable toward the center of the image bearing member. In the groove 19e, developing device pressing spring (unshown) is provided to urge the projection 56e to press the developing sleeve 18 against the photosensitive drum 11.

The groove 19e has a positioning function, too for regulating the moving direction of the developing sleeve 18.

When a driving force is applied, gears 30c, 54 (FIGS. 5, 7) of the photosensitive drum 11 and the developing sleeve 18 are urged toward each other about the hook-shaped hole 17a, so that photosensitive drum 11 and the developing sleeve 18 are not urged away from each other. In addition, the developing sleeve 18 is normally urged toward the photosensitive drum 11 also by the unshown developing device pressing spring disposed in the groove 19e described above.

Since the developing device frame 17 and the toner accommodation frame 16 are movable relative to each other, they are connected with each other by a sealing member 21 capable of accommodating the relative movement within the movement range to prevent the toner leakage. The sealing member 21 desirably has a configuration resulting in a small repelling force in a direction of retarding the movement of the developing device, more particularly, a configuration having at least one folded portion or a bellow shaped portion is desirable.

In this embodiment, the sealing member 21 is in the form of a bag provided by folding back a soft film having a thickness of 100 μm. The use may be made with an elastomer having two folded portions (unshown) to reduce the repelling force, or another flexible material such as an urethane foam, low hardness rubber silicon or the like may be used in place of the elastomer. In such a case, the bellow shape may be omitted.

With these structures, even if the amount of the toner increases, the load due to the toner is applied on the side cover 19, 20, and not on the developing sleeve 18. Thus, a stabilized image formation is accomplished without an additional load on the photosensitive drum 11.

Furthermore, the frames can be correctly positioned by the side covers 19, 20 only, since the frames are connected at the sides, and therefore, they can be connected with high accuracy.

(Structure of Cleaning Unit)

As shown in FIGS. 1, 4, the charging device is of a contact charging type, and is a charging roller 12 comprising a metal shaft 12a supported at the opposite ends thereof in parallelism with the photosensitive drum 11 and an electroconductive rubber 12b on the outer periphery thereof. The drum frame 13 is provided with a bearing guide 131. The opposite end portions of the metal shaft 12a are rotatably engaged in charging roller bearings 25 which are movably engaged with the bearing guide 131 faced in the radial direction of the photosensitive drum 11. The charging roller 12 is press-contacted to a surface of the photosensitive drum 11 along a generating line by a charging roller pressing spring 26 compressed between the charging roller bearing 25 and the end of the bearing guide 131, by which the charging roller 12 is rotated by the photosensitive drum 11. The charging roller 12 is supplied with a high voltage from a high voltage source (unshown) in the main assembly C of the apparatus through a pressing spring 26 at the driving side and the charging roller bearing 25. This will be described in detail hereinafter.

The cleaning blade 14 functions to remove the toner remaining on the photosensitive drum 11 after the toner image visualized by the developing device on the photosensitive drum 11 is transferred onto a recording material by a transfer roller 9, and the removed toner is accumulated in a removed toner accommodating portion 13c.

The cleaning blade 14 is extended in parallelism with the photosensitive drum 11, and is generally plate-like. It comprises a rubber blade 14a press-contacted to the photosensitive drum 11 counterdirectionally relative to the moving direction of the peripheral surface of the photosensitive drum 11 and a supporting metal plate 14b on which the rubber blade 14a is fixed by bonding, welding or the like. The length of the cleaning blade 14 is slightly larger than the electroconductive rubber 12b portion of the charging roller 12, and the supporting metal plate 14b has a L-shaped cross-section and is fixed on the drum frame 13 by unshown screws.

As shown in FIG. 1, the receptor sheet 29 is an elastic sheet and is disposed on a seat 13h of the drum frame 13 at an upstream side of the cleaning blade 14 with a drum side opening 13d of the drum frame 13 interposed therebetween with respect to the rotational direction of the photosensitive drum 11. It passes the toner remaining on the photosensitive drum 11 after the image transfer but prevents the residual toner after the transfer from passing between the receptor sheet 29 and the photosensitive drum 11, thus preventing the leakage of the toner from the inside of the drum frame 13, by being lightly press-contacted to the surface of the photosensitive drum 11.

(Structure of Photosensitive Drum Unit and Driving Structure Therefor)

Figure 5:
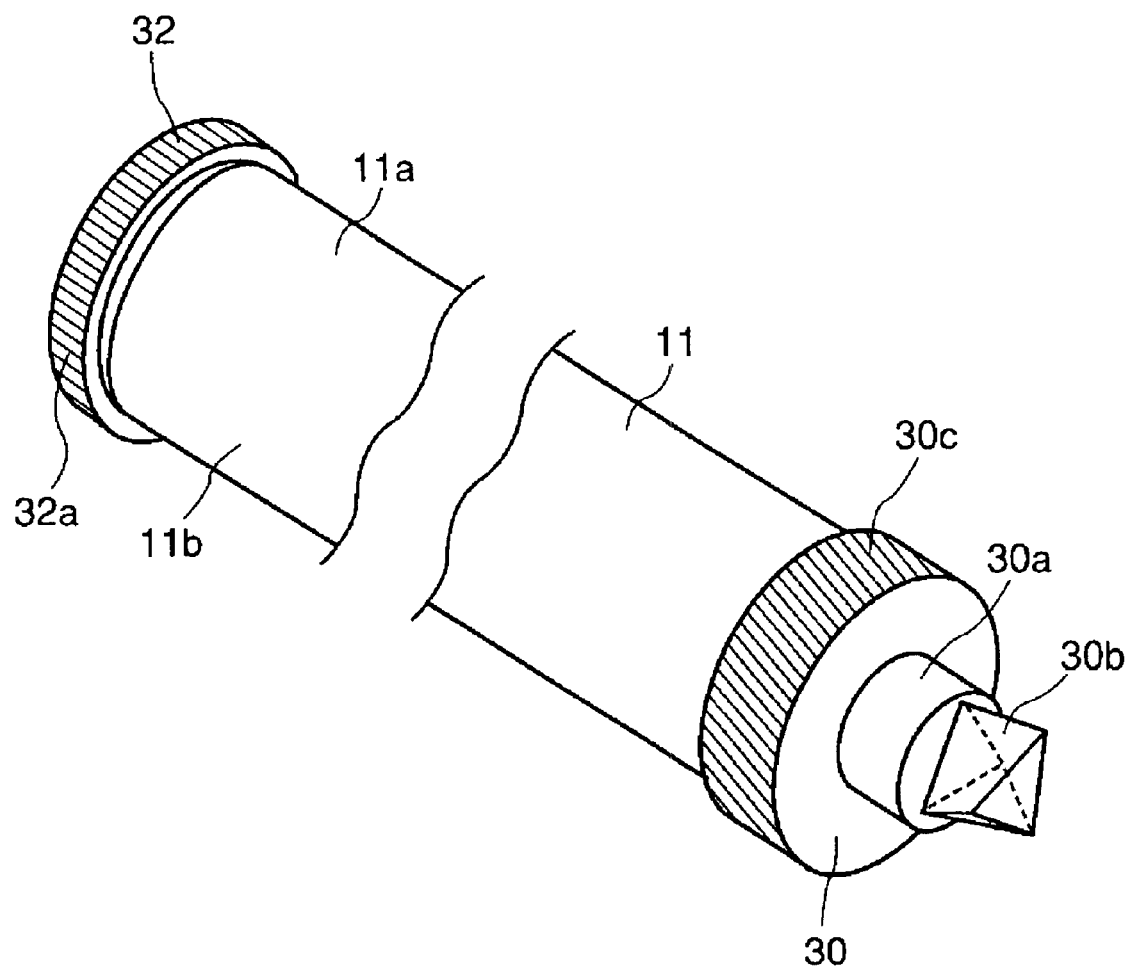
FIG. 5 is a partly broken perspective view of a photosensitive drum according to an embodiment of the present invention.
Figure 6:
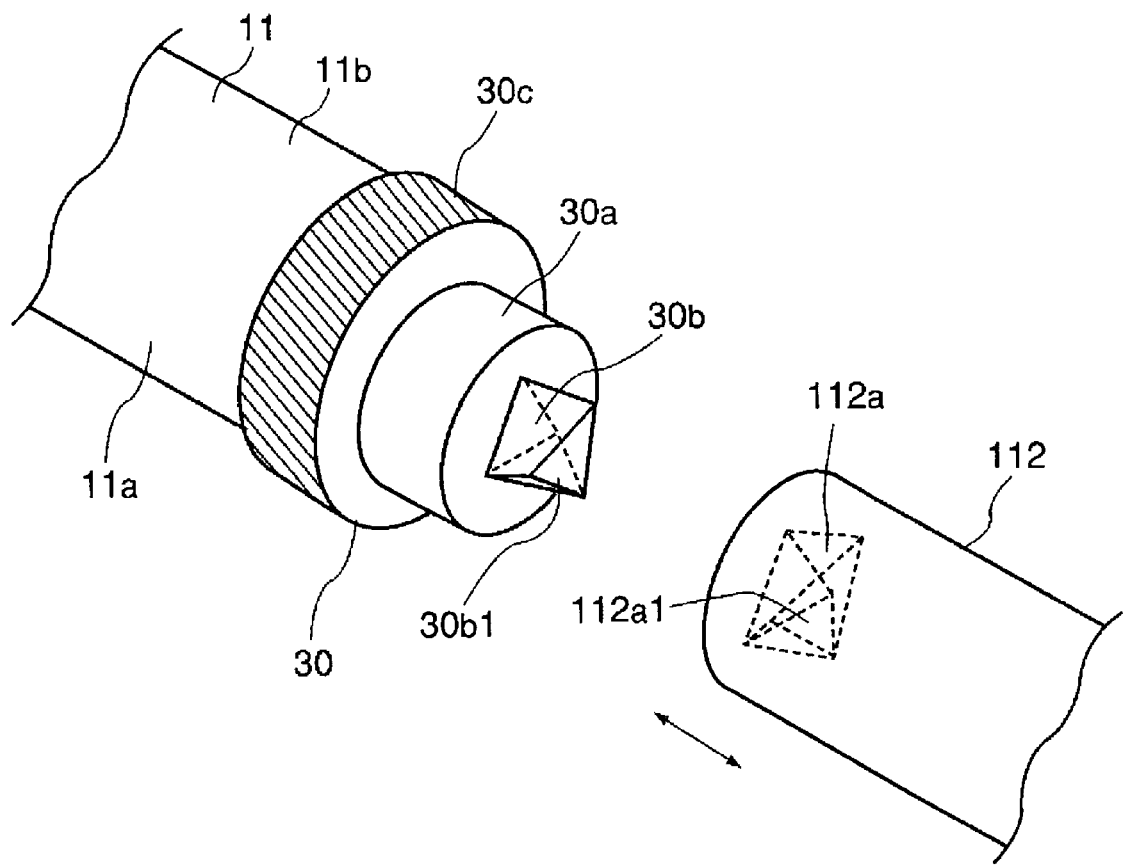
FIG. 6 is a perspective view illustrating driving of the photosensitive drum according to an embodiment of the present invention.

Referring to FIGS. 4, 5 and 6, the description will be made as to the structure of the coupling means which additionally includes a drive transmission mechanism for transmitting a driving force to the photosensitive drum 11 from the main assembly C of the image forming apparatus.

In this embodiment, the driving means for the photosensitive drum 11 is a drive transmitting means disclosed in Japanese Patent No.2875203. FIG. 5 is a partly broken perspective view of the photosensitive drum 11 to which a drum flange 30 is mounted, and FIG. 6 is an illustration of a relation between a male shaft 30a which is a coupling member as a part of the drum flange) and a drum driving female coupling shaft 112 provided in the main assembly C of the apparatus.

As shown in FIGS. 4, 5, 6, the male coupling shaft 30a (circular column configuration) is formed on the drum flange 30 fixing to one end portion of the photosensitive drum 11, and is in the form of a twisted projection 30b on a free end of the male shaft 30a. The end surface 30b1 of the projection 30b is parallel with the end surface which is perpendicular to the axis of the male shaft 30a. The male shaft 30a is engaged with the drum shaft reception member 22 and functions as a drum rotating shaft. In this embodiment, the drum flange 30, the male coupling shaft 30a and the projection 30b are integral with each other. The drum flange 30 is provided with an integral helical gear 30c to transmit a driving force to the developing sleeve 18 in the process cartridge. Therefore, as shown in FIG. 5, the drum flange 30 is a molded part provided by integrally molding the helical gear 30c, the male shaft 30a and the projection 30b, and is a driving force transmitting part having a function of transmitting the driving force.

The configuration of the projection 30b is a twisted polygonal prism, more particularly, is a substantially equilateral triangular prism twisted about an axis of the shaft. The recess 112a which is a twisted hole and which is engageable with the projection 30b is a hole having a polygonal cross-section and twisted about the axis. The recess 112a of the drum driving female coupling shaft 112 has a substantially equilateral triangular cross-section and is provided in an end surface of the round shaft. The drum driving female coupling shaft 112 is rotated integrally with a gear (unshown) provided in the main assembly C of the apparatus. With this structure of this embodiment, the process cartridge 15 is mounted to the main assembly C of the apparatus, and the projection 30b is brought into engagement with the recess 112a of the drum driving female coupling shaft 112 provided in the main assembly C of the apparatus. When the rotating force is transmitted to the projection 30b from the drum driving female coupling shaft 112, the apices of the projection 30b of the substantially equilateral triangular prism are uniformly contacted to the inner surface of the recess 112a of the drum driving female coupling shaft 112, so that they are centered with each other. Because of the twisted configurations thereof, a force is produced in such a direction that drum driving female coupling shaft 112 attracts the projection 30b, so that end surface 30b1 of the projection is abutted to the bottom surface 112a1 of the drum driving female coupling recess 112a. By this, the photosensitive drum 11 which is integral with the projection 30b is stably positioned both in the axial direction and radial direction.

Here, the male shaft 30a and the projection 30b are disposed on the drum flange 30 such that when the drum flange 30 is mounted to one end portion of the photosensitive drum 11, it is centered with the axis of photosensitive drum 11. The drum flange 30 is mounted to the drum cylinder 11a of the photosensitive drum 11 by clamping, bonding or the like. The circumference of the drum cylinder 11a is coated with a photosensitive material 11b.

To the other end of the photosensitive drum 11, the drum flange 32 is fixed. The drum flange 32 is integrally molded with a spur gear 32a.

The material of the drum flanges 30, 32 may be a resin material such as polyacetal, polycarbonate, polyamide, polybutylene terephthalate or the like. However, other materials are usable.

(Structure of Developing Unit)

Figure 7:
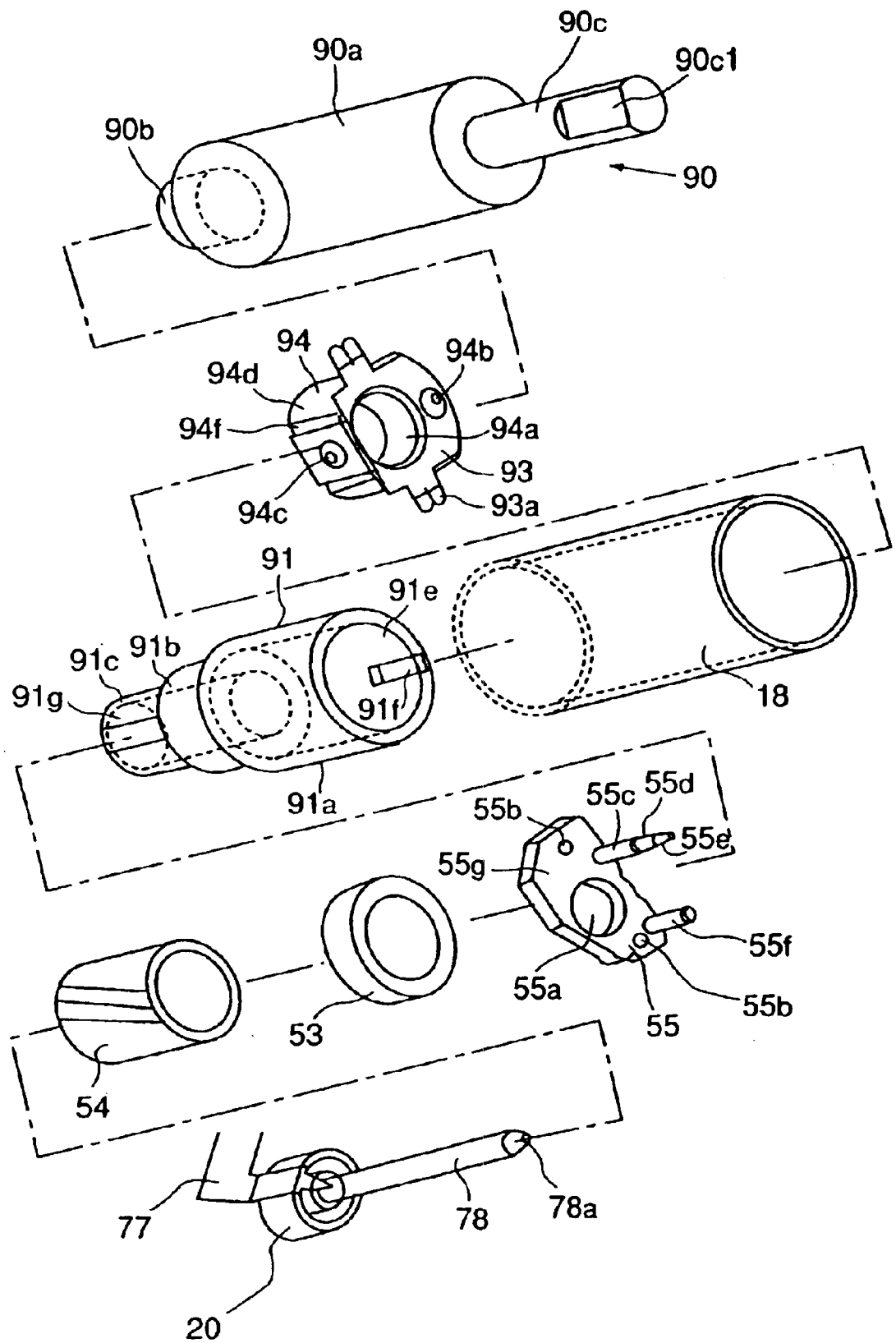
FIG. 7 is an exploded perspective view of a driving side of a developing sleeve.
Figure 8:
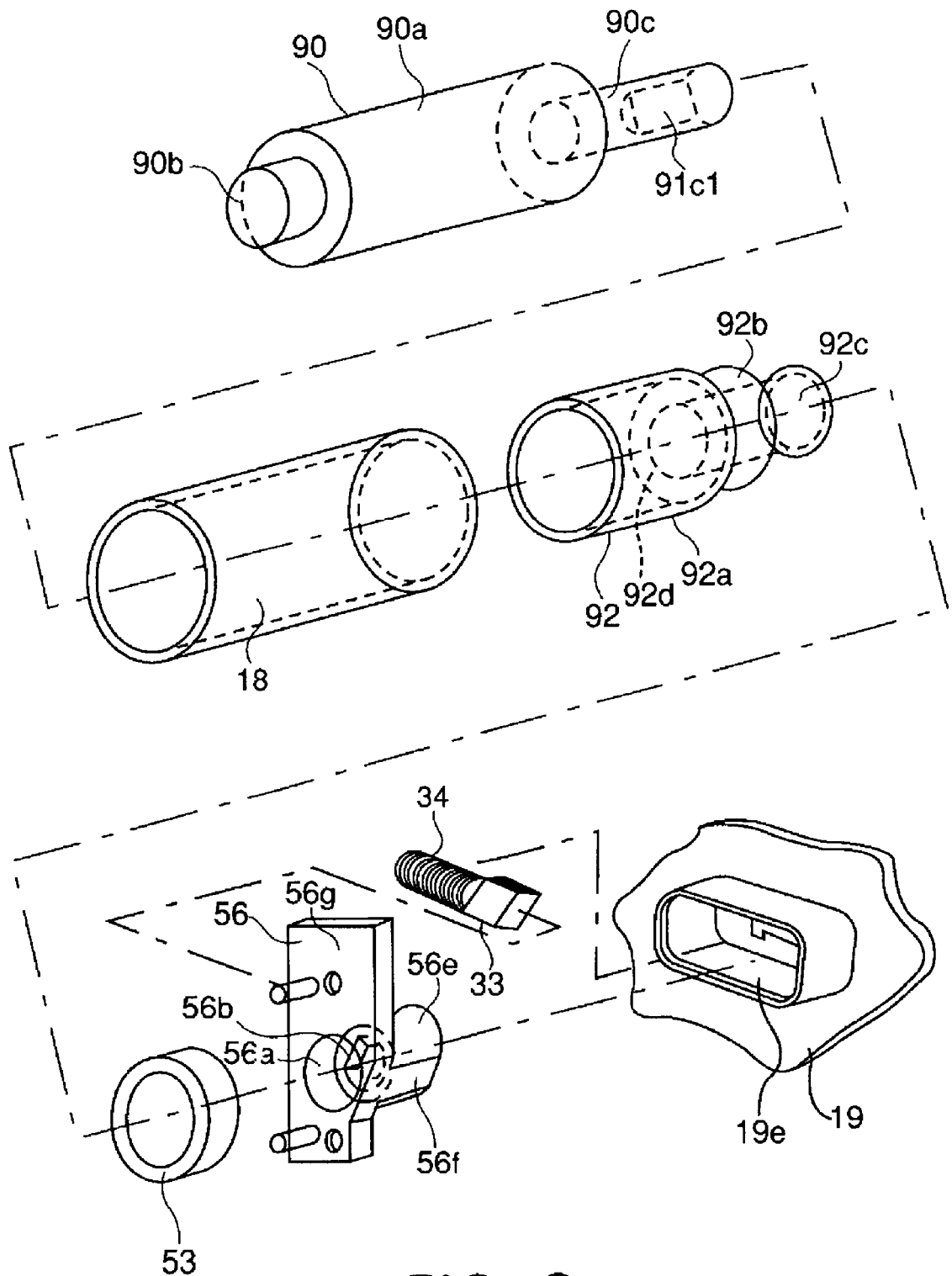
FIG. 8 is an exploded perspective view of a non-driving side of the developing sleeve.
Figure 9:
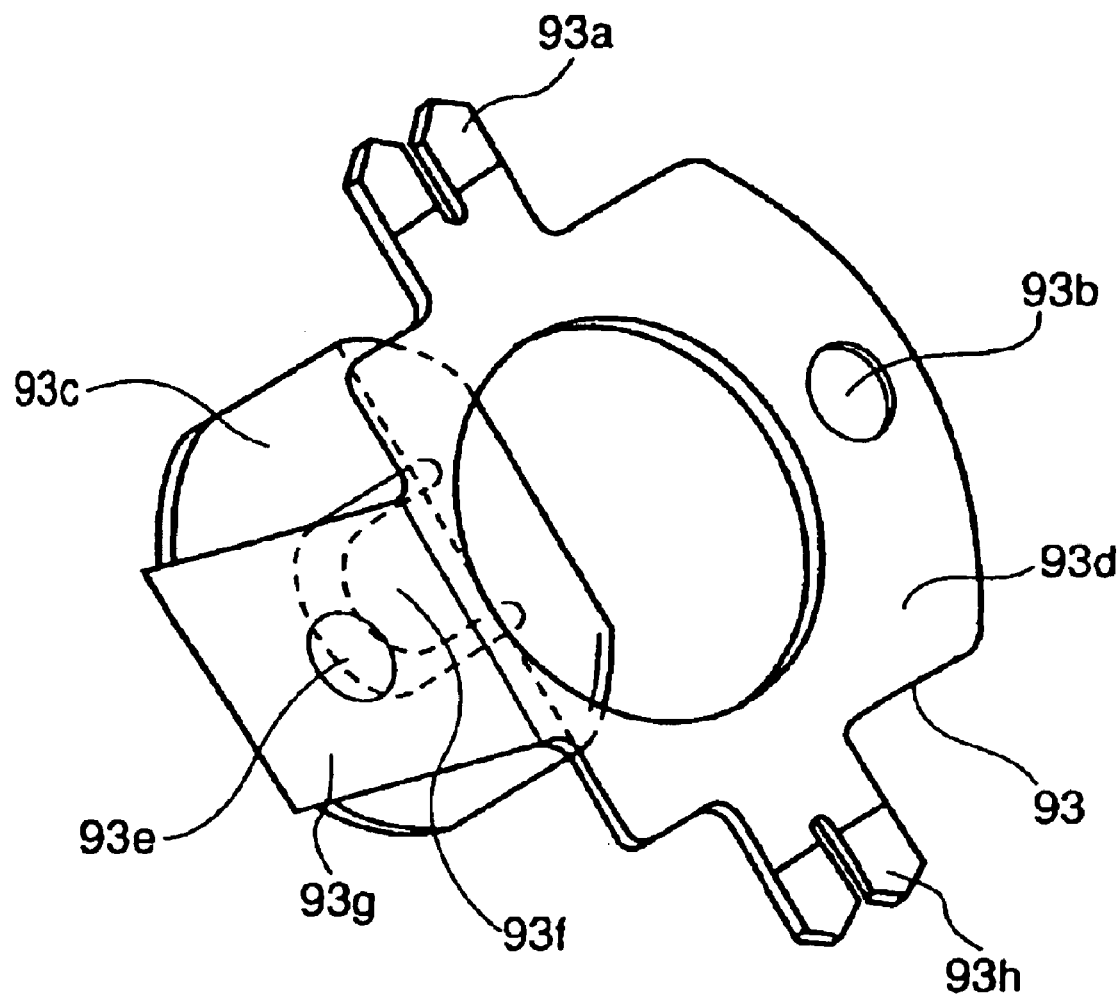
FIG. 9 is a perspective view of a sleeve contact plate.
Figure 10:
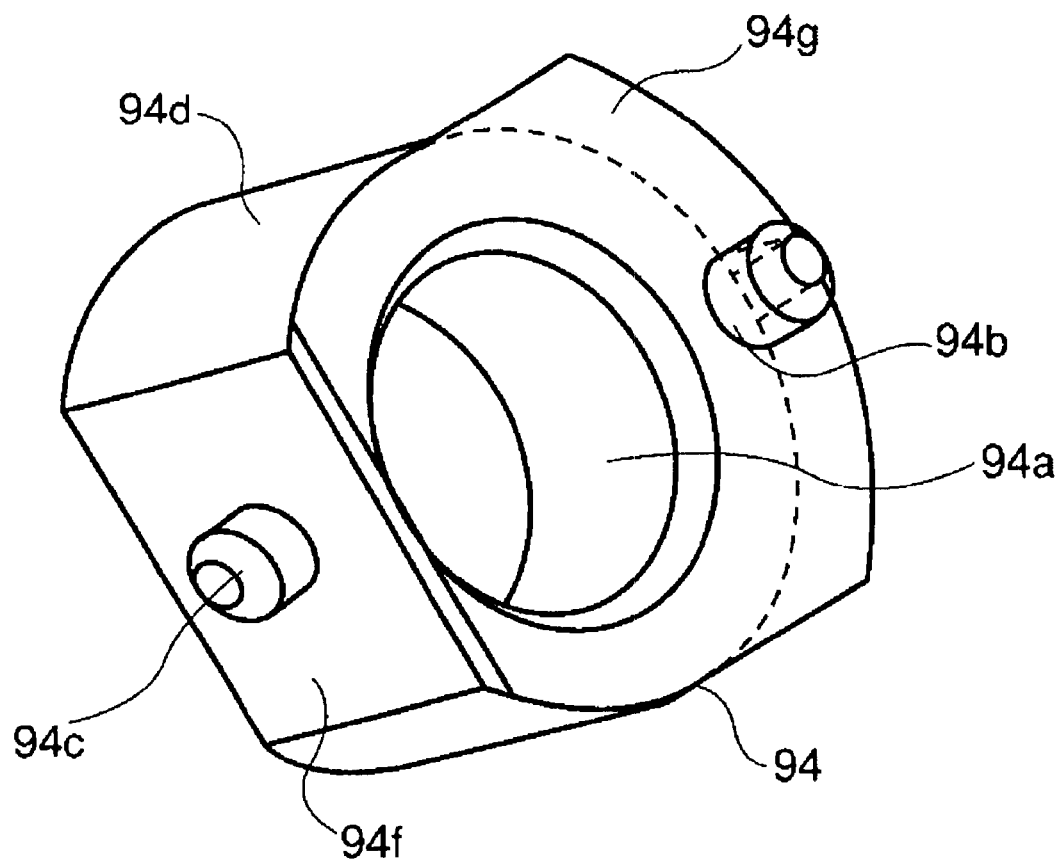
FIG. 10 is a perspective view of a magnet roller bearing.

Referring to FIGS. 1, 7, 8, 9, the developing device will be described in detail. FIG. 7 is an exploded perspective view of the driving side of the developing device. Although the driving side (rear side in the apparatus) only is shown, the structure is the same at the non-driving side unless otherwise described. FIG. 7 is an exploded perspective view of a driving side of the developing sleeve; FIG. 8 is an exploded perspective view of a non-driving side of the developing sleeve; FIG. 10 shows a magnet roller bearing; and FIG. 9 is a perspective view of the sleeve contact plate. The developing device frame 17 comprises the developing sleeve 18 and the developing blade 40 as the constituent-elements contributable to the image formation, as described hereinbefore.

In FIG. 1, developing blade 40 comprises a metal plate 40a having a thickness of approx. 1–2 mm and an urethane rubber 40b fixed thereto by hot melt, double-coated adhesive tape or the like. By the urethane rubber 40b contacting the developing sleeve 18 along a generating line, an amount of the toner applied on the peripheral surface of the developing sleeve 18 may be controlled. The developing blade 40 may be of a silicone rubber. A blade abutment flat surface (unshown) of a blade mounting portion provided at each of the opposite longitudinal ends of the developing device frame 17 has a hole (unshown) for a screw, and a positioning dowel (unshown) slightly near the center. The unshown engaging holes provided in the metal plate 40a are engaged with the dowels, respectively. Then, a small screw is threaded through a hole provided in the metal plate 40a into an unshown hole provided in the blade abutment flat surface, by which the metal plate 40a is fixed on the flat surface of the blade abutment. In this manner, the position of the end of the urethane rubber 40b is determined, so that contact pressure of the urethane rubber 40b to the developing sleeve 18 is determined. In addition, the contact range of the urethane rubber 40b to the developing sleeve 18 is determined, and the developing condition is determined. In the developing blade 40 structure, a one end of the metal plate 40a is bent at substantially 90° to provide a bent portion 40e (FIG. 1) to enhance the rigidity of the metal plate 40a to accomplish a contact between the urethane rubber 40b and the developing sleeve 18 which is uniform with respect to the longitudinal direction.

To the developing device frame 17, there is stuck an elastic sealing member (unshown) of MOLTOPREN or the like having a substantially channel cross-section along a length on an upper part of the periphery of the opening 17o at the developing sleeve 18 side and along a short side at a lower portion from the opposite longitudinal ends to prevent external leakage of the toner. The elastic seal is sandwiched between the developing device frame 17 and the developing blade 40 and is collapsed to establish the sealing to prevent leakage of the toner to the outside.

The developing sleeve 18 is a cylindrical member of metal material such as aluminum, stainless steel or the like. The outer diameter is approx. 16–20 mm, and the thickness is approx. 0.5–1 mm. The surface thereof is coated with a carbon coating, or blasted or subjected to another treatment to enhance the charging property for the developer. In this embodiment, the carbon coating only is used.

As shown in FIG. 7, a sleeve flange 91 is press-fitted at the press-fitting portion 91a, the sleeve flange 91 being a cylindrical member having a stepped portion and made of metal material such as aluminum, stainless steel or the like at one end portion (driving side) of the developing sleeve 18. There are a first cylindrical portion 91b having an outer diameter smaller than the press-fitted portion 91a and co-axial with the developing sleeve 18, and a second cylindrical portion 91c. The first cylindrical portion 91b is engaged by a ring-like distance regulating member 53 to regulate an opposing distance between the developing sleeve 18 and the photosensitive drum 11. The distance regulating member 53 is made of an insulative material such as a polyacetal resin material. The second cylindrical portion 91c is supported by a developing device bearing member 55 for rotatably supporting the developing sleeve 18 and positioning it relative to the developing device frame 17. A free end of the second cylindrical portion 91c is engaged with a developing sleeve gear 54 of a synthetic resin material which is provided with a double flat and which is engaged with the double flat of the second cylindrical portion 91c against relative rotation therebetween. The developing sleeve gear 54 receives a driving force from a gear portion (30c in FIG. 5, helical) of the drum flange provided at the end of the photosensitive drum 11. The helical direction is such that thrust produced thereby in the axial direction is directed toward the central portion of the developing sleeve 18. Co-axially with the press-fitting portion 91a, there is provided a fixing portion 91e for fixing a magnet roller bearing 94 which will be described hereinafter and a groove portion 91f for regulating the rotation of the magnet roller bearing 94.

The sleeve flange 92 (FIG. 8) at the other end side has substantially the same structure as the sleeve flange 91 as shown in FIG. 7, and is a cylindrical member having a stepped portion and made of metal material such as aluminum, stainless steel or the like, and is fixed by press-fitting to an end of the developing roller 18. A large diameter portion of the sleeve flange 92 is a press-fitting portion 92a for fixing to the developing sleeve 18. By the press-fitting of the sleeve flange 92 into the developing sleeve 18, the sleeve flange 92 is mounted to the developing sleeve 18 against relative rotation therebetween. Outside the press-fitting portion 92a of the sleeve flange 92, there is provided a first cylindrical portion 92b co-axial with the press-fitting portion 92a and having an outer diameter smaller than that of the press-fitting portion 92a. The first cylindrical portion 92b is engaged by a distance regulating member 53 for regulating an opposing distance between the developing sleeve 18 and the photosensitive drum 11. A developing device bearing member 56 supporting the developing sleeve 18 supports the second cylindrical portion 92c having an outer diameter smaller than that of the first cylindrical portion 92b, and the developing device bearing member 56 is fixed to the developing device frame 17. In addition, there is provided a through-hole 92d co-axial with the first cylindrical portion 92b. The through-hole 92d is penetrated by a magnet roller 90, and the magnet roller 90 is positioned relative to the developing device bearing member 56.

The magnet roller 90 includes a large diameter portion 90a and shaft supporting portions 90b, 90c at the end thereof, and the large diameter portion 90a is enclosed in the developing sleeve and is magnetized at its surface. Normally, one of four magnetic poles is disposed so as to oppose substantially the photosensitive drum 11, and the other magnetic poles are disposed at optimum positions. In order to stabilize the magnetic force on the developing sleeve, a distance between the surface of the large diameter portion 90a and the surface of the developing sleeve 18 is kept constant. In order to maintain the constant distance, the shaft supporting portion 90c is supported by the developing device bearing member 56. In addition, in order to stabilize the positions of the magnetic poles in the circumferential direction, a portion 90c1 cut into a shape of the letter D (D-cut portion) is provided. The shaft supporting portion 90b is supported by a magnet roller bearing which is enclosed in the sleeve flange 91, as will be described hereinafter.

The magnet roller bearing 94 is a D-cut shape molded member. The outer surface includes an outside circular circumference 94d, a dowel 94c for preventing rotation and a cut surface 94f to provide a D-cut cross-section. The outside circumference 94d is engaged with the fixing portion 91e of the sleeve flange 91, and the rotation preventing portion 94c is engaged with the groove portion 91f so as to be rotated integrally with the sleeve flange 91. The rotation preventing portion 94c is in the form of a dowel projected outwardly from the D-cut surface 94f in a perpendicular direction with respect to the developing sleeve bearing. The rotation preventing portion 94c and the D-cut surface 94f cooperate with each other to support and position the developing sleeve contact plate 93 which will be described hereinafter. A positioning hole 94a for positioning the magnet roller 90 is formed in the inner surface of the magnet roller bearing 94. The hole has a diameter of 5–10 mm, a depth of 3–8 mm, and the inner diameter precision is as high as 8–9 class precision, and the surface roughness is RaO.8 approx. to provide high precision of the positional accuracy of the magnet roller 90. The magnet roller 90 is fixed, and the magnet roller bearing 94 is rotatable integrally with the developing sleeve 18, so that it is slidable in the hole 94a. The material of the bearing is such that it exhibits a high slidability relative to the magnet roller 90. Examples of the material include PPS and so on. As shown in FIG. 10, the end surface is provided with a flange portion 94g for abutment to the end surface of the sleeve flange 91 to maintain the axial position relative to the developing sleeve 18, and is also provided with a dowel 94b for fixing a sleeve contact plate 93.

The sleeve contact plate 93 is generally channel shaped including a linear portion 93g and a bent segment portion extended substantially perpendicularly therefrom at the respective sides. It is made of a thin spring material plate (Cu alloy, Fe alloy such as SUS) having an electroconductive property and having a thickness of 0.1–0.3 mm. The sleeve contact plate 93 is fixed such that it covers both of the end surfaces and a part of the outer surface of the magnet roller bearing 94 by the opposing bent segment portions 93c, 93d and the linear portion 93g. The engaging hole 93b formed in one of the bent segment portions 93d of the sleeve contact plate 93 and an engaging hole 93e formed in the linear portion 93g, are engaged with the dowel 94b and the rotation preventing portion 94c of the magnet roller bearing 94, respectively. By the abutment of the linear portion 94g to the D-cut surface 94f, they are correctly positioned. One of the bent segment portions 93d is provided with a hole which is co-axial with the positioning hole 94a of the bearing 94 and which has a diameter larger than that of the positioning hole 94a when the sleeve contact plate 93 is mounted to the magnet roller bearing 94. The sleeve contact plate 93 is provided with arm portions 93a, 93h which are contacted to the inner surface of the developing sleeve 18 and which are electrically connected with the developing sleeve 18. The arm portions 93a, 93h are disposed diametrically opposite with respect to the center of the developing sleeve. By doing so, when the sleeve contact plate 93 is assembled to the device, the balance of the resistances is improved. The arm portions 93a, 93h are disposed such that magnet roller bearing 94 will not easily fall off the sleeve flange 91. An arm portion 93f is formed by cutting and erecting one of the bent segment portion 93c of the sleeve contact plate 93. Therefore, the arm portion 93f has a spring property. The arm portion 93f is elastically contacted to an electrode shaft. A portion from one of the bent segment portions 93d to the arm portion 93f is bent elastically. It may be Z-shaped such that when the electrode shaft is contacted, it is accommodated in a plane substantially perpendicular with respect to the sleeve axis.

The developing sleeve 18 is supplied with a high voltage from a high voltage source (unshown) of the main assembly C of the apparatus through the sleeve contact plate 93. This will be described in detail hereinafter.

The developing device bearing member 55 provided at the driving side is made of a resin material exhibiting a high slidability, and is in the form of a flat plate having a thickness of 2–5 mm. A cylindrical bearing portion 55a is formed substantially at the center of the flat surface portion 55g of the developing device bearing member 55. The bearing portion 55a has an inner diameter of 8–15 mm. The bearing portion 55a is engaged with the first cylindrical portion 91b of the sleeve flange 91, by which the developing sleeve 18 is rotated. In the flat surface portion 55g, dowels 55c, 55f are formed substantially parallel with the bearing portion 55a to determining the position relative to the developing device frame 17, and is positioned in the developing device frame 17. The dowels 55d, 55e provided coaxially with the dowel 55c and extended from the dowel 55c are used for positioning the magnetic seal (not shown). The flat surface portion 55g is provided with a hole 55b for a small screw for fixing with the developing device frame 17. The developing device bearing member 55 is fixed to the developing device frame 17 by engaging the dowel 55c of the developing device bearing member 55 with an engaging hole (unshown), engaging the dowel 55f with an engagement elongated hole (unshown), abutting the flat surface portion 55g of the developing device bearing member to an end surface which is perpendicular to the longitudinal direction at one end, with respect to the direction parallel to the developing sleeve 18 of the developing device frame 17, and threading the screw (unshown) provided on the end surface into the small screw hole 55b provided in the developing device bearing member 55. By doing so, the positions of the developing blade 40 fixed on the developing device frame 17 and the developing sleeve 18 are determined firmly, thus accomplishing a stabilized image formation.

The developing device bearing member 56 at the non-driving side comprises a flat plate-like portion 56g having a thickness of approx. 2–5 mm and a projection 56e. The projection 56e, as described hereinbefore, has an outer diameter of approx. 8–15 mm, and is engaged with a groove 19e of the side cover 19. The projection 56e forms a D-cut surface 56f. The D-cut surface 56f is substantially perpendicular to a line connecting the centers of the developing sleeve 18 and the photosensitive drum 11. It receives the pressure of the pressing spring 34 shown in FIG. 8 through the guiding member 33 to assure that developing sleeve 18 is pressed toward the photosensitive drum 11. By doing so, the developing sleeve 18 is pressed by the spring force of the D-cut pressing spring without loss, and therefore, the distance between the photosensitive drum 11 and the developing sleeve 18 is stabilized, thus stabilizing the image forming operation. The D-cut spring is a compression coil spring. The side opposite from the free end of the projection 56e projected from the flat plate-like portion 56g, is provided with a bearing portion 56a which is in the form of a cylinder. The bearing portion 56a is co-axial with the outer diameter of the projection 56e, and the inner diameter thereof is 8–15 mm. The bearing portion 56a is engaged with the second cylindrical portion 92c of the sleeve flange 92, and the developing sleeve 18 is rotated. At this time, the rotational position of the developing sleeve 18 relative to the photosensitive drum 11 is determined only by the developing device bearing member 56 and the side cover 19 with high precision. Thus, the parallelism relative to the photosensitive drum 11 is assured, so that problems arising from a crossing angle (the gap between the photosensitive drum 11 and the developing sleeve 18 is small at the longitudinally central portion) can be avoided. At a further rear portion of the bearing portion 56a of the developing device bearing member 56, a D-cut positioning hole 56b is formed co-axially with the projection 56e. The positioning hole 56b is engaged with the shaft supporting portion 90c of the magnet roller 90 and the D cut portion 90c1, by which the position of the magnet roller 90 is determined in the circumferential direction. The relative position of the magnet roller 90 and the developing sleeve 18 is determined by the parts of the developing device bearing member 1, and therefore, assuring accuracy is easy. As described hereinbefore, one of the four magnetic poles of the magnet roller is substantially opposed to the photosensitive drum. The position relative to the photosensitive drum 11 is determined by the developing device bearing member 56 and the side cover 19, assuring easy accuracy. The positioning and fixing of the developing device bearing member 56 relative to the developing device frame 17 is substantially the same as with the developing device bearing member 55, and therefore, the detailed description thereof is omitted for simplicity.

The bearing portion of the developing device bearing members 55, 56 described up to now, has a rotational sliding portion relative to the developing sleeve 18, and therefore, the material thereof may be the one exhibiting a high slidability property which is relatively expensive (PPS, or PA base bearing material, for example). By dividing this part into the bearing bush and the housing, the volume of the part of requiring an expensive material is decreased. The housing may be made of a relatively inexpensive material such as HIPS or the like.

(Supporting Structure for Developing Unit)

Figure 15:
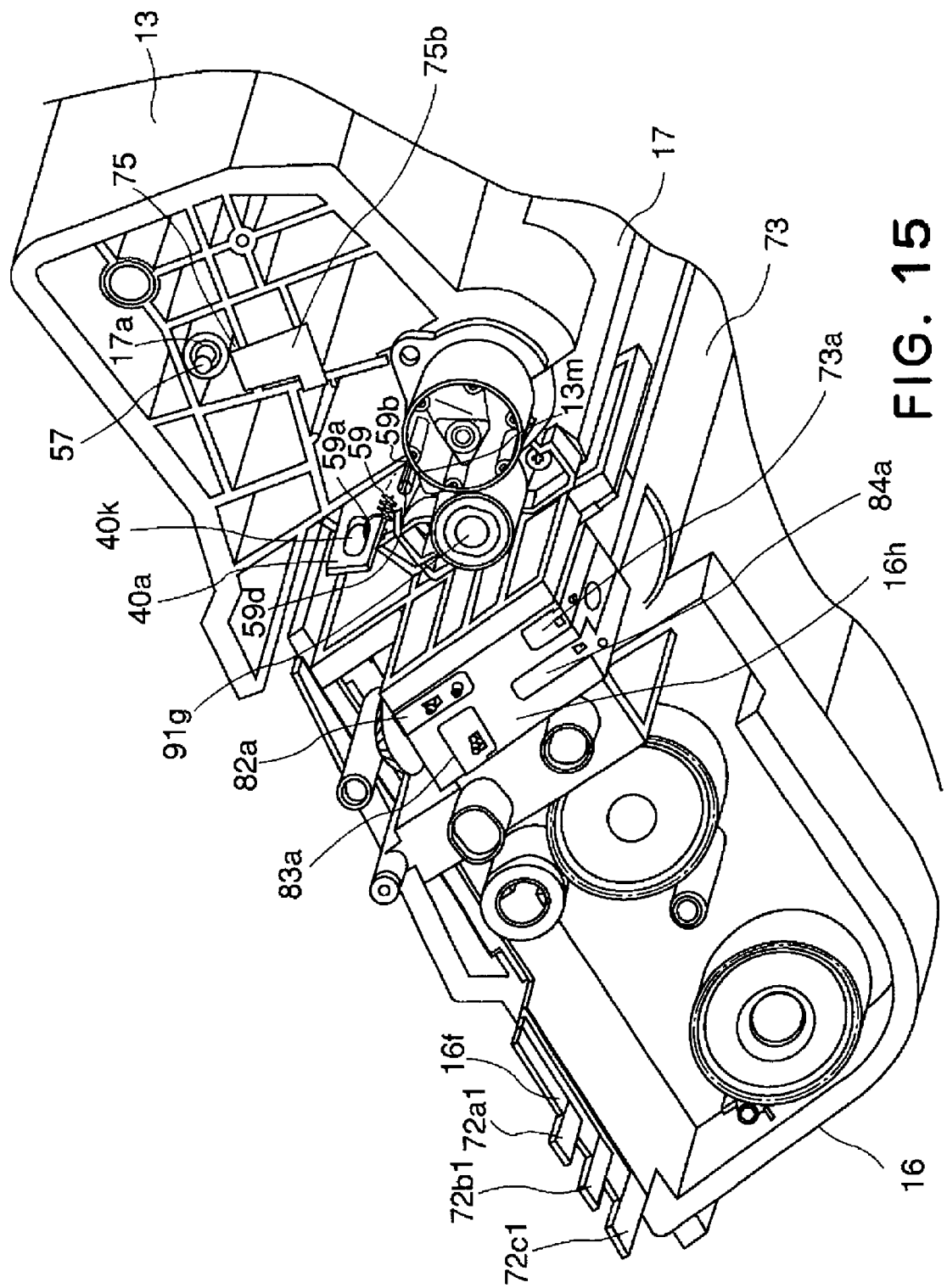
FIG. 15 is a perspective view of a process cartridge with a driving side cover omitted.

Referring to FIGS. 1, 7, 15, the supporting structure for the developing device will be described. FIG. 15 is a perspective view of a process cartridge with a driving side cover omitted. As described hereinbefore, in order to produce optimum images, it is desired that gap (the gap between the photosensitive drum 11 and the developing sleeve 18) between the developing sleeve 18 and the photosensitive drum 11 be optimized. In this embodiment, therefore, the developing sleeve 18 is pressed relative to the drum 11 with an optimum pressure (hereinafter called developing device pressure or pressing) to maintain the gap. The optimum developing device pressure is approx. 500 g and –2000 g at the driving side and the non-driving side, respectively. If the pressure is lower, the gap may be widened due to vibration or the like with the result of image defect such as white void. If the pressure is higher, the distance regulating member 53 may be collapsed by the pressing developing device, thereby reducing the gap. In addition, there is a possibility that the roller (the distance regulating member 53 which is in the form of a ring having a larger outer diameter than the developing sleeve 18 and which is provided at each end of the developing sleeve 18 as shown in FIGS. 7 and 8) is subjected to loads at the inner and outer surfaces with the result of scraping in a long term use. If this occurs, the proper gap may not be maintained. In this embodiment, the stabilized gap is maintained by the structures described below. The description will be made as to the support for the developing device (method for maintaining the gap) at the driving side and the non-driving side, respectively.

As shown in FIGS. 1, 15, at the driving side, the developing device frame 17 which is a developing device including the developing sleeve 18 and the developing blade 40 and so on, is provided with a hook-like hole 17a which is coaxial with the supporting hole 13e of the drum frame 13. A parallel pin 57 is penetrated through the hook-like hole 17a and the supporting hole 13e to provide a pivot of such a swing motion that the center of the developing sleeve is urged toward the center of the photosensitive drum.

The developing device pressing spring 59 functions to urge the developing sleeve 18 toward the photosensitive drum 11 to press the distance regulating member 53 to the photosensitive drum 11 and is a tension coil spring comprising a wire having a diameter of approx. 0.5–1 mm. At the opposite end portions, there are provided hook portions 59a, 59b to constitute mounting portions relative to the apparatus. The hook portion 59b includes a linear portion extending in a substantially perpendicular direction relative to the spring portion, and the free end portion of the linear portion is used for electrical connection which will be described hereinafter. The material thereof may be SUS (stainless-steel), music wire, phosphor bronze or the like which has a resilient property. One of the hook portions 59a of the developing device pressing spring 59 is hooked by the hole portion 40k (FIG. 15) formed in the metal plate 40a of the developing blade 40, and the other hook portions 59b is hooked on the shaft 13m provided in the drum frame 13. At this time, the linear portion 59d is directed outwardly from the drum frame 13. The hole portion 40k of the developing blade 40 is disposed outside the developing device frame 17, and is elongated with a width of approx. 2–5 mm and a length of 4–8 mm. The shaft 13m of the drum frame 13 is disposed adjacent the photosensitive drum 11, and the diameter thereof is approx. 2–5 mm, and is integrally molded with the drum frame 13. The position of the hole portion 40k and the position of the shaft 13m are determined such that a line connecting the hole portion 40k and the shaft 13m and a line connecting the hole portion 40k and the hole 17a (the pivot of the swing motion) are substantially perpendicular to each other. The developing device pressing spring 59 is hooked on the end of the developing blade 40 and is projected outwardly in the longitudinal direction of the developing device frame 17, and therefore, as for the developing device frame per se, it is not necessary to provide a mounting portion provided from the frame, such as a shaft. Therefore, it is easy to set a jig for mounting of the sealing member 21 (FIG. 4) to the developing device frame 17 described hereinbefore, and therefore, the assembling property is improved. By mounting it to the developing blade 40, which is backed up by metal having a high elastic modulus, deformation and the resulting loss of the pressure of the developing device to the photosensitive drum due to the weakened spring force is avoided. In the case that a mounting portion such as a dowel or the like is provided directly on the developing device frame 17, it is necessary to use a large size in order to avoid the loss of the pressure of the developing device due to the deformation. However, in this embodiment, there is no need of using such a dowel. This is effective to save space.

The developing device pressing at the non-driving side will be described. As shown in FIG. 4, at the non-driving side of the developing device frame 17, there is provided a projection 56e on the center axis of the developing sleeve 18. The projection 56e is positioned so as to press the developing sleeve 18 toward the photosensitive drum 11. The projection 56e is inserted into the groove 19e (a linear elongated hole substantially parallel with a direction toward the center of the image bearing member) provided in the side cover 19, and is movable toward the center of the image bearing member. In the groove 19e, a developing device pressing spring 34 is disposed so as to press against the D-cut surface 56f of the projection 56e. The developing device pressing spring 34 is a compression coil spring comprising a wire having a diameter of approx. 0.5–1 mm. The spring force provided by the compression spring is the force of urging the developing sleeve 18 toward the photosensitive drum 11 at the non-driving side. Therefore, the relative position between the photosensitive drum 11 and the developing sleeve 18 is determined only by the spring force, so that stabilized pressure is provided. The groove 19e functions also to regulated regulate the moving direction of the developing sleeve 18 to correctly position the developing sleeve 18.

As will be described hereinafter, detecting means is provided to detect the remaining amount of the developer in this embodiment. More particularly, an electrostatic capacity between an antenna member disposed adjacent the developing sleeve, is used to determine the remaining amount of the developer. In this case, the electric potential of the metal plate of the developing blade which is an electroconductive member is to be the same as the electric potential of the developing sleeve. The electric power supply for accomplishing this is effected through the developing device pressing spring 59.

(Structure of Developer Accommodation Frame)

Figure 13:
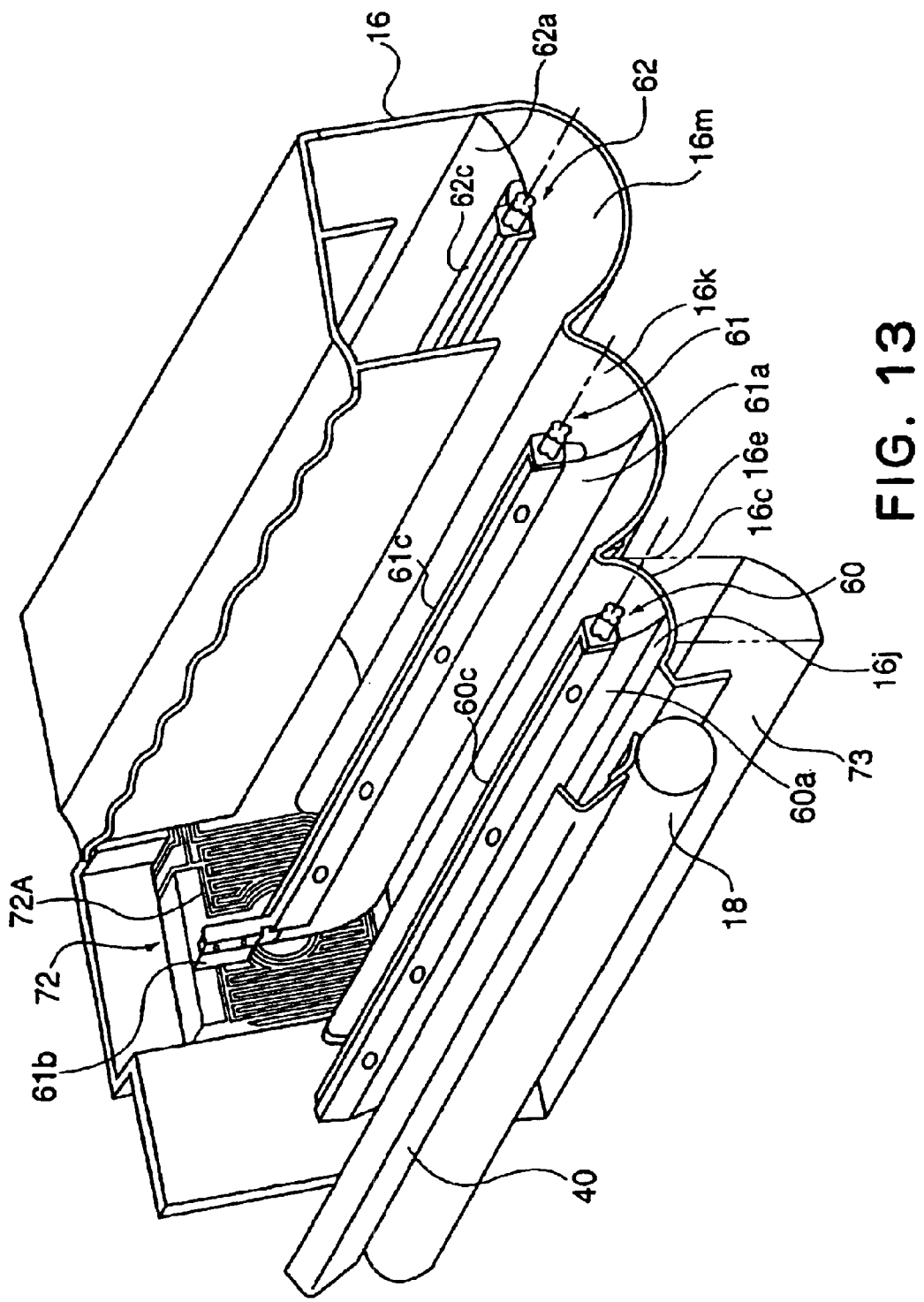
FIG. 13 is a perspective view of an inside of the toner accommodation frame (detection of an amount of toner).

Referring to FIGS. 1, 4, 13, the toner accommodation frame will be described.

The toner accommodation frame 16 has a large width to provide a large capacity, and the bottom side of the toner accommodation frame 16 has three recessed or concave portions. The toner accommodation frame 16 is provided with three stirring members 60, 61, 62 which are driven by an unshown motor provided in the main assembly C of the apparatus. The stirring members 60, 61, 62 correspond to the recesses 16j, 16k, 16m having arcuate cross-sections. The developer T is stirred and said fed to the developing device frame 17 by the stirring blade members 60a, 61a, 62a provided on respective stirring shafts 60c, 61c, 62c which are linearly juxtaposed. The stirring shafts 60c, 61c, 62c are rotatably supported on the toner accommodation frame 16 and are driven from outside of the toner accommodation frame 16. The recesses 16j, 16k, 16m are arcuate having centers at the axes of the stirring shafts 60c, 61c, 62c, respectively. By the wide arrangement in which the recesses 16j, 16k, 16m are juxtaposed, the influence of the weight of the developer (toner) T can be reduced, therefore, the fading, the deterioration of the developer, the increase of the stirring torque and so on can be suppressed.

The stirring blade member 60a–62a is made of polyethylene terephthalate, polyphenylenesulfide resin material or another resin material and functions to stir and feed the developer T. The rotation radius of the free ends of the stirring blade members 60a–62a are larger than the radii of the bottom surfaces of the recesses 16j, 16k, 16m of the toner accommodation frame 16 such that the free ends rub the inner bottom surface of the toner accommodation frame 16. By doing so, the developer T can be fed substantially without the developer T remaining on the inner bottom surface of the toner accommodation frame 16.

(Unsealing of Toner Seal and Stirring Driving)

Figure 11:
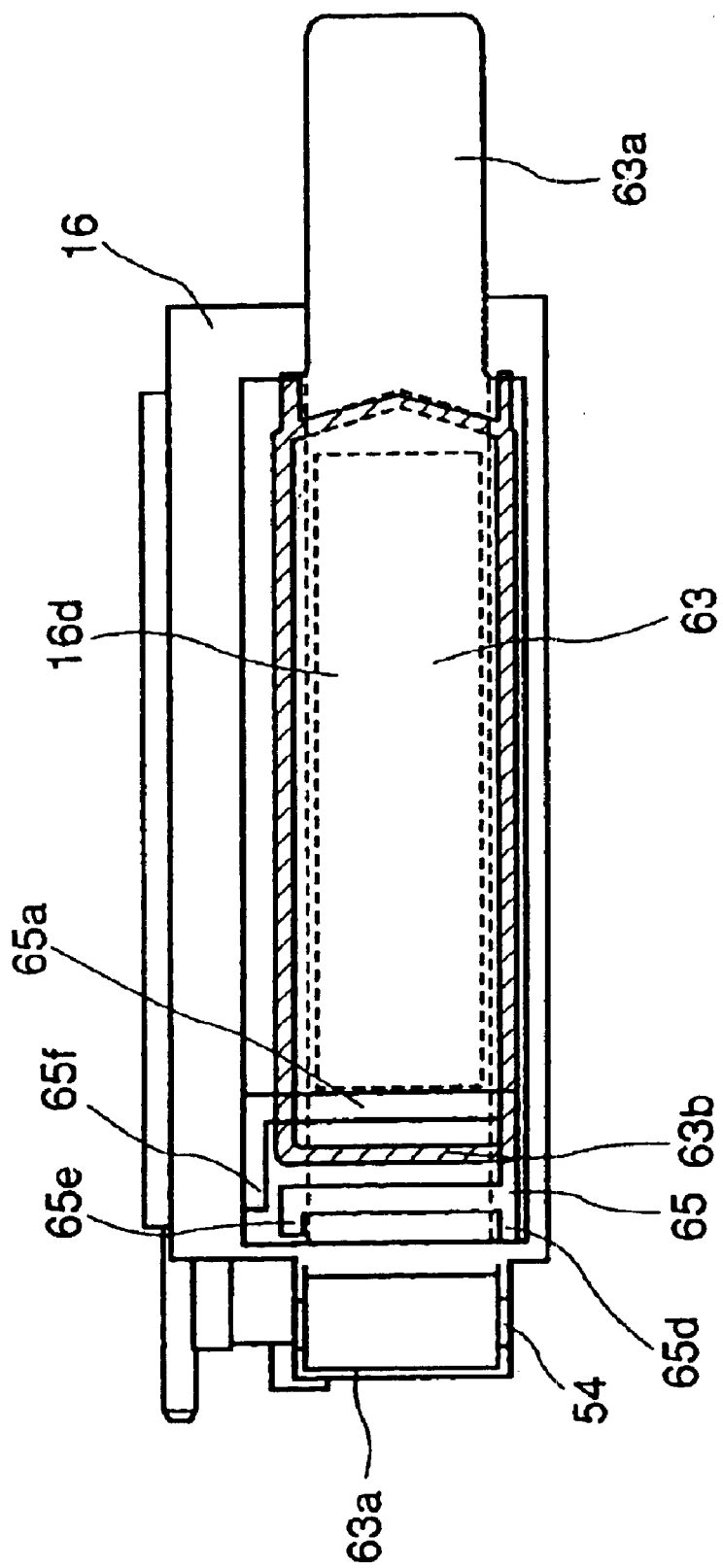
FIG. 11 is a top plan view of a toner seal side of a toner accommodation frame.
Figure 12:
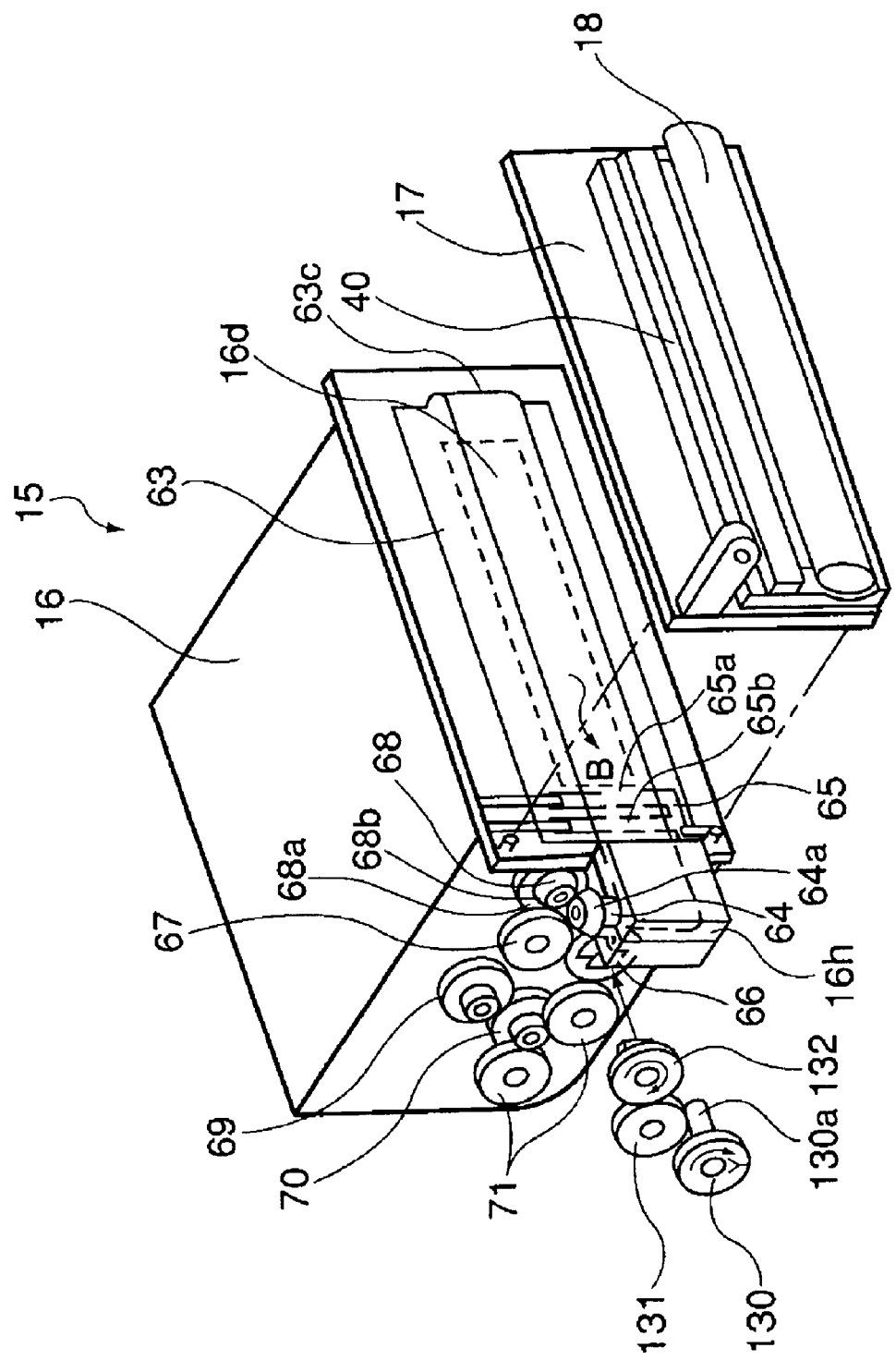
FIG. 12 is a perspective view of a toner seal winding-up mechanism provided in a developing device frame and a toner accommodation frame.

Referring to FIGS. 1, 11 and 12, the description will be made as to the unsealing of the toner seal and the driving of the stirring member. FIG. 11 is a top plan view of the toner accommodation frame 16 at the toner seal side, and FIG. 12 is a perspective view illustrating a toner seal winding-up mechanism for winding up the toner seal provided between the toner accommodation frame and the developing device frame. In this process cartridge, an automatic winding-up mechanism is employed for the toner seal. A new (unused) process cartridge 15 is provided with a toner seal member 63 sealing the opening 16d of the toner accommodation frame 16, and the toner seal member 63 is welded or bonded so as to cover and seal the opening 16d of the toner accommodation frame 16.

One end 63a of the toner seal member 63 shown in FIG. 11 is folded back at a fold-back portion 63c as shown in FIG. 12, and is fixed to a winding-up member 64 which is rotatably supported in the toner accommodation frame 16. The toner seal member 63 is provided with a toner seal detecting member 65 for permitting detection of when the opening 16d is fully open.

More particularly, on a trailing end (the end which is unsealed at the end) of the toner seal member 63, a detecting member 65 made of an aluminum foil with adhesive material is provided. The surface of the detecting member 65 is electroconductive. A voltage is applied to the conducting portion through a metal plate from the main assembly C of the image forming apparatus, and the output voltage is detected. A voltage output/input path relative to the main assembly C of the apparatus will be described.

The main assembly C of the apparatus is provided with a motor 130, a gear 130a of the motor 130, an idler gear 131 which is in meshing engagement with the gear 130a, and a coupling 132 having a gear which is in meshing engagement with the idler gear 131. A longitudinal end portion of the toner accommodating container 16 of the process cartridge 15 rotatably supports a coupling gear 66, a swing gear 67 which is in meshing engagement with the coupling gear 66, idler gears 68, 69 which are selectively engageable with the swing gear 67, a winding-up member 64 having gear portion 64a which is in meshing engagement with the idler gear 68, an idler gear 70 which is in meshing engagement with the idler gear 69, a stirring gear 71 which is in meshing engagement with the idler gear 70.

When a new process cartridge 15 is loaded into the main assembly C of the image forming apparatus, the first conducting portion 65a is in an electroconductive state before the toner seal member 63 is wound up. The state is detected by the main assembly C of the image forming apparatus. Then, the motor 130, shown in FIG. 12, provided in the main assembly C of the image forming apparatus is started to rotate in the direction indicated by an arrow Y. The driving force is transmitted through the idler gear 131 to the coupling 132, which in turn transmits the driving force to the coupling gear 66 provided in the process cartridge 15 and the swing gear 67 which is in meshing engagement with the coupling gear 66. Then, the swing gear 67 which is swung transmits the driving force to the spur gear 68a of the idler gear 68, so that the gear portion 64a of the winding-up member 64 which is engaged with the gear portion 68b of the idler gear 68, by which the toner seal member 63 is wound up in the direction indicated by the arrow B. Here, the spur gear 68a and the gear portion 68b of the idler gear 68 are integrally molded. The gear portions 68b and 64a constitute a pair of bevel gears.

After the opening 16d is completely open, the conducting portion 65a is cut or broken so that an insulative state is established. This event occurring as a result of the conducting portion 65a break is detected by the main assembly C of the image forming apparatus, in response to which the motor 130 transmitting the driving force to the coupling for driving the winding-up member 64, is rotated reversely (opposite rotational direction from the Y direction). When the coupling 132 of the main assembly of the image forming apparatus starts the reverse rotation, the coupling gear 66 of the process cartridge 15 also starts to rotate reversely. By the tooth load between the coupling gear 66 and the swing gear 67, the swing gear 67 is swung back to disengage from the spur gear 68a and engage with an idler gear 69. The swing gear 67 rotates the idler gear 69 and transmits the driving force to the stirring gear 71 for rotating the stirring members 60, 61, 62 in FIG. 1 in the toner accommodation frame through the idler gear 70. The swing gear 67 is supported on an end portion of an unshown arm mounted for rotation coaxially with the coupling gear 66.

The detecting member 65 includes a parallel second conducting portion 65b. By detecting the conduction state of the second detection portion, it is detected whether the process cartridge 15 is placed in the main assembly of apparatus. Therefore, a protecting portion 63b is provided on the toner seal member, as shown in FIG. 11, such that the detection portion 65b is not cut even if the toner seal member 63 is wound up. In other words, the toner seal detecting member is bifurcated, and the voltage is supplied to one portion (input portion 65d in FIG. 11), and that there are two output portions for detecting the voltage (output portions 65e, 65f in FIG. 11).

(Developer Amount Detecting Member)

Figure 14:
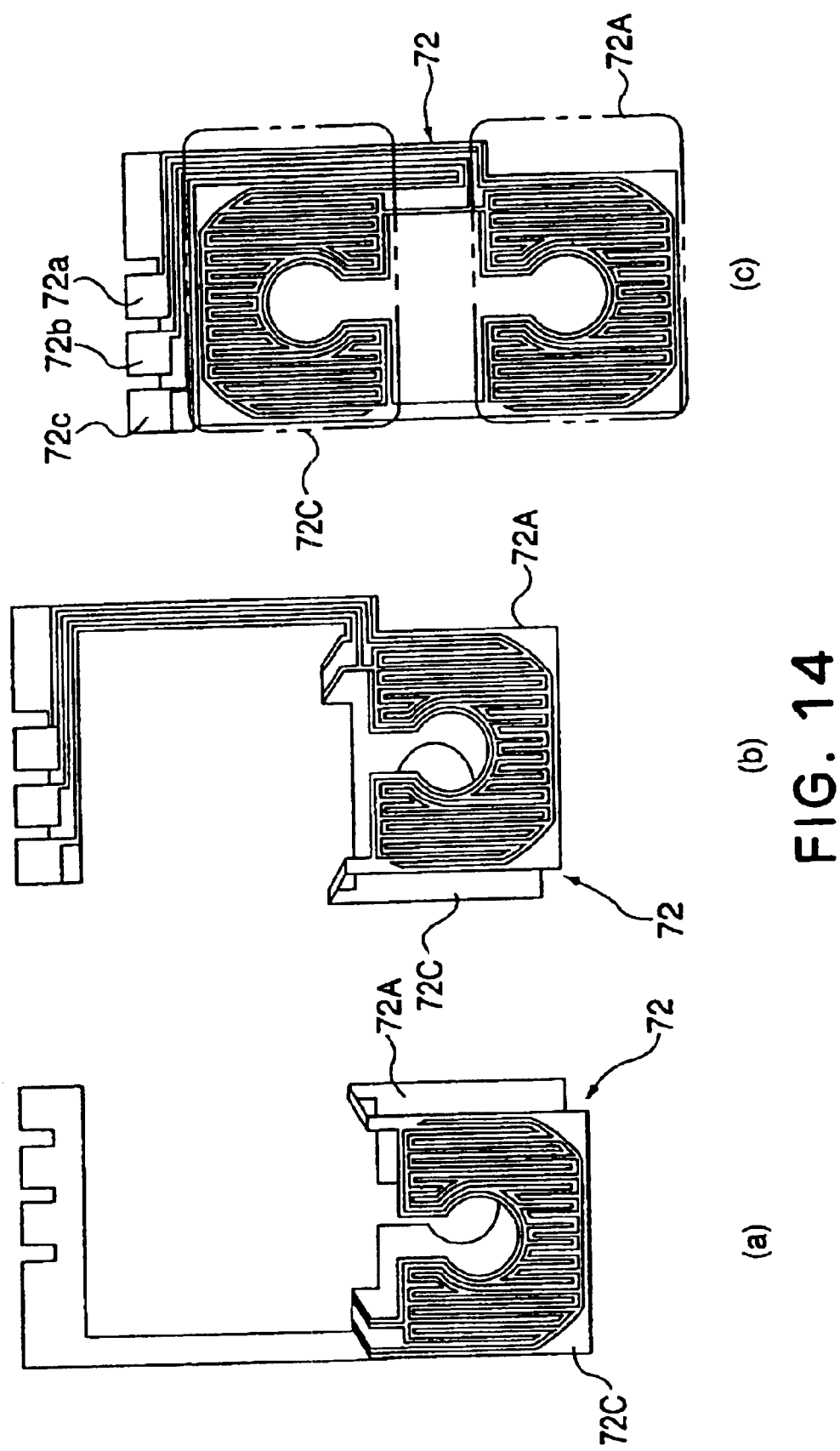
FIG. 14 illustrates (a) a first (toner amount) detecting member, (b) a perspective view and (c) a development thereof.

Referring to FIGS. 1, 13, 14, the toner remaining amount detecting mechanism will be described.

FIG. 13 is a perspective view of an inside of the toner accommodation frame, and FIG. 4 illustrates a first detecting member. In order to detect the toner amount substantially in real-time, there are provided a first toner amount detecting member 72 and a second toner amount detecting member 73. Using the first detecting member 72, a region in which the amount of the developer T is large is detected, and using the second detecting member 73, the developer T is detected in the region in which the amount of the toner is small. More particularly, the first detecting member 72 detects the developer amount when the amount of the developer is 100 percent (initial state) to between 50%-approx. 10%, and the second detecting member 73 detects the developer when the amount of the developer is between approx. 50%–10% to 0%. The first detecting member 72 comprises a thin substrate and detects an electrostatic capacity where the toner is not contacted thereto and the comparison is made between the electrostatic capacity thereof and the electrostatic capacity in the toner accommodating portion, by which the differences among the substrates are canceled. The second detecting member 73 comprises a thin metal plate provided on the outer bottom surface of the container body of the toner accommodation frame 16, and functions to detect the electrostatic capacity between itself and the developing sleeve 18.

The description will be made as to the operation principle in each of the detecting members. First, the first detecting member will be explained. In FIG. 14, (b) is an illustration as seen from the side opposite from (a), and (c) is a development of the first detecting member 72. The first detecting member 72 comprises a measurement side output electrode 72a, a reference side output electrode 72c, and a common input electrode 72b.

The combination of the measurement side output electrode 72a and the common input electrode 72b constitutes a measuring electrode 72A, and the combination of the reference side output electrode 72c and the common input electrode 72b constitutes a reference electrode 72C.

In FIG. 13, the measuring electrode 72A is disposed in such a position that it is contacted to the developer in the developer accommodation frame, namely, an inside surface of the developer accommodation frame, for example. The measuring electrode 72A detects an electrostatic capacity between the measurement side output electrode 72a and the common input electrode 72b to detect the change in the area in which the developer is contacted to the surface of the electrode. By this, the amount of the developer in the developer accommodation frame can be detected.

Since the dielectric constant of the developer is larger than that of the air, the electrostatic capacity between the electrodes changes when the area of the surface of the detecting member contacted to the developer changes.

The reference electrode 72C is disposed in the toner accommodation frame at such a position that it is not contacted to the developer. The reference electrode 72C is designed such that electrostatic capacity change upon the change in the ambient condition is substantially the same as that of the measuring electrode 72A. In this embodiment, this is accomplished by using the same electrode pattern for the measuring electrode 72A and the reference electrode 72C. Therefore, by deducting the value of the electrostatic capacity detected by the reference electrode 72C from the value of the electrostatic capacity detected by the measuring electrode 72A, it is as if that change in the electrostatic capacity due to the ambient condition change does not exist, and therefore, the detection accuracy is improved.

The first detecting member 72 preferably comprises a bendable single substrate such as a flexible print base, with the measuring electrode 72A and the reference electrode 72C on one side of the flexible print base. The flexible print base is folded and disposed in the toner accomodation frame. The folded member is secured at the edge or the entire backside by double coated tape or another adhesive material such that developer does not enter the backside of the measuring electrode 72A. As to the electrical connecting path of the measurement side output electrode 72a, the reference side output electrode 72c and the common input electrode 72b with the main assembly C of the apparatus, the description will be made hereinafter.

The position of the first detecting member 72 is as follows. As shown in FIG. 13, there are provided three stirring members 60, 61, 62. The first detecting member 72 is disposed on a side wall at the driving side in the toner accommodation frame 16 at such a position that the first detecting member 72 covers the side wall adjacent the shaft 61c of the stirring member 61 which is second closest to the developing sleeve 18 and from which the developer is fed into the region for which the second detecting member is operable. Because of such a disposition, the amount of the developer can be detected substantially in real-time, and the area of the first detecting member 72 can be reduced, and therefore, the cost of parts can be reduced. In addition, by making the position remote from the developing sleeve 18, the influence of the developing bias can be reduced. Here, the surface of the measuring electrode 72A and the stirring shaft 61c are orthogonal to each other.

Since the first detecting member 72 has a surface near stirring shaft 61, it is preferable to provide a surface wiping member 61b to remove the developer from the surface thereof, from the standpoint of enhancing the detection accuracy. In this case, it is preferable to have a wiping member 61b that is mounted on the stirring member 61 since then the structure is made simple. Here, the stirring member 61 is rotatably supported on the toner accommodation frame 16. The first detecting member 72 is disposed in the range in which the wiping member 61b corresponding to the developer stirring region functions. The, wiping member 61b is mounted to the stirring shaft 61c. The wiping member 61b functions to wipe the measuring electrode 72A by a flexible and elastic sheet.

The second detecting member 73 will be explained. In FIGS. 1 and 13, the second detecting member 73 is provided on outside of the toner accommodation frame 16, and in addition, a covering member 74 is provided outside thereof. The second detecting member 73 is formed by a metal plate and extended over the entire longitudinal area along a seat 16c of an outside of the recess configuration of the recess 16j of the toner accommodation frame 16.

The developing sleeve 18 and the developing blade 40 are electrically connected with each other to detect the change in the electrostatic capacity between the second detecting member 73, the developing sleeve 18 and developing blade 40 to detect the amount of the toner.

The second detecting member 73 is fixed by clamping or bonding on the seat 16c of the recess 16e which is inwardly concave in the toner accommodation frame 16 closest to the developing sleeve 18 outside the toner accommodation frame 16. By the disposition on the outside of the toner accommodation frame 16, the wiring from the main assembly C of the image forming apparatus to the contact for the electrical connection is not necessarily extended in the toner accommodation frame, so that liability of leakage of the developer can be avoided.

(Electrical Contact Structure)

Figure 16:
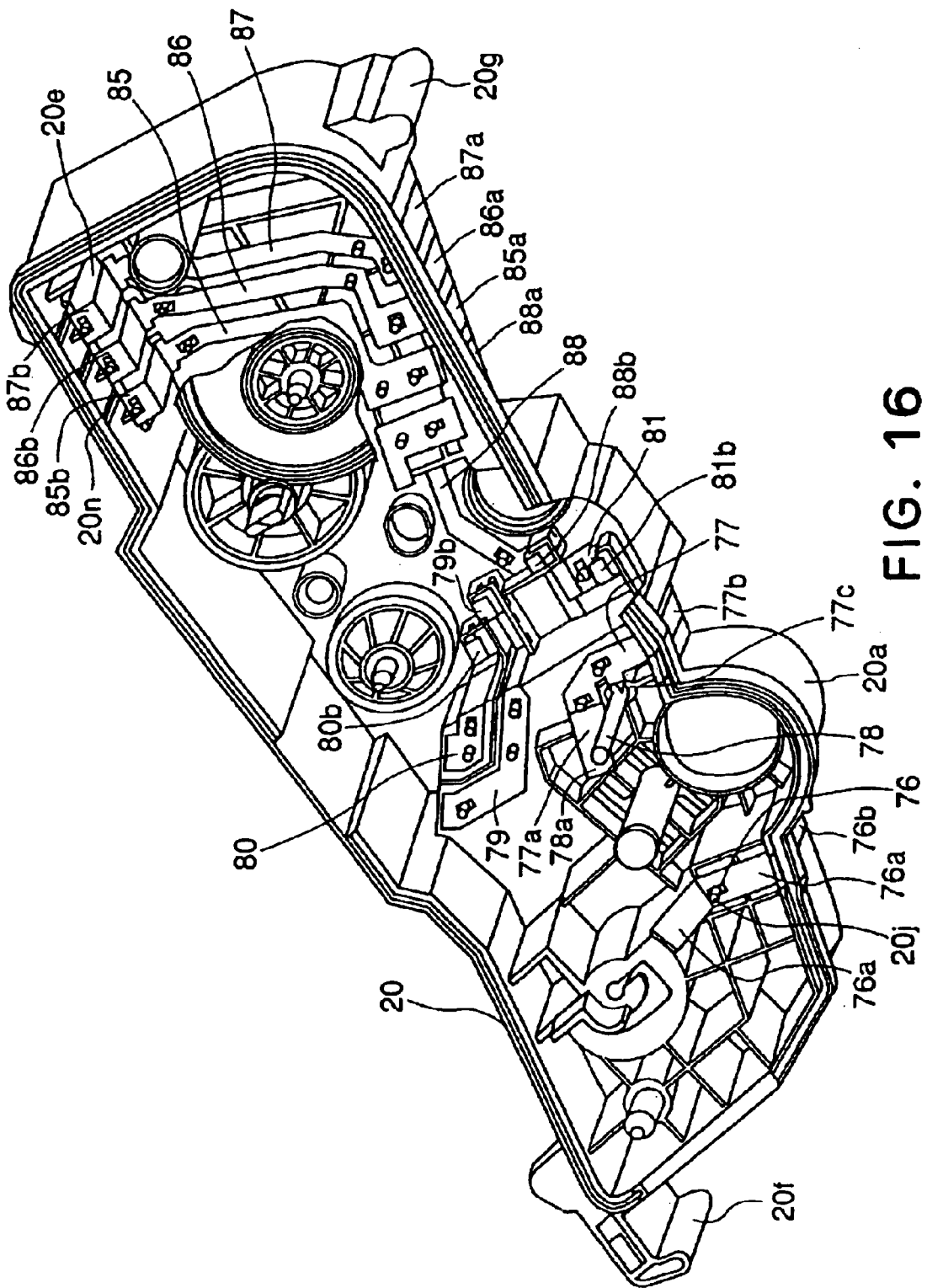
FIG. 16 is a perspective view illustrating an inside of a driving side cover.
Figure 17:
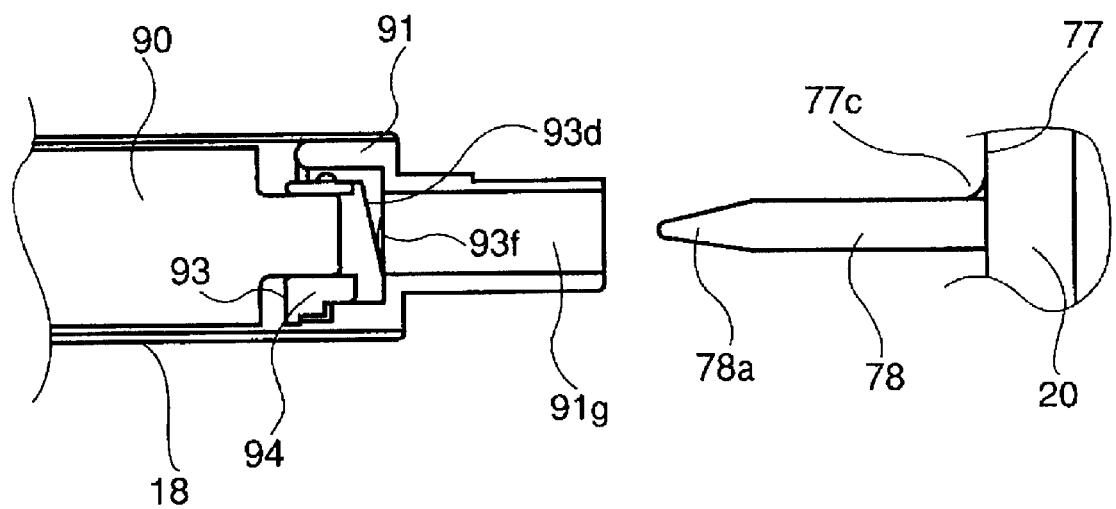
FIG. 17 illustrates contact of an electrode of the side cover and an electrode of the frame (sleeve contact).

The charging roller, the developing sleeve, the developing blade, the detecting member for detecting presence or absence of the toner seal, and the first and second detecting members for detecting the toner amount are to be supplied with a voltage from the main assembly of the apparatus, or voltages are to be detected therefrom. Referring mainly to FIGS. 3, 15–22, the voltage output/input paths from the respective members will be described. FIG. 15 is a perspective view mainly illustrating the driving side end surface where the side cover 20 has been removed from the process cartridge, and FIG. 16 is an inside perspective view of a side cover 20. FIGS. 17–22 are sectional views illustrating electrical contacts between the electrodes mounted on the side cover and the electrodes mounted on the frames. In the process cartridge of this embodiment, the outputs and inputs of the voltage to and from the above-mentioned members are effected through the side cover. The output/input paths of the various members will be described in detail.

(Electric Energy Supply to Charging Roller)

The description will first be made as to the electric energy supply path to the charging roller 12. In FIG. 1, as described hereinbefore, electric power is supplied to the charging roller 12 through the charging roller bearing 25 and the charging roller pressing spring 26. The charging roller bearing is made of electroconductive resin material only at the driving side, and is electrically connected to the end of the metal shaft 12a of the charging roller 12.

The charging roller pressing spring 26 is made of metal (Fe alloy such as SUS, Cu alloy or the like) having a resilient property and having a wire diameter of 0.5–1.5 mm. It is compressed between the drum frame 13 bearing guide portion 131 and the charging roller bearing 25 to a predetermined length so as to press-contact on the charging roller 12 to the photosensitive drum 11 with a predetermined pressure. In addition, by doing so, the charging roller pressing spring 26 is electrically contacted to the charging roller bearing. As shown in FIG. 15, a charging contact plate 75 is fixed on the drum frame 13. As shown in FIG. 1, one end surface 75a of the charging contact plate 75 is sandwiched between the charging roller pressing spring 25 and the bearing guide of the drum frame 13, and therefore, electric contact is established therebetween. The other end surface of the charging contact plate 75 is exposed to the outside to provide a contact surface 75b on a surface opposed to the side cover 20 of the drum frame 13. As shown in FIG. 16, the contact surface 75b is contacted to a spring portion 76a of the charging contact member 76 fixed to the side cover 20 by press-fitting, clamping or the like, and an external charging bias contact (external charging electrode) 76b of the charging contact member 76 is contacted to the corresponding contact of the main assembly C of the apparatus. The spring portion 76a of the charging contact member 76 has a simple leaf spring configuration, and it is deformed by approx. 0.5–3 mm to apply a pressure of approx. 50–300 gf to the contact surface 75b to establish an assured electrical contact. The external charging bias contact 76b is disposed adjacent, in a direction perpendicular to the longitudinal direction, to the coupling cover portion 20a which is projected in the form of a semi-arcuate configuration downwardly, covering a male coupling projection 30b which is a driving force receiving portion for the photosensitive drum 11 at a lower side of the side cover 20. The external charging bias contact 76b is exposed downwardly when the process cartridge is mounted to the main assembly of the apparatus.

(Electric Energy Supply to Developing Means)

Figure 18:
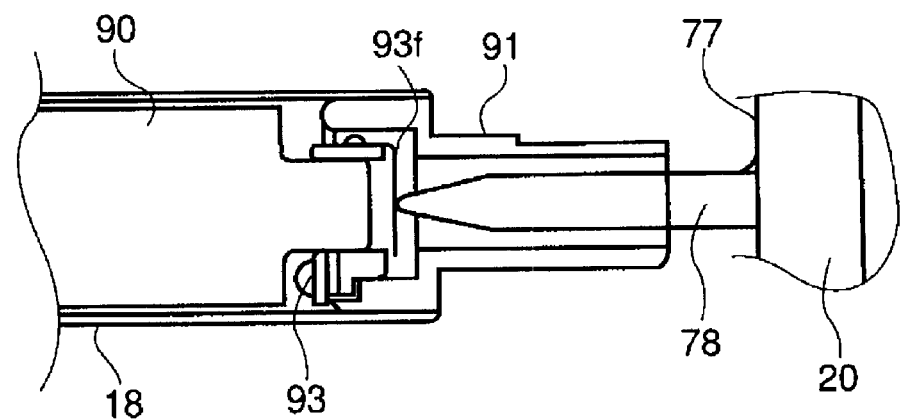
FIG. 18 illustrates contact of an electrode of the side cover and an electrode of the frame (sleeve contact).

An electric energy supply method to the developing sleeve 18 and to the developing blade 40 will be described. As shown in FIG. 16, the electric energy supply to the developing blade 40 is effected to provide the same potential as the developing sleeve 18. Therefore, the electric power is supplied to both of them by a developing device contact member 77 contactable to the main assembly C of the apparatus. The developing device contact member 77 is supported by the side cover 20 by clamping or the like. The external contact portion 77b of the developing device contact member 77 is electrically contacted with a contact portion (unshown) of the main assembly C of the apparatus. A contact portion 77c of the developing device contact member 77 is electrically connected to a developing device contact shaft 78 supported on the side cover 20 by insertion molding or the like. Here, the contact portion 77c is bifurcated into triangle configurations, and as shown in FIG. 16, the free ends thereof bite into the developing device contact shaft 78, so that assured electric conduction is assured. A free end 78a of the developing device contact shaft 78 is inserted into an inner portion 91g (FIGS. 7, 15) of the developing sleeve 18 to apply a pressure to an arm portion 93f (FIG. 9) of the sleeve contact plate 93 supported in the developing sleeve 18 as shown in FIG. 18 to establish an electrical contact to permit supply of the voltage to the developing sleeve 18. An arm portion 93f and a bent segment portion 93d of the sleeve contact plate 93 are formed into a substantially Z-shaped configuration, and it is elastically deformed into a horizontal shape to apply a spring force of approx. 50–300 g in the axial direction of the contact shaft 78 to establish an assured electric conduction. The developing device contact member 77 has a leaf spring portion 77a, which is contacted to a free end portion 59d of the linear portion of the developing device pressing spring 59 shown in FIGS. 15. the developing device pressing spring 59 is made of a metal, and the hook portion 59a is contacted with the edge of the hole portion 40k of the metal plate 40a of the developing blade 40 to permit a high voltage, thus providing the same potential at the developing sleeve 18 and the developing blade 40. Thus, the electric energy supply is effected using a member for applying the D pressure (the pressure applied to a flat portion provided by D-shaped shaft or pin), and therefore, the member has dual functions. By doing so, the manufacturing cost is reduced by the reduction of the number of parts, and space can be saved. The external developing bias contact (external developing electrode) 77b of the developing device contact member 77 is disposed below the side cover 20 with the coupling cover portion 20a of the side cover 20 interposed therebetween in the direction perpendicular to the longitudinal direction of the external charging bias contact 76b. The external developing bias contact 77b is disposed adjacent to the coupling cover 20a. The developing bias contact 77b is exposed downwardly when the process cartridge is mounted to the main assembly of apparatus.

(Electric Energy Supply to Toner Seal Detecting Member)

Referring to FIGS. 3, 12, 15, 16, 19 and 20, the description will be made as to the output/input of the voltages to the toner seal presence or absence detecting member. As shown in FIGS. 3 and 16, the side cover 20 supports a new toner seal detection electrode spring 79 for detecting electric connection of the electric conducting portion 65a (FIG. 12) for detecting a new toner seal by the main assembly C of the apparatus, a cartridge presence-absence detection electrode spring 80 for detecting electric connection of the electric conducting portion 65b (FIG. 12) to detect the presence or absence of the process cartridge 15, and a toner seal input electrode spring 81 for application of a voltage to the electrodes 65f for the electric conducting portions. These electrodes have external contacts 7a, 80a, 81a shown in FIG. 3 for electric contact to the corresponding electrodes provided in the main assembly C of the apparatus. The electrode springs 79, 80 and 81 are electrically connected with the contact surface 82a of the new toner seal detecting electrode 82 (FIGS. 19 and 20), the contact surface 83a of cartridge the presence-absence detection electrode, and the contact surface 84a of the toner seal input electrode, respectively, which are supported on the toner accommodation frame 16 shown in FIG. 16. The electrodes 82 are directly contacted to the toner seal detecting member 65. End portions of the electrodes 82 are leaf springs in the form of levers which are pressed against the electrode portions 65d, 65e, 65f of the detecting members, respectively, and end portions are constituted in the contact surfaces 82a, 83a, 84a so as to be opposed to the side cover 20 to contact the electrode springs 79, 80, 81. In this embodiment, the contact surfaces 82a, 83a, 84a of the electrodes 82 are provided on a surface opposed to the side cover 20 of the accommodating portion 16h for accommodating the toner seal wound up, the accommodating portion 16h being a part of the toner accommodation frame 16. End portions of the respective electrode springs 79, 80, 81 are formed into leaf spring portions 79b, 80b, 81b which are generally U-shaped. By the U-shaped portions of the leaf spring portions 79b, 80b, 81b being collapsed, they are assuredly urged toward the contact surfaces 82a, 83a, 84a to establish the assured contacts (in FIGS. 19 and 20, only the contact between the electrode 82 and electrode spring 79 are shown as a representative example). By the use of the U-shaped configuration of the leaf spring portions 79b, 80b, 81b, sufficient contact pressures can be assured, thus permitting assured electric connection in a small space. The electrode spring 79 is abutted to a rib 20m of the side cover 20, so that lateral deviation of the electrode spring 79 upon the deformation thereof (left and right directions in FIG. 20) can be prevented, and therefore, the contact with the electrode plate 82 is assured. The free end 79d of the electrode spring 79 is accurate, and therefore, the contact pressure remains unchanged even when the electrode spring 79 is more or less deviated in the lateral direction (left and right directions in FIG. 20).

(Electric Energy Supply to First Remaining Toner Amount Detecting Member)

Figure 21:
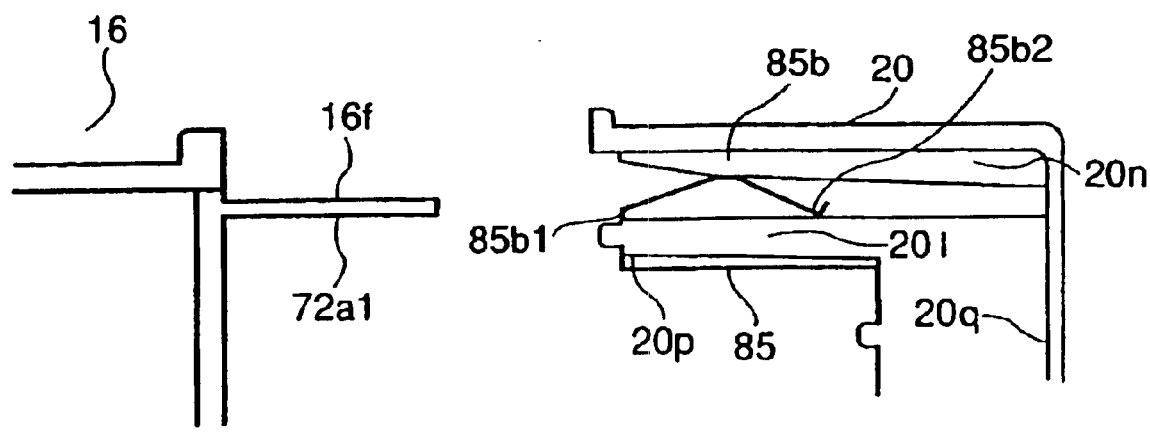
FIG. 21 illustrates contact of an electrode of the side cover and an electrode of the frame (toner amount detection contact).
Figure 22:
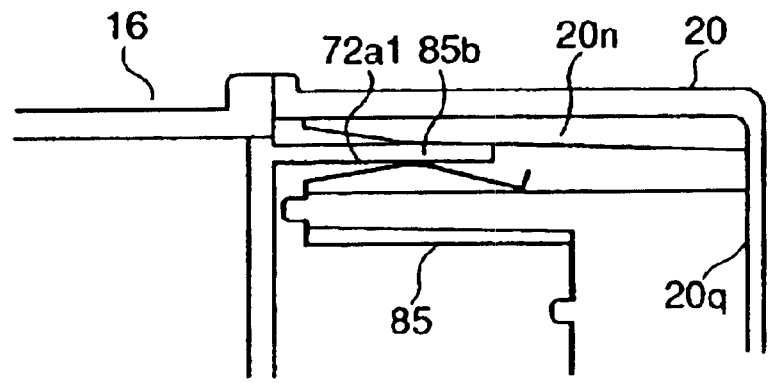
FIG. 22 illustrates contact of an electrode of the side cover and an electrode of the frame (toner amount detection contact).

Referring to FIGS. 3, 15, 16, 21 and 22, the description will be made as to the output/input electrode member for the voltages to the first remaining toner amount detecting member. As shown in FIGS. 3 and 16, the side cover 20 supports a measurement side output electrode spring 85 for detecting a measuring side output voltage of the first detecting member 72, a reference side output electrode spring 87 for detecting a reference side output voltage, and a common input electrode spring 86 for applying a voltage to both of them. These electrodes have external contacts 85a, 86a, 87a for electric contact to the corresponding electrodes provided in the main assembly C of the apparatus. The electrode springs 85, 86, 87 are electrically connected the electrodes 72a, 72b, 72c of the first detecting member 72, respectively. More particularly, the electrode springs 85, 86, 87 are provided with L-shaped leaf spring portions 85b, 86b, 87b. End portions 85b1 of the L-shaped portions of the leaf spring portions are clamped to a surface 20p opposed to the toner accommodation frame of the supporting portion 201 projected toward the toner accommodation frame 16 from the inner wall 20q of the side cover 20, as shown in FIGS. 21 and 22 (in FIGS. 21 and 22, only the electrode spring 85 is shown as a typical example). The other portion 85b2 is substantially tangentially contacted to the supporting portion 201 and is freely slidable on the surface of the supporting portion 201 at the other end side 85b2. As shown in FIG. 15, the electrodes 72a, 72b, 72c of the first detecting member 72 are fixed by double coated tape or the like to a receiving surface 16f projected toward the side cover from the toner accommodation frame 16 at end portions 72a1, 72b1 and 72c1 thereof, respectively. When the side cover 20 is assembled, the supporting portion 201 of the side cover 20 of the electrode is opposed to the receiving surface 16f of the toner accommodation frame 16 with a predetermined distance therebetween, so that spring portion 85b is deformed as shown in FIG. 22 to be contacted to the end 72a1 of the first detecting member 72 (the electrode spring 85 is taken as a representative example of the electrode springs 85, 86 and 87). The receiving surface 16f of the toner accommodation frame 16 has a thickness which is as relatively small as 0.5–1 mm approx., so that it is flexed to a certain extent by the spring force and is received by a back-up rib 20n provided on the side cover 20, by which a stabilized contact pressure is provided.

(Electric Energy Supply to Second Remaining Toner Amount Detecting Member)

The description will be made as to the electric energy supply to the second remaining toner amount detecting member 73. As shown in FIGS. 3 and 16, the side cover 20 supports a second input electrode spring 88 for applying a voltage to the second detecting member 73 from the main assembly C of the apparatus. The electrode spring 88 has an external contact portion 88a for contacting the corresponding electrode of the main assembly C of the apparatus. The electrode spring 88 is electrically connected to a part of the driving side end surface of the second detecting member 73 shown in FIG. 15 at a contact surface 73a extended toward the driving side end surface. The contact surface 73a is formed on substantially the same surface with the contact surfaces 82a, 83a, 84a of the electrode of the toner seal detecting member. One end portion of the electrode spring 88 is a leaf spring portion 88b and, similarly to the new toner seal detection spring or the like, it is formed into a U-shaped configuration, and by the U-shaped portion being collapsed, it is assuredly contacted to the contact surface 73a.

The electrode spring supported on the side cover and the electrode plates supported on the frame described above are all made of a thin metal (Fe alloy such as SUS or the like, Cu alloy or the like) plate having a thickness of approx. 0.1–0.3 mm. The electrode spring supported on the side cover is made of a metal exhibiting a resilient property (spring property), but the electrode plate supported on the frame such as the drum frame 13, toner accommodation frame 16 or the like are not necessarily resilient. The materials of the electrode supported on the frame and the electrode supported on the side cover are desirably different from each other to avoid electrolytic etching. The resilient urging force to the electrode or the like supported on the frame of the electrode supported on the side cover is preferably approx. 50–200 g.

As described in the foregoing, when the electric power is supplied directly from the main assembly of the apparatus to the developing device frame to supply the electric power to the developing roller, the toner amount detecting means or the like in the structure of the process cartridge, the pressure (developing device pressing) of the distance regulating member 53 (roller) provided in the developing roller 18 is liable to vary under the influence of the contact pressures, depending on the positions of the contacts. If this occurs, the gap between the photosensitive drum 11 and the developing roller 18 (SD gap) varies, resulting in of image defects. In this invention, this possibility is avoided because the electric energy is supplied to the side cover. The electrical connections are established through the electrode plates supported on the side cover, except for the drum grounding. The accuracy assurance can be effected by controlling the side cover as a unit. The control for avoiding foreign matter depositing on the contact portions is easy. When the input/output of the voltages are performed through the frame, the contact pressure can be easily controlled since the electrode sides supported on the side cover are resilient (the receiving side is on the frame side). The electrode springs supported on the side cover are formed into a U shape or L shape. This is desirable particularly for the toner seal presence-absence detection and the toner amount detection, because the assured spring pressures can be produced in a small space, in view of the fact that input/output voltages in the case of the toner seal presence-absence detection and the toner amount detection are low (approx 10V) and therefore are required to be assuredly contacted.

The external charging electrode (the external contact 76b of the charging contact member), the external developing electrode (the external contact 77b of the developing device contact member), the external cartridge presence or absence output/input electrode (the external contact 80a of the cartridge presence-absence detection electrode spring), the toner seal presence or absence output/input electrode (the external contact spring 79a of the new toner seal detection electrode spring), the toner amount detection output/input electrode (the external contacts 85a, 86a, 87a, 88a), are arranged substantially along one line as seen from the bottom in the state that the process cartridge is mounted to the main assembly of the image forming apparatus. Therefore, the external electrodes can be easily inspected.

Since the external electrodes are provided on the side cover 20 which functions to correctly position the process cartridge relative to the main assembly C of the apparatus, the external contacts can be assuredly contacted to the contacts of the main assembly of apparatus at accurate positions.

The external contact 76b of the charging contact member and the external contact 77b of the developing device contact member are provided adjacent to the coupling cover portion 20a (FIG. 16) projected downwardly, and therefore, when the process cartridge 15 is placed on a table, the possibility can be avoided that external contact 76b of the charging contact member and the external contact 77b of the developing device contact member are damaged by the top plate of the table since the coupling cover portions 20a are contacted to the table. Thus, these contacts are protected from the possibility of damage.

The external contact 80a which is the external cartridge presence or absence output/input electrode, and the external contact 79a which is the toner seal presence or absence output/input electrode are disposed at the corner portions faced downward, respectively, as shown in FIG. 3, and therefore, they are not easily contacted by the users hands. For this reason, contact surfaces are not liable to be damaged.

The external contacts 85a, 86a, 87a, 88a which are the toner amount detection output/input electrodes disposed such that contact surfaces thereof are substantially flush with the flat surface 20r corresponding to the bottom surface of the recess which is recessed upwardly from the lower surface of the side cover 20. Therefore, when the process cartridge 15 is placed on the table, the external contacts 85a, 86a, 87a, 88a are prevented from contacting the top surface of the table, and therefore, the contact surfaces are protected. The guide portion 20g is projected from the lower surface of the side cover 20, and therefore, when the process cartridge 15 is placed on the table, the process cartridge 15 is supported on the table by the guide portion 20g and the coupling cover portion 20a being contacted to the table. Therefore, the external contacts 85a, 86a, 87a, 88a are sufficiently remote from the top of the table.

Because of the arrangement and disposition of the external contacts, when the process cartridge 15 is inclined by raising the drum frame 13 side thereof from the top of the table, the guide portions 19g and, 20g function as a pivot, and the external contacts become distant from the top of the table. On the contrary, when the toner accommodating container 16 side of the process cartridge 15 on the table is raised, the coupling cover portion 20a functions as a pivot, by which the external contact 76b for the charging becomes closer to the top of the surface. However, the portion between the corner portion 20s and the coupling cover portion 20a of the side cover 20 is recessed, and therefore, when the inclination angle becomes large, the corner portion 20s and the corner portion 19s of the side cover 19 which is at the same level as the corner portion 20s function as a pivot, so that the external contact 76b is not influenced.

(Mounting and Demounting Method of Process Cartridge Relative to Main Assembly)

Figure 23:
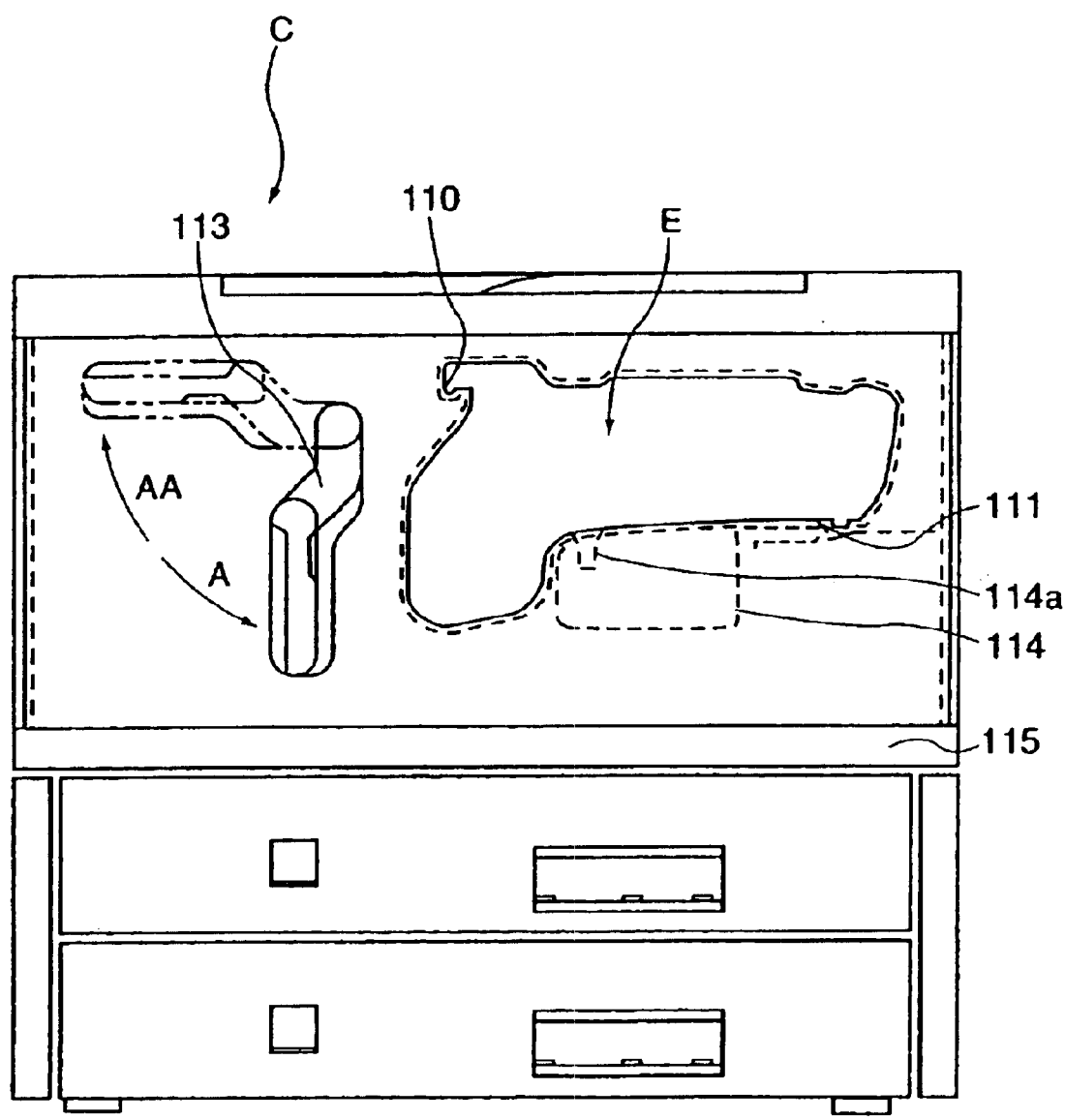
FIG. 23 is a front view of a main assembly of the apparatus according to an embodiment of the present invention with a front door thereof opened.
Figure 24:
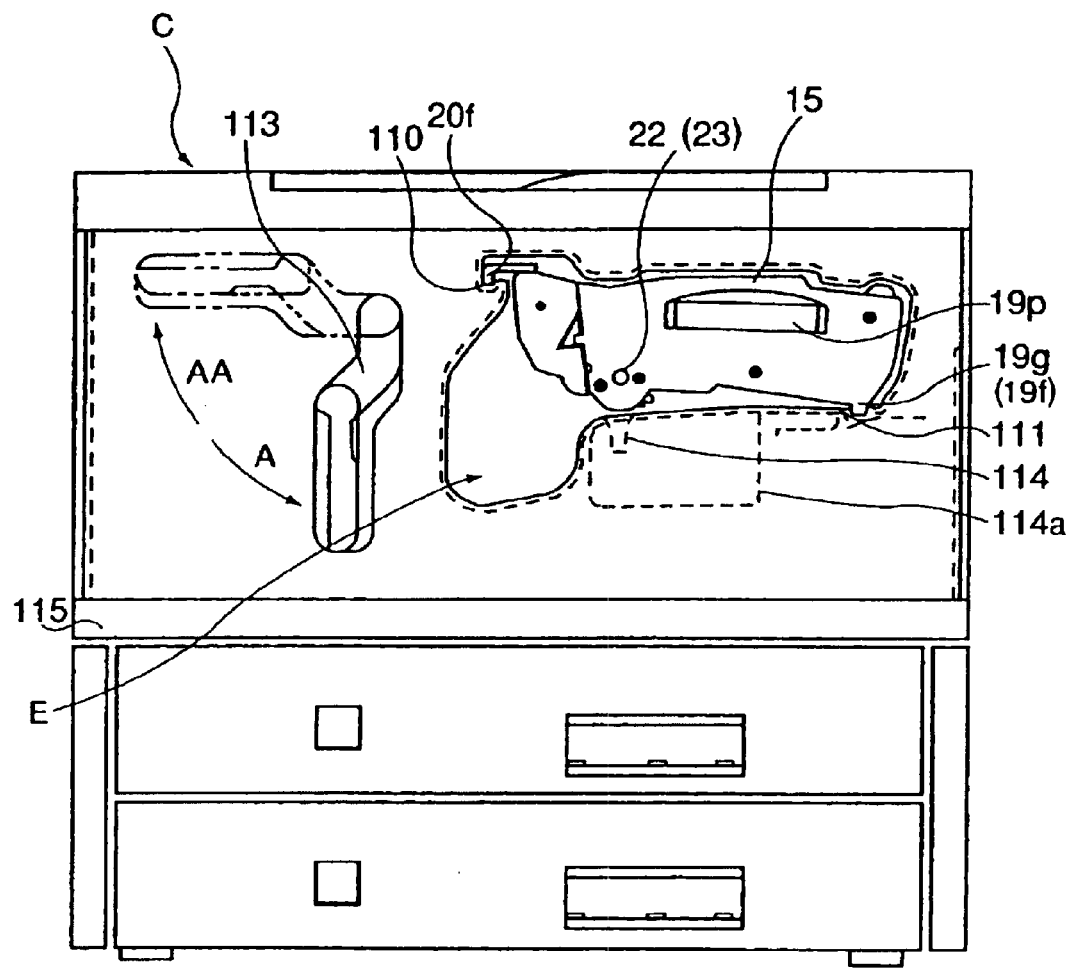
FIG. 24 is a front view of a process cartridge according to an embodiment of the present invention when inserted into the rear side of the main assembly of the apparatus.
Figure 25:
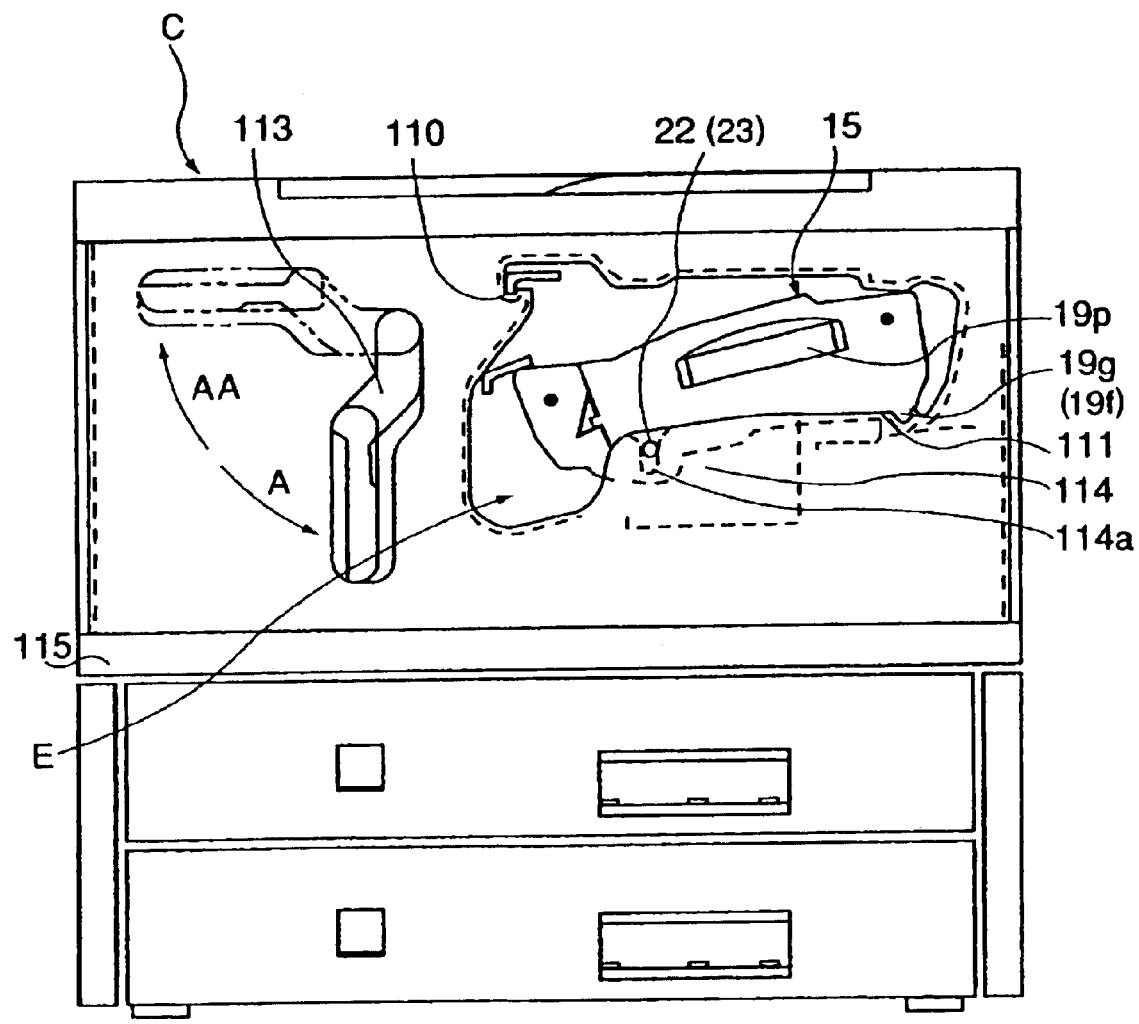
FIG. 25 is a front view in which the process cartridge according to the present invention is placed at a predetermined position.

Referring to FIGS. 1, 3, 23, 24 and 25, the description will be made as to mounting of the process cartridge to the main assembly of apparatus and demounting thereof from the main assembly. FIG. 23 illustrates a state in which the front door 115 of the main assembly C of the apparatus is opened; FIG. 24 illustrates a state in which the process cartridge 15 is inserted to the rear side of the main assembly C of the apparatus; and FIG. 25 illustrates a state in which the process cartridge is placed in the predetermined position. The front door 115 is rotatably mounted in the front side of the main assembly C of the apparatus by a shaft extending in a horizontal direction on the surface of the drawing at the bottom edge (FIG. 23), and is movable between an open position and a closed position in which a space E is located.

In this embodiment, the process cartridge 15 is mounted to the main assembly opened apparatus through two steps. In the first step, the process cartridge is moved in the direction substantially parallel with the photosensitive drum 11, and in the second step, the process cartridge is pivoted about a pivot in a plane perpendicular to the photosensitive drum 11.

As shown in FIG. 23, the main assembly C of the image forming apparatus has guiding members 110, 111 extending in a direction perpendicular to the sheet of the drawing, the guiding members 110, 111 functioning as a guide for mounting the process cartridge into the image forming apparatus from the outside. As shown in FIG. 23, the guiding member 110 is in the form of a channel which opens upward and which is disposed at an upper left position of the space portion E. The guiding member 110 is fixed in the main assembly C of the image forming apparatus, and guiding member 111 is in the form of a channel which opens upward and which is disposed at a lower right position of the space portion E. The guiding member 110 and the guiding member 111 are substantially parallel with each other.

The process cartridge 15 is substantially rectangular parallelopiped, as shown in FIG. 3, and is provided with guide portions 19f, 19g and a projection 20f to be guided when the process cartridge is mounted to the main assembly C of the image forming apparatus, wherein the projection 20f is arcuate and projects downwardly from a rear lateral side of the process cartridge 15. The guide portion 19g is arcuate projected downwardly from the front bottom side of the process cartridge. At opposite sides of the process cartridge, there are provided projections 22, 23 coaxially with the photosensitive drum 11.

In the insertion of the process cartridge 15 into the main assembly C of the image forming apparatus, the front door 115 is which is first opened (FIG. 23) is provided in the front side of the main assembly C of the image forming apparatus (at the non-driving side in the axial direction of the photosensitive drum 11). Then, the space portion E for receiving the process cartridge 15 appears. Then, as shown in FIG. 24, the projection 20f and the guide portion 20g of the process cartridge 15 are placed on the guiding member 110 and the guiding member 111.

The process cartridge 15 is then inserted into the main assembly of the image forming apparatus straightly (perpendicularly into the sheet of the drawing of FIG. 24). Then, the guide portion 19g at the front side with respect to the inserting direction of the process cartridge 15, is brought into engagement with the guiding member 111. When the process cartridge 15 is inserted, the process cartridge is correctly aligned in the lateral direction by the cooperation of the guiding members 110, 111 of the main assembly C and the image forming apparatus and the projection 20f of the process cartridge 15. When the process cartridge 15 is inserted to the rear side of the space E, the projection 20f reaches the lifter member provided in the main assembly C of the apparatus, and is supported by the lifter member (unshown). The projection 20f is a portion to be supported by the main assembly of the apparatus to support the process cartridge 15 on the main assembly. Thus, the first step of the mounting operation is completed.

After the process cartridge 15 is inserted to a predetermined position at the rear side of the main assembly C of apparatus, the operation lever 113 is operated.

More particularly, the operation lever 113 is rotated from the position indicated by solid lines to the position indicated by the chain lines in the direction indicated by an arrow AA. By this, the process cartridge is rotated by the unshown lifter member about the axis connecting the guide portions 19g and 20g while the guide portions 19g and 20g are in contact with the guiding member 111 of the main assembly C of the image forming apparatus, in the counterclockwise direction, namely, to the position in which the left part of the process cartridge 15 lowers in FIG. 25. The process cartridge 15 is rotated while the position thereof is determined in the lateral direction by the engagement between the guiding member 111 of the main assembly C of the image forming apparatus and the guide portions 19g of the process cartridge 15. The rotation track of the process cartridge 15 is determined by the lifter member (unshown) such that the drum shaft reception members 22, 23 (projections) of the process cartridge 15 moves move substantially vertically.

When the process cartridge 15 moves to a predetermined position by the counterclockwise rotation, the bearing members 22, 23 (projections) of the process cartridge 15, as shown in FIG. 25, are brought into engagement with the recesses 114a of the positioning member 114 of the main assembly C of the image forming apparatus so that the process cartridge 15 is assuredly positioned. Thus, the bearing members 22, 23 projected from the side covers 19, 20, respectively, are the portions to be positioned for positioning the process cartridge 15 relative to the main assembly of the apparatus. The positioning members 114 are opposed to each other with the process cartridge 15 interposed therebetween and are fixed on the front and rear plates of the image forming apparatus. The recess 114a are each in the form of a channel opening upward, and the bearing members 22, 23 of the process cartridge 15 in the form of a protection enters the open portions of the recesses 114a. The bearing members 22, 23 of the process cartridge 15 are assuredly engaged with the recesses 114a of the positioning member 114. Thus, the second step of the mounting operation is completed. Simultaneously with the second step of the mounting operation, at the rear side of the process cartridge 15, the projection 30b (drum coupling) mounted into the end of the photosensitive drum is brought into engagement with a recess 112a of the coupling member of the main assembly C of the apparatus to enable the photosensitive drum 11 to be supplied with a driving force for rotation. The stirring coupling 132 shown in FIG. 3 is brought into engagement with the stirring coupling (unshown) provided in the main assembly C of the stirring coupling 132 to enable transmission of rotational driving force to the stirring members 60, 61, 62.

When a sheet S is passed through the main assembly C of the image forming apparatus, that is, when the photosensitive drum 11 is rotated in the clockwise direction in FIG. 25, the guiding member 111 of the main assembly C of the image forming apparatus abuts the guide portions 19g and 20g of the process cartridge 15 to function as a stopper against rotation, so that the position (orientation) of the process cartridge 15 is maintained. Thus, the center of the rotation of the process cartridge 15 functions as a stopper against rotation during passage of the sheet.

When the process cartridge 15 is to be taken out of the main assembly C of the image forming apparatus, the operations are reversed. More particularly, the operation lever 113 is rotated in the direction indicated by an arrow A. By doing so, the process cartridge 15 is rotated in the clockwise direction about a contact portion between the guiding rail 111 and the guide portion 19g, 20g by the unshown lifter member.

When the process cartridge 15 is lifted to the position indicated in FIG. 24, a grip 19p (a part of the side cover 19)

provided on the side surface of the process cartridge 15 is pulled such that the process cartridge 15 is translated toward the user, by which it is taken out of the main assembly C of the image forming apparatus.

Therefore, even if the weight of the process cartridge is large, the mounting operativity and the positioning accuracy of the process cartridge are improved because the process cartridge is mounted simply by inserting horizontally the process cartridge into the main assembly of the image forming apparatus and then manipulating the lever to the predetermined position.

In addition, the demounting operativity of the process cartridge is improved because the process cartridge is demounted simply by manipulating the lever and pulling the process cartridge out of the main assembly of the image forming apparatus.

Since the guide portion is disposed below the toner accommodating portion, it is closer to the gravity center of the process cartridge, and therefore, a stable position of the center of rotation is provided substantially without lateral deviation.

In this embodiment, the guide portion is provided on the side cover, but this is not limited to the present invention and may be extended to the toner accommodation frame.

(Electric Cconnection of Electrical Contacts)

Figure 26:
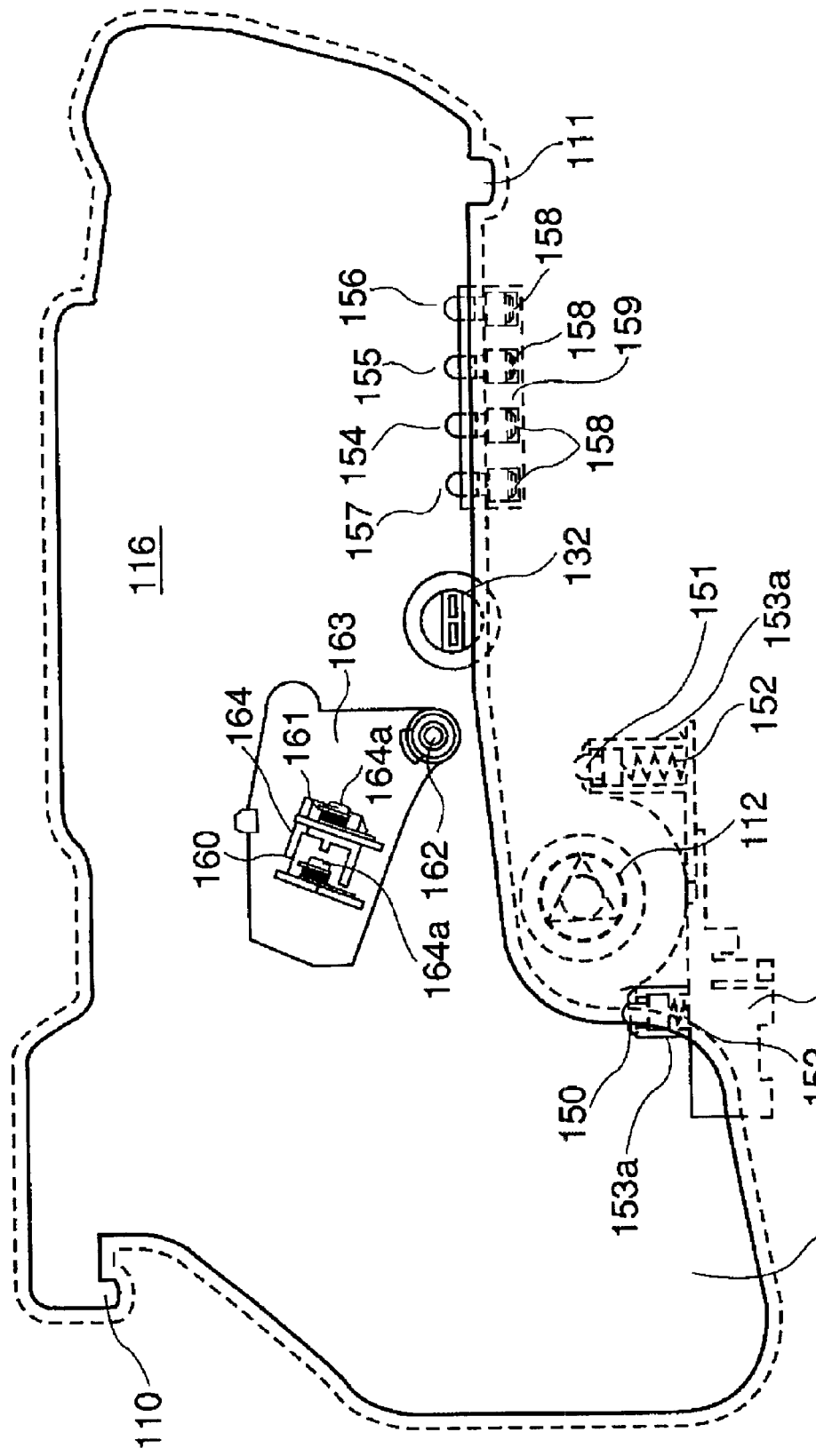
FIG. 26 is an enlarged front view of a space E shown in FIG. 23.
Figure 27:
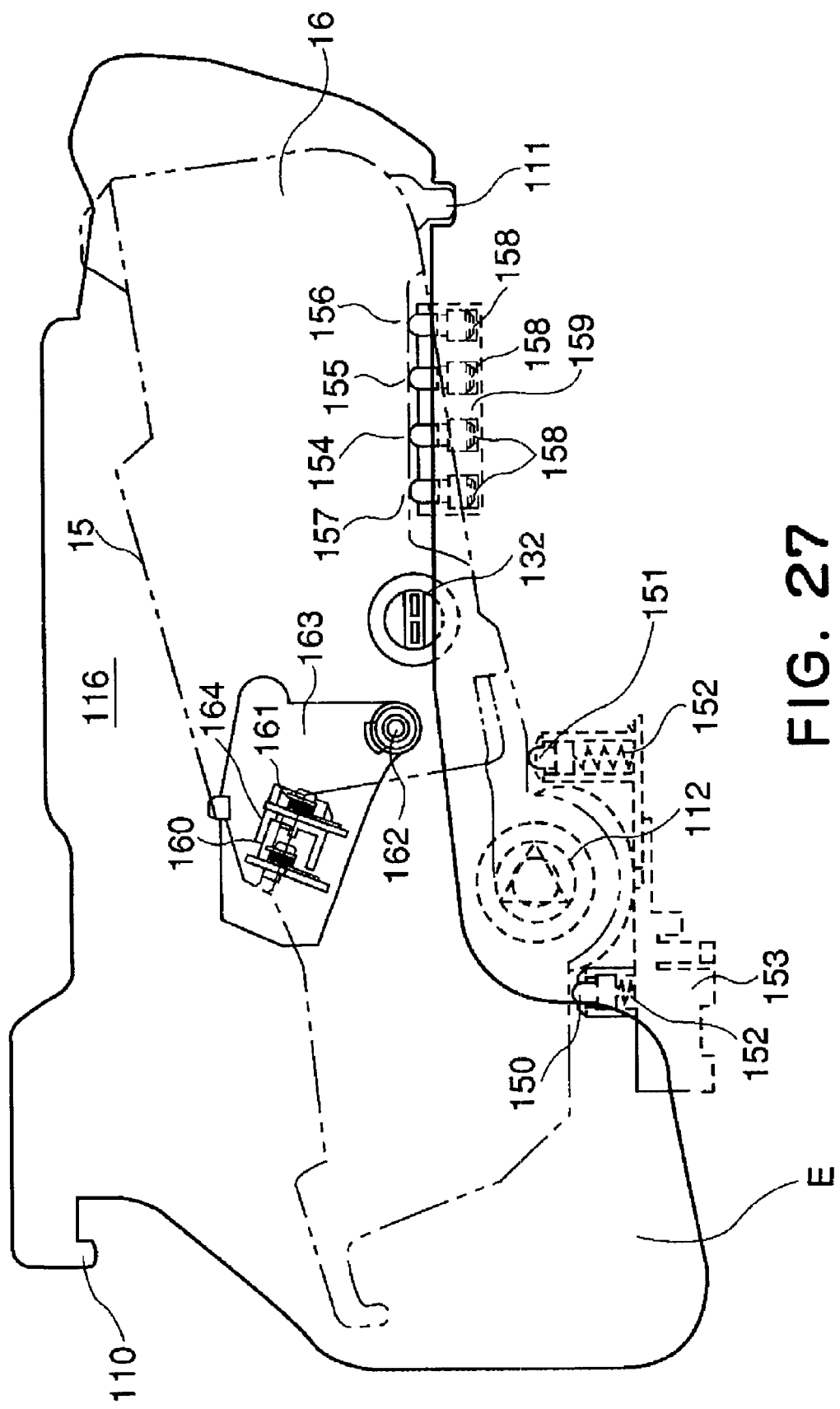
FIG. 27 is an enlarged front view of a space E shown in FIG. 25.
Figure 28:
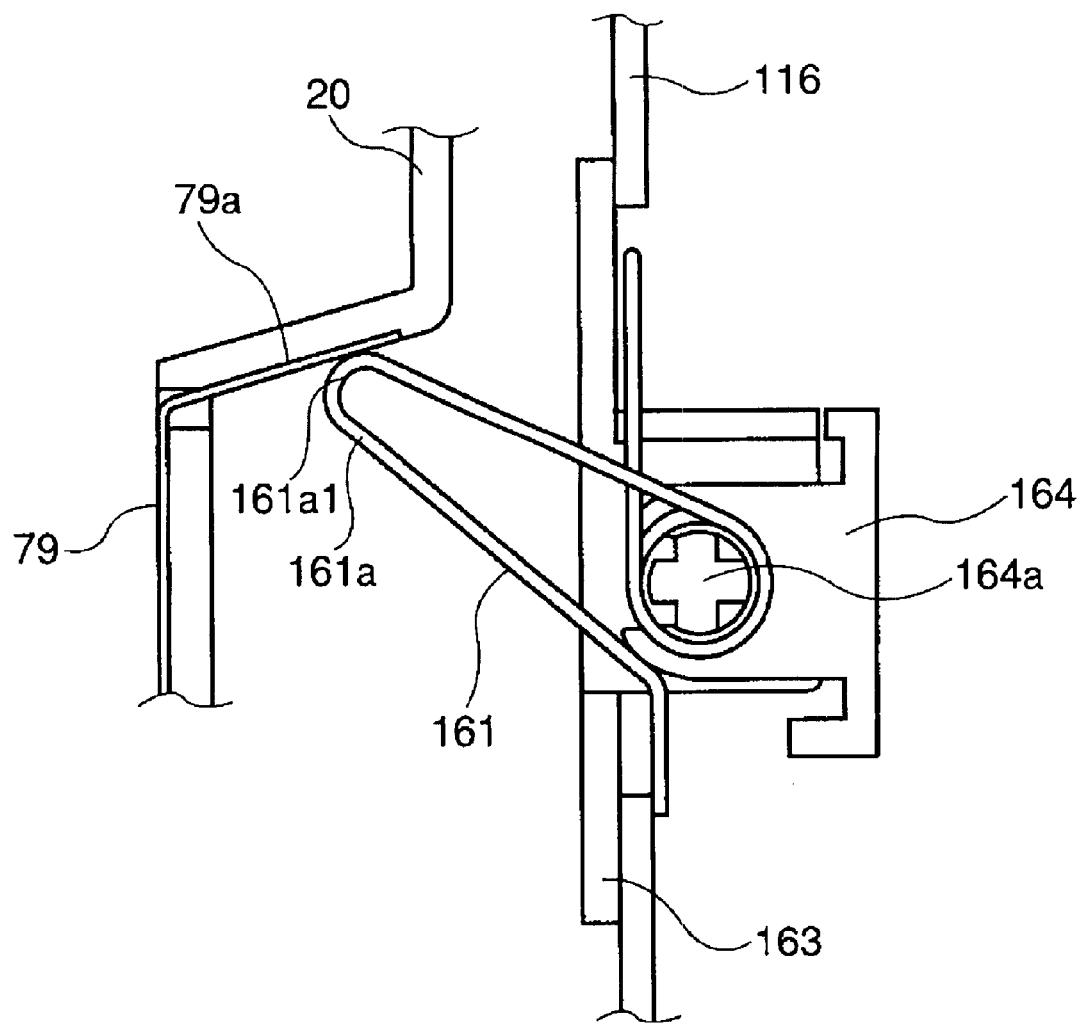
FIG. 28 is a side view of a detection contact of a fresh cartridge, as seen in a lateral direction of the main assembly of the apparatus.
Figure 29:
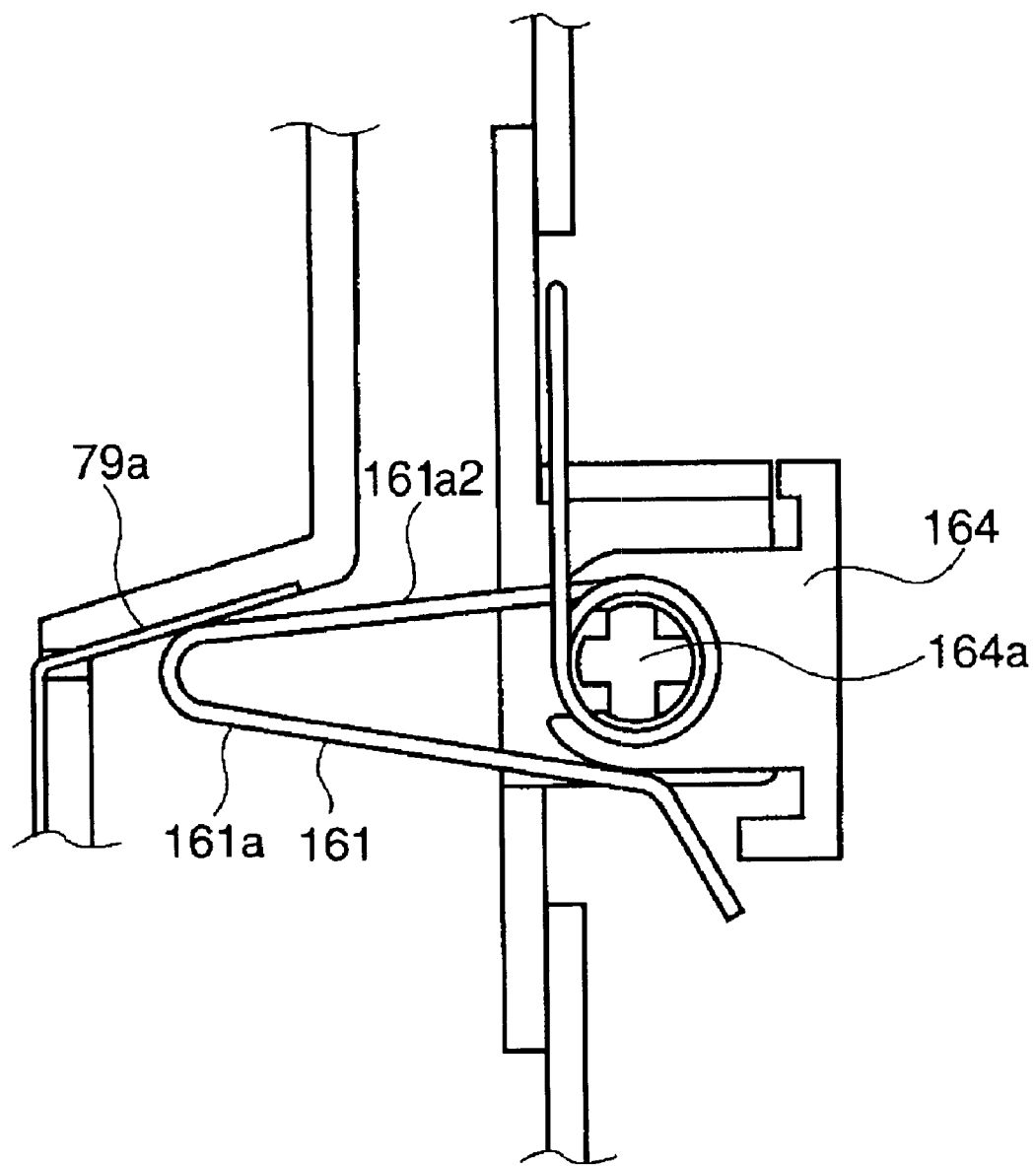
FIG. 29 is a side view of a detection contact of a fresh cartridge, as seen in a lateral direction of the main assembly of the apparatus.
Figure 30:
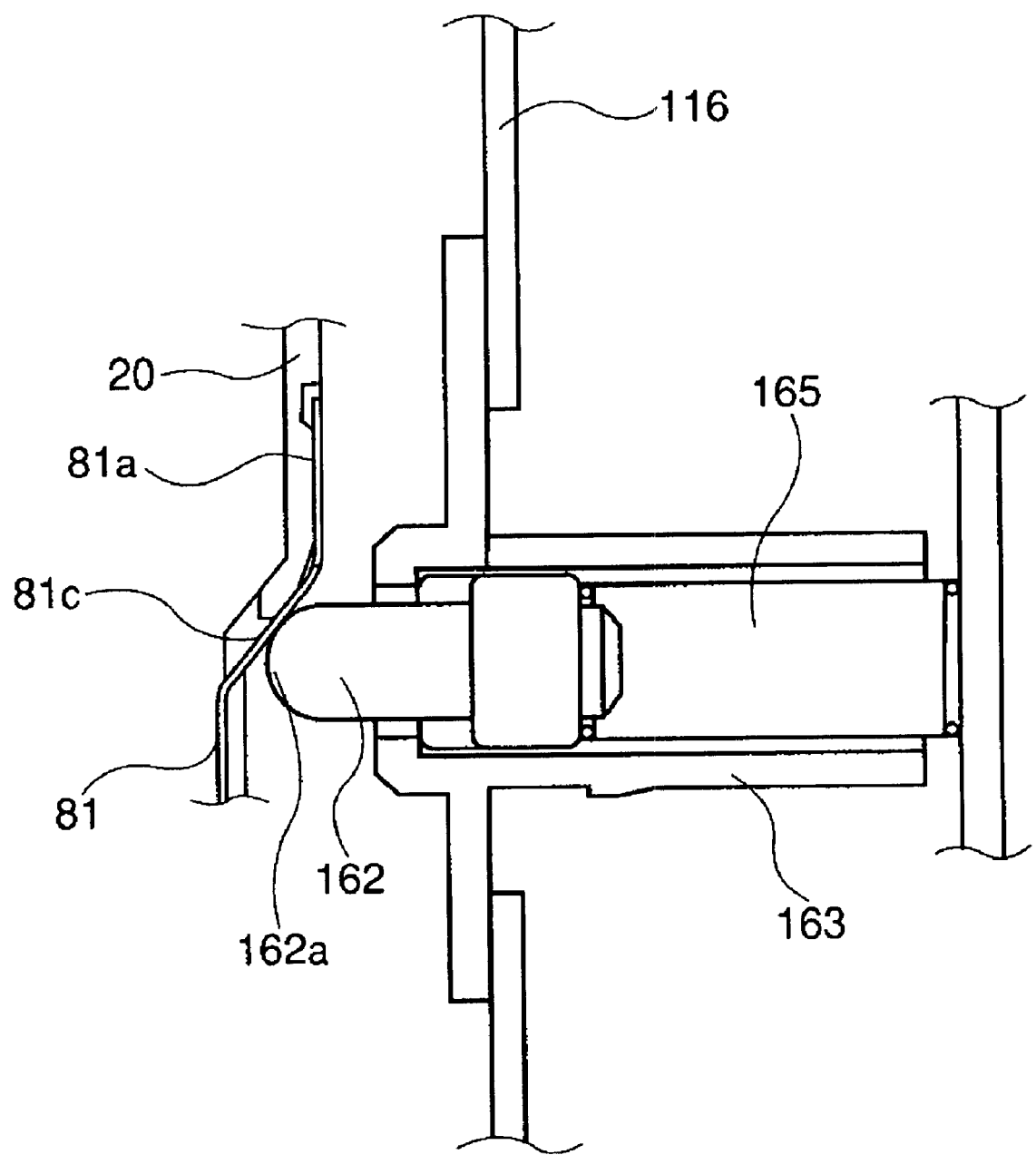
FIG. 30 is a side view of a common input contact of a cartridge as seen in a lateral direction of the apparatus.
Figure 31:
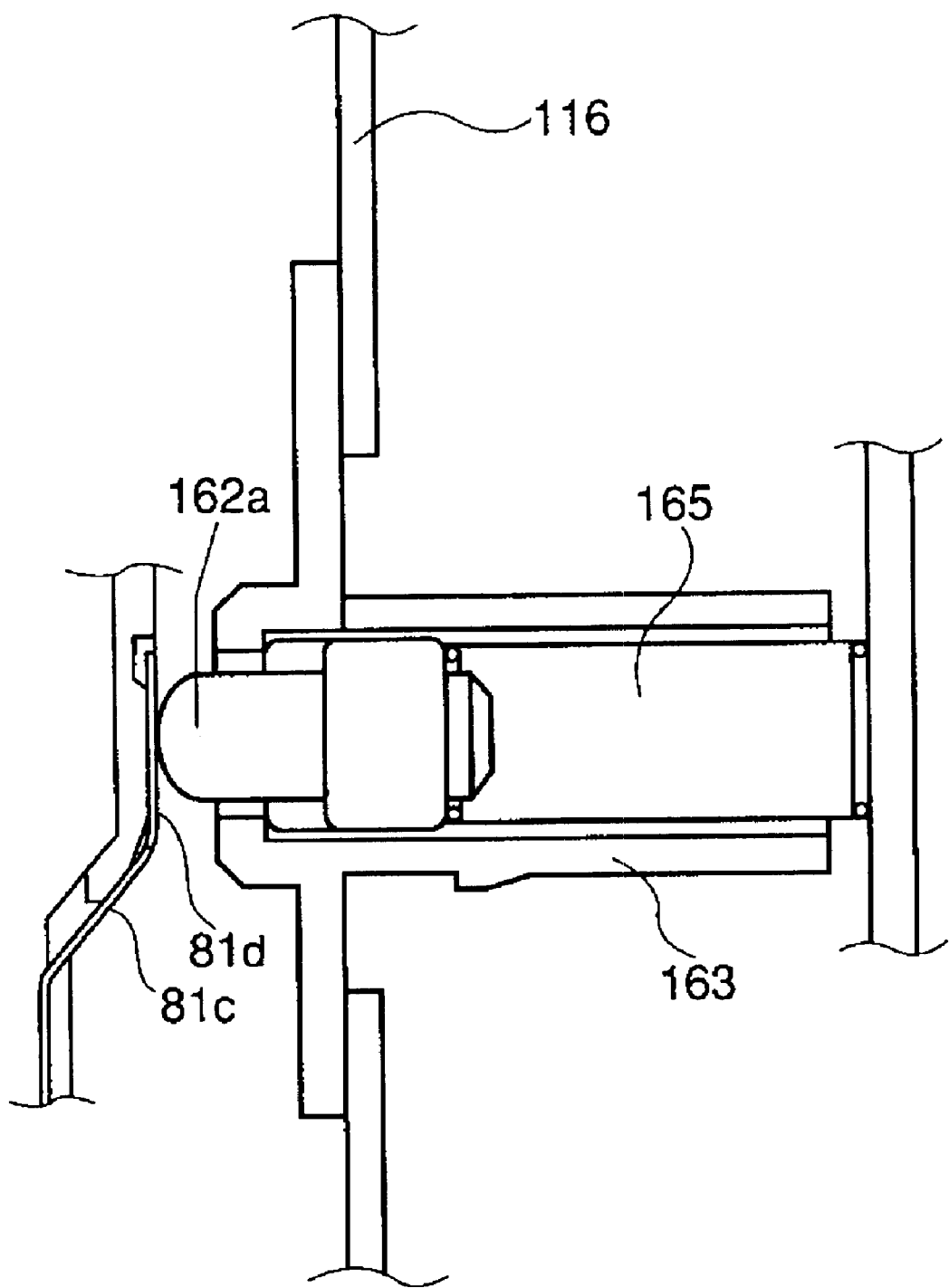
FIG. 31 is a side view of a common input contact of a cartridge as seen in a lateral direction of the apparatus.

Referring to FIGS. 26 through 31, the description will be made as to establishment of electrical connections between the electrical contact of the process cartridge and the main assembly of the apparatus in the mounting and demounting operation of the process cartridge. FIG. 26 is an enlarged view of the space E portion shown in FIG. 23; FIG. 27 is an enlarged view of the space E portion shown in FIG. 25; FIGS. 28 and 29 are views of the new cartridge detection contact as seen from the side of the main assembly of the apparatus; FIGS. 30 and 31 are views of the common cartridge input contact as seen from the side of the main assembly of the apparatus.

The electrical contacts of the main assembly of the apparatus are arranged as shown in FIG. 26. The charging contact 150 and the developing device contact 151 are supported on a high voltage contact unit 153, and are arranged so as to interpose the drum driving female coupling shaft 112 of the main assembly C of apparatus. These electrical contacts are each in the form of a bullet-shaped metal pin having a diameter of 4–8 mm approx. and are supported for movement in the vertical direction on the holder 153a of the high voltage contact unit 153. Below the contacts 150, 151, a compression coil spring 152 is located, and when the process cartridge 15 is placed at the predetermined position, the compression coil spring 152 is compressed to produce a predetermined pressure. The compression coil spring 152 functions also as a high voltage application path. The high voltage contact unit constitutes a unit integrally with the transfer roller 9.

The first toner amount detection contacts 154, 155, 156, and the second toner amount detection contact 157 are all supported on a toner amount detection contacting unit 159, which is disposed between the coupling 132 for the stirring driving and the guiding member 111 which functions as a pivot upon rotation of the process cartridge. These electrical contacts have the same configurations and structures as the electrical contact of the high voltage contact unit.

A new cartridge detection contact 160 contactable to the new cartridge detection electrode spring 79 of the process cartridge 15, and a cartridge presence-absence detection contact 161 (FIGS. 28, 29) contactable to the cartridge presence-absence detection electrode spring 80 of the process cartridge 15, are supported on the cartridge detection contacting unit 163 and disposed above the female coupling shaft 112. These electrical contacts are each in the form of a twisted coil spring wound around a supporting shaft 164a of a supporting table 164 fixed on the cartridge detection contacting unit 163, one end 161a of each of them is folded into a shape of a U to constitute a free end portion 161a1, and the other end portion is in the main assembly of the apparatus and is electrically connected with an unshown detection base. The unit 163 is supported on a frame (rear side plate 116) of the main assembly C of the apparatus.

As shown in FIG. 26, a cartridge detection contacting unit 163 is fixed to the rear side plate 116 of the main assembly C of the apparatus which is seen at the rear end of the cartridge accommodation space E. A common cartridge input contact 162 (FIGS. 30 and 31) is supported on the cartridge contact unit 163 and is disposed between the female coupling shaft 112 and the stirring coupling 132. These electrical contact 162 are each in the form of a bullet-shaped metal pin having a diameter of approx. 4–8 mm and is supported to be movable in the front-rear directions in the main assembly C of the apparatus. To the rear end of the contact 162 which is in the form of a pin, a compression coil spring 165 is connected. When the process cartridge 15 is placed at a predetermined position, the compression coil spring 165 is compressed to produce a predetermined pressure. The compression coil spring 165 also functions as a voltage application path.

The description will be made as to connections with the external contacts of the process cartridge. As shown in FIG. 27, when the process cartridge 15 is accommodated at the predetermined position, urging forces are produced by the springs connected with the respective contacts. More particularly, each of the contact pins of the high voltage contact unit 153 and the toner amount detection contacting unit 159 lower, by which the compression coil springs 152, 158 are compressed, and they are pressed against the external contacts 76b, 77b, 85a, 86a, 87a, 88a shown in FIG. 3 with contact pressures of 50–400 g approx.

In the cartridge presence-absence detection contact, as shown in FIG. 28, the leading end portion 161a thereof is brought into contact to with the end of the external contact 79a when the process cartridge 15 starts to rotate. The same applies to the new cartridge detection contact. When the process cartridge 15 is placed at the predetermined position (FIG. 29), the free end portion 161a slides on the external contact 79a to a predetermined position. At this time, the contact 161 is twisted about the supporting shaft 164a of the supporting table 164 to produce a predetermined voltage against the external contact 79a. The position of the supporting shaft 164a and the position of the free end portion are in a horizontal plane substantially. This is done in order to produce an upward force against the external contact with certainty. In order to escape from the upper side portion 161a2, the external contact 79a is disposed slightly inclined (approx. 10° relative to the horizon).

As shown in FIG. 30, the free end portion of the common cartridge input contact 162 is brought into contact to the inclined surface 81c of the external contact 81a when the process cartridge 15 starts to rotate. When the process cartridge 15 is accommodated at the predetermined position (FIG. 31), the leading end portion 162a slides on the inclined surface 81c to the position of the vertical surface 81d. At this time, the compression coil spring 165 is compressed to produce a predetermined pressure against the external contact 81a. The inclined surface 81c is the same member as the external contact 81a, and the contact 162 is not contacted to the molded surface. The inclined surface 81c is set at an angle of not more than 45° relative to the moving direction (vertical direction) of the contact 162, and therefore, it does not receive a large resistance upon the mounting operation. When the process cartridge 15 is mounted to the main assembly C of the apparatus, the contact 162 does not produce a force tending to raise the process cartridge 15.

As described in the foregoing, the process cartridge is provided with nine external contacts (the contacts for electrical connection with the main assembly of the apparatus except for the drum ground), and the contacts are stably connected with the main assembly without the problems of image defect resulting from development or charging defect, erroneous detection of the presence or absence of the toner seal or the presence or absence of the process cartridge, or the deterioration of the detection accuracy of the toner amount attributable to the change in the electrostatic capacity. Despite the provision of the numerous electrical contacts, the mounting resistance is not large because the contacts occur immediately before the completion of the mounting. In the mounting of the process cartridge, the electrical contacts are not contacted except for the surfaces of the external contact of the process cartridge. In other words, the surface of the side cover supporting the external contacts are not contacted by another member, and therefore, there is less liability that mold dust or chips produced from the mold are attached to the free ends which will result in defective electrical contact.

The distances from the central positions of the respective electrical contacts and the center of the drive input portions to the center of the rotation of the process cartridge, are made different from each other, or the angles formed between the centers of the electrical contacts and the center of the rotation of the process cartridge are larger than the rotation angle 16° of the process cartridge even if the distances are substantially the same. By doing so, they do not interfere with each other during the rotational motion of the process cartridge, and in addition, the arrangement in the main assembly of the apparatus is efficient so as to save space.

As described in the foregoing, the following advantageous effects are provided according to the foregoing Embodiments.

1. In the case that numerous electric contacts are provided on the process cartridge and have to be subjected to pressures, respectively, as in the foregoing embodiments, if the electric energy supply is effected from the main assembly directly to the developing device frame in order to supply electric energy to the developing means having the developer carrying member, the developer amount detecting means and so on, the pressure applied from the developer carrying member to the electrophotographic photosensitive drum may be large, with the result of possibility of the change in the gap between the electrophotographic photosensitive drum and the developer carrying member, resulting in image deficiency. In this invention, this possibility is avoided because the electric energy is supplied to the side cover.

2. The electrical connections are effected through the electrode plate supported on the side cover except for the drum ground (although the drum ground contact is not shown in the Figure, the ground of the drum may be effected through a center hole of the drum flange 22, for example). The accuracy assurance can be effected by controlling the side cover as a unit. The control for avoiding foreign matter deposition on the contact portions is easy.

3. since the electrode side supported on the side cover is resilient, the control of the contact pressure is easy.

4. The electrode spring supported on the side cover is in the form of a U or an L, and therefore, the assured electric contacts can be provided together with a high assured production of resilient pressure in a small space, for the toner seal detection and the toner amount detection for which the input/output voltages are low (approx. 10V) and therefore particularly assured electrical contacts are required.

5. Despite the provision of the numerous electrical contacts, the mounting resistance is not large because the contacts occur immediately before the completion of the mounting.

6. During the mounting and demounting operation, the electrical contacts of the main assembly of the apparatus are not contacted to the process cartridge except for the surfaces of the external contacts of a process cartridge, that is, they are not contacted to the surface of the side cover on which the external contacts are supported. Therefore, there is no liability that dust or chips of the mold which might otherwise be deposited on the free end portion are deposited on the contacts, and therefore, the liability of the improper contact attributable to such an event can be minimized.

7. The distances from the central positions of the respective electrical contacts and the center of the drive input portions to the center of the rotation of the process cartridge, are made different from each other, or the angles formed between the centers of the electrical contacts and the center of the rotation of the process cartridge are larger than the rotation angle 16° of the process cartridge even if the distances arc substantially the same. By doing so, do not interfere with each other during the rotational motion of the process cartridge, and in addition, the arrangement in the main assembly of the apparatus is efficient so as to save space.

(Embodiment 2)

In this embodiment, the frames are connected using a tool, and the electrodes (contact members) are fixed in a manner suitable to such a connection.

(Connecting Method for Connecting Cleaning Frame and Toner Accommodation Frame)

Figure 33:
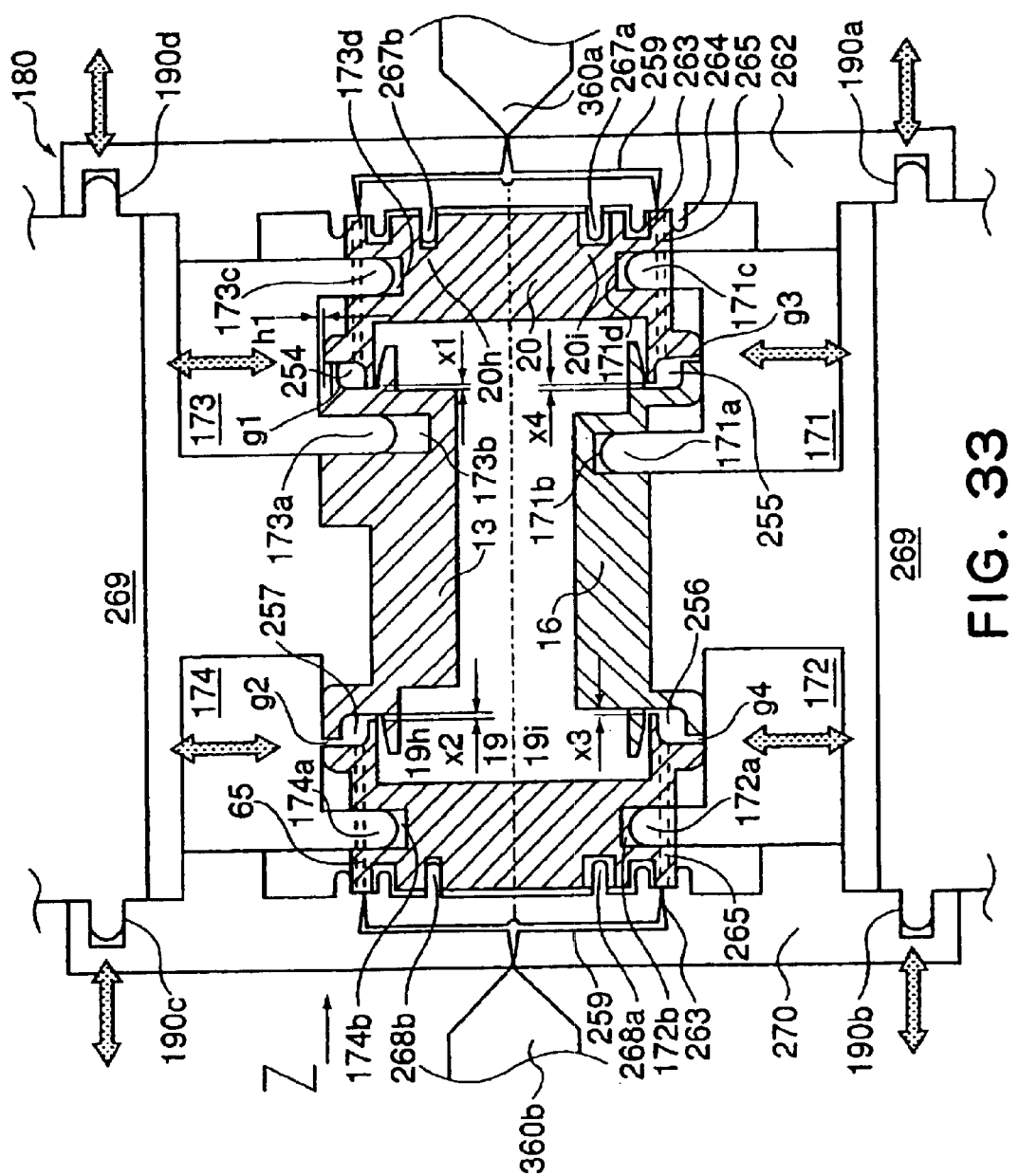
FIG. 33 is a sectional view of a process cartridge and a fixing jig.

In order to connect the frames described hereinbefore with high precision, a fixing jig 180 shown in FIG. 33 is used. This will be described.

1. A method is employed for a structure in which the drum frame 13 and the toner accommodation frame 16 are nipped by side covers 19, 20. A fixing jig 180 is used for connecting the drum frame 13 and the toner accommodation frame 16. The positioning among the side covers 19, 20 and the frames 13, 16 are carried out by inserting projections 171a, 171c, 172a, 173a, 173c, 174a of slides 171–174 of the fixing jig 180 which has been correctly positioned with high precision into recesses 171b, 171d, 172b, 173b, 173d, 174b of the covers 19, 20 and the frames 13, 16. Molten resin material is supplied into molten resin material injection portions 254, 255, 256, 257 constituted by the side covers 19, 20 and the frames 13, 16. By doing so, they are integrated with high accuracy.

2. A method is employed for a structure in which the drum frame 13 and the toner accommodation frame 16 are nipped by side covers 19, 20. A fixing jig 180 is used for connecting the drum frame 13 and the toner accommodation frame 16. A fixing jig 180 for connecting them is used, and the side covers 19 and 20 are correctly positioned with high precision in two directions (x, y) which are orthogonal with each other and which are perpendicular to the longitudinal direction. Projections 267a, 267b, 268a, 268b of connection base-plates 262, 270 are inserted into recesses 19h, 19i, 20h, 20*i* of the side covers 19, 20 (recesses 19*i*, 20*i* are elongated in the direction connecting the recesses 19*h*, 19*i*, 20*h* and 20*i*, 20*h* 20*i* being used to determine the position in the rotational direction). Then, molten resin material is supplied into molten resin material injection portions 254, 255, 256, 257 constituted by the side covers 19, 20 and the frames 13, 16, so that they are integrated. With this method, a twisting of the process cartridge 15 between the side covers 19, 20 can be controlled by the accuracy of the connection base plates 270 and 262. The accuracies of the connection base plates 270 and 262 in the orthogonal directions (x, y) perpendicular to the longitudinal direction and the longitudinal direction, can be controlled by the machining accuracy of the connection base plates 262, 270 and by the engaging portions (190*a*, 190*b*, 190*c*, 190*d* portion) between the connection base plate and the engaging portion (190*a*, 190*b*, 190*c*, 190*d* portions) of the intermediary connection jig 269.

The detailed description will be made as to the structures.

Figure 35:
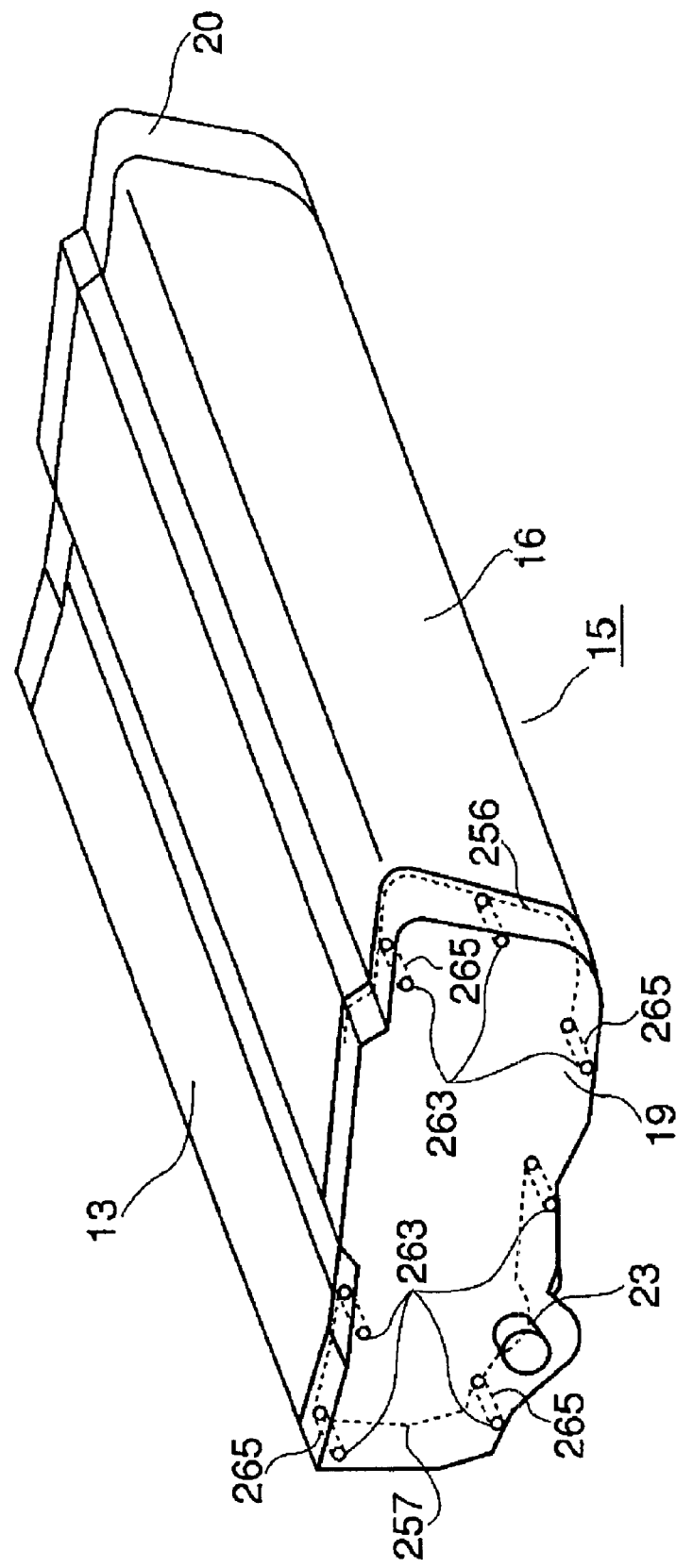
FIG. 35 is a perspective view illustrating a resin material flow path for the process cartridge.

FIG. 35 is a process cartridge 15 which has been assembled.

Between opposing surfaces between the side covers 19, 20 and the drum frame 13 and between the side covers 19, 20 and the toner accommodation frame 16, there is provided molten resin material injection portions 254, 257, 255, 256 which are gaps (the molten resin material injection portions 254, 255 of the side cover 20 are omitted in the Figure). The side covers 19, 20 are each in the form of a container, and the end portions of the side covers 19, 20 opposed to the end surfaces 13*f*, 13*f* at the opposite longitudinal ends of the drum frame 13 and opposed to the end surfaces 16*g*, 16*g* of the toner accommodation frame 16, are in the form of closed lines, respectively, extending along the outer peripheries of the side covers 19, 20.

Figure 32:
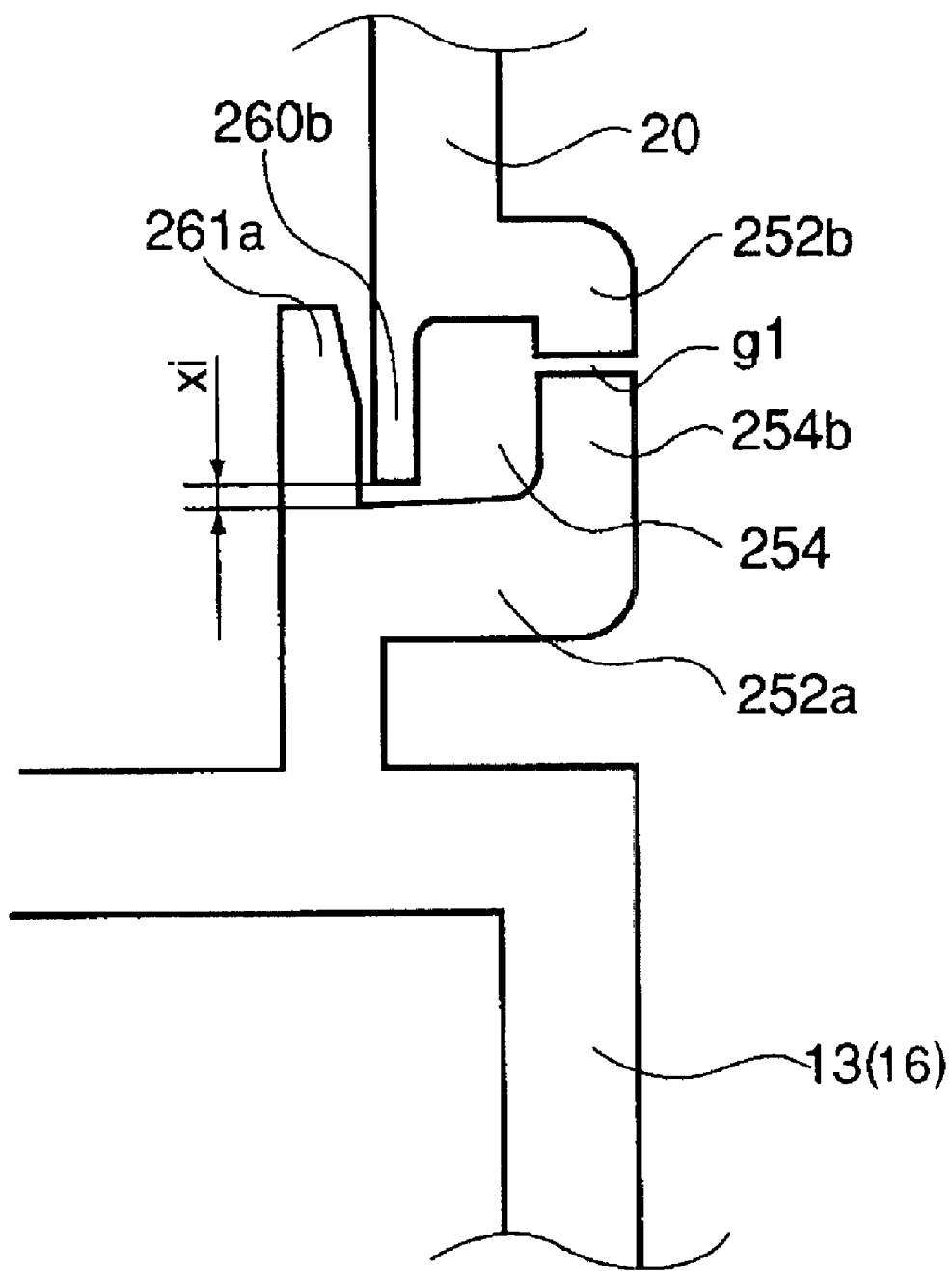
FIG. 32 is a longitudinal sectional view of a connecting portion of the process cartridge according to an embodiment of the present invention.

FIG. 32 shows a structure of the molten resin material injection portion 254. FIG. 32 is a sectional view of the molten resin material injection portion 254. FIG. 32 takes a molten resin material injection portion 254 between the drum frame 13 and the side cover 20 as a typical example. It will be understood that the molten resin material injection portion between the side cover 19 and the drum frame 13 and the molten resin material injection portion between the side covers 19, 20 and the toner accommodation frame 16 are similar in the structures.

As shown in FIG. 32, the drum frame 13 is provided with a flange 252*a*. A rib 254*b* is integrally provided at the outer periphery of the flange 252*a*. The inner surface side of the flange 252*a* is provided with an integral back-up rib 261*a*. The side cover 20 is provided with a flange 252*b*. The flange 252*b* is provided with an integral rib 260*b*. The outer periphery side surface of the flange 252*b* of the side cover 20 is faced to the rib 254*b* of the drum frame 13. The rib 260*b* of the side cover 20 is contacted to the back-up rib 261*a* of the drum frame 13, or opposed thereto with a small gap, and it is supported by the back-up rib 261*a* when the molten resin material injected into the molten resin material injection portion 254 is deformed by the temperature and pressure. The back-up rib 261*a* is effected to suppress the deformation of the rib 260*b* of the side cover 20, which is unable to be supported by a jig.

The molten resin material injection portion 254 is provided only at the end surface 13*f* of the drum frame 13 and the end surface 16*g* of the toner accommodation frame 16. These end portions are substantially closed by the closeness or abutment between the drum frame 13 and the side cover 20, so that injected molten resin material does not leak out of the molten resin material injection portion 254, or even if it leaks, the leakage is not significant because a slide 173 is close to the end surfaces of the drum frame 13 and the slide 173, as shown in FIG. 33, the gap h1 being not more than 0.4 mm approx. The molten resin material injection portion 254 is divided into a portion for the drum frame 13 and a portion for the toner accommodation frame 16. The portion for the drum frame 13 and the portion for the toner accommodation frame 16 may be one continuous path, or separated paths. For the molten resin material injection portions 254 which are connected inside, at least one resin material injection flow path 265 is provided. The resin material injection flow path 265 provides a fluid communication between the outside of the ends of the side covers 19, 20 and the molten resin material injection portion 254.

Figure 34:
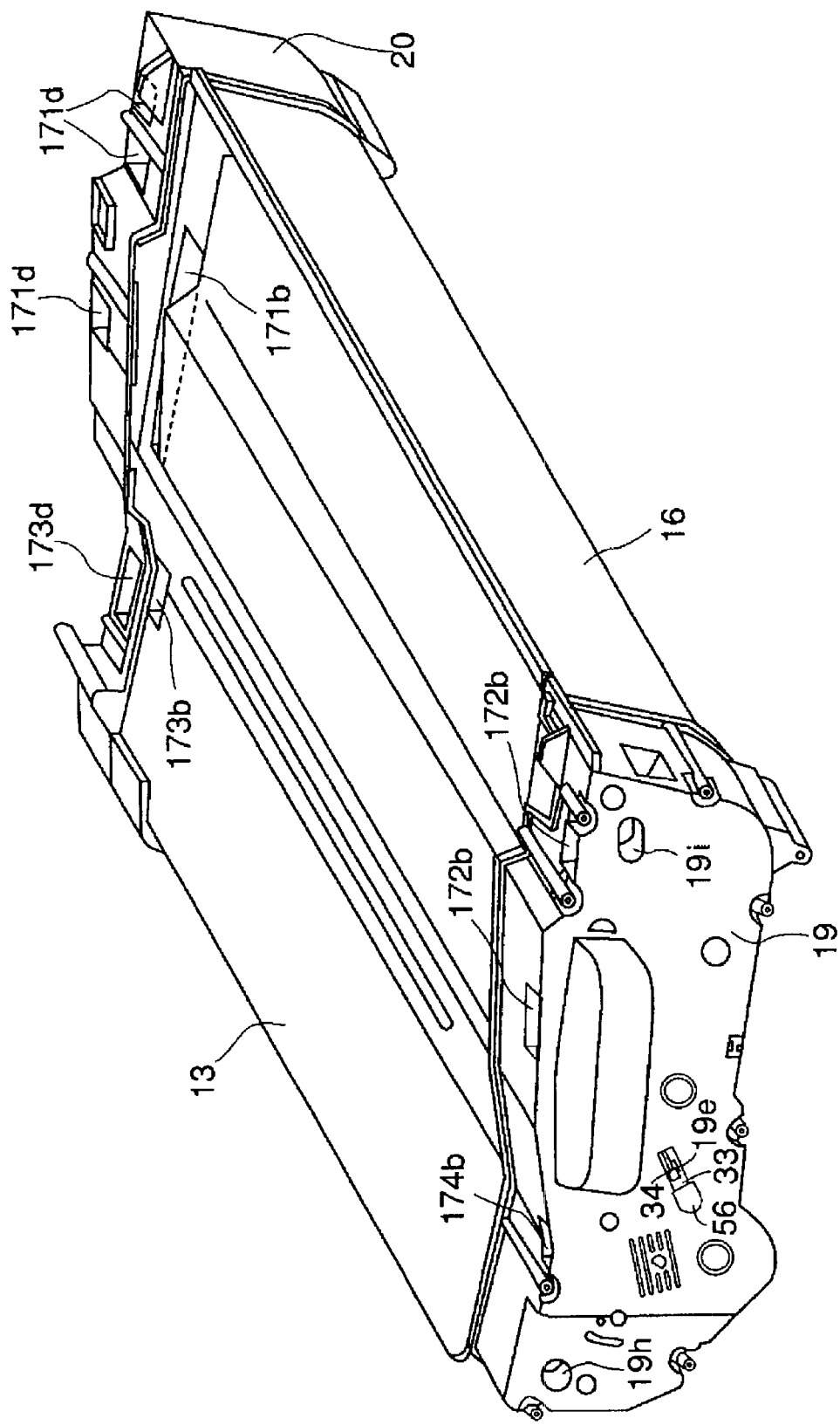
FIG. 34 is a perspective view of a process cartridge as seen from a front upper side with respect to a mounting direction.

FIG. 34 is a perspective view of a process cartridge 15 as seen inclined only from an upper portion with respect to the mounting direction.

As shown in FIG. 34, the outer periphery of the side cover 20 is provided at a position corresponding to the drum frame 13 with a recess 173*d*. The recess 173*d* is provided at each of the upper sides of the side cover 20 as shown in FIG. 34 and the lower side as shown in FIG. 3. Correspondingly, the drum frame 13 is provided with a recess 173*b* which is opposed to the recess 173*d* with respect to the longitudinal direction. The outer periphery of the side cover 20 is provided at the position corresponding to the toner accommodation frame 16 with a recess 171*d*. As shown in FIG. 34, the recess 171*d* is provided at two positions at the proper side and at one position at the lower side as shown in FIG. 3. The toner accommodation frame 16 is provided with a recess 171*b* which is adapted to be opposed to the recess 171*d* with respect to the longitudinal direction. Only one recess 171*b* is provided corresponding to the two recesses 171*d* of the side cover 20. Therefore, the upper portion of the toner accommodation frame 16 is reinforced by upper and lower wall plates constituting the recess 171*b*.

The recesses 171*b*, 171*d*, 173*b*, 173*d* each have walls in the direction perpendicular to the longitudinal direction and constitute a rectangular shape.

The widths measured in the longitudinal direction and the positions of the recesses 171*d*, 173*d* of the side cover 20 are manufactured under precise dimension control for the respective parts. The widths measured in the longitudinal direction and the positions of the recess 173*b* of the drum frame 13 and the recess 171*b* of the toner accommodation frame 16 are manufactured under precise dimension control for the respective parts. These recesses function to regulate the positional relations, in the longitudinal direction, among the side cover 20, the drum frame 13 and the toner accommodation frame 16, and the jigs which will be described hereinafter are engaged with the recesses. The specific dimensional tolerances will be described hereinafter.

The outer periphery of the side cover 19 is provided with recesses 172*b*, 174*b* at positions substantially corresponding, in the longitudinal direction, to the recesses 171*d*, 173*d* provided in the side cover 20. The width and the position, in the longitudinal direction, of the recesses 172*b*, 174*b* are manufactured under precise dimension control in the longitudinal direction. The configurations of the recesses 172*b*, 174*b* are rectangular, similar to the recesses 171*d*, 173*d* of the side cover 20.

The description will be made as to the positioning, in the direction perpendicular to the longitudinal direction, of the drum frame 13, the toner accommodation frame 16 and the side covers 19, 20 when they are positioned correctly by a fixing jig 180 (FIG. 33) when the drum frame 13 and the toner accommodation frame 16 are nipped by the side covers 19, 20 and they are connected by molten resin material, and as to the structures provided in the side covers 19, 20 to prevent rotation about an axis extending in the longitudinal direction. As shown in FIG. 34, the end plates of the side cover 19 are provided with a recess 19h.

The recess 19h is cylindrical and is provided on the drum frame 13 side. The end plate of the side cover 19 is provided with a recess 19h for preventing relative rotation at a position sufficiently away from the recess 19h. The recess 19i is disposed at a further remote side of the toner accommodation frame 16 as seen from the recess 19h. The recess 19i is in the form of an elongated groove having such a width measured in a direction perpendicular to a line connecting the centers of the positioning recess 19h and the rotation preventing recess 19i and is snugly fitting with a cylindrical projection 268a of the fixing jig 180.

Similarly, the side cover 20 is provided with a positioning recess 20h and a rotation preventing recess 20i (FIG. 3).

As described hereinbefore, the developing device frame 17 having the developing means 20, the developing sleeve 18, the developing blade 40 and so on is connected with the drum frame 13 having the photosensitive drum 11, the charging roller 12, the cleaning blade 14 and so on, using a hook-like hole 179a, the parallel pin 57 (FIG. 1), the developing device bearing member 56 engaged with the groove 19e (elongated hole) provided in the side cover 19 (FIG. 34), the guiding member 33, and the developing device pressing spring 34. Then, the toner stirring members 60, 61, 62 are assembled into them. The sealing member 21 is provided to seal between the toner accommodation frame 16 and the developing device frame 17, and with this state maintained, the side covers 19, 20 are temporarily mounted to the end surfaces 13f and 16g of the toner accommodation frame 16 and the drum frame 13.

In the temporary mounting, as has been described in conjunction with FIG. 4, the positioning portions 19b, 20b of the side covers 19, 20 are engaged with the positioning portions 13b of the end surfaces 13f of the drum frame 13, respectively, and the bearing members 22, 23 engaged with the holes 13a and 13g of the end surface 13f of the drum frame 13 is engaged with the hole portions 19a, 20e of the side covers 19, 20 in the longitudinal direction, respectively. Furthermore, the positioning portions 19c, 19d and 20c, 20d of the side covers 19, 20 are engaged with the positioning portions 16a, 16b (only one side is shown in the figure) provided on the opposite end surfaces 16g of the toner accommodation frame 16 in the longitudinal direction. By such a temporary mounting, the lateral positions of the frames 14, 16 are determined. However, the relative position between the drum frame 13 and the toner accommodation frame 16 in the longitudinal direction are not determined. In this embodiment, the drum frame 13 and the toner accommodation frame 16 are positioned in the longitudinal direction using the fixing jig 180 through one of the side covers 20.

Referring to FIG. 33, the description will be made as to the fixing jig 180. As shown in the figure, the fixing jig 180 has a slide 173 provided with projections 173a, 173c correctly engaged with the recess 173b of the drum frame 13 and the recess 173d of the side cover 20.

The slide 173 reciprocates in a direction perpendicular to the longitudinal direction indicated by the arrow (vertical in FIG. 33) using an unshown fluid pressure cylinder and guideway, and the projections 173a, 173c can take a position for engagement at a position away from the recesses 173b, 173d.

It is further provided with a slide 171 having projections 171a, 171c snugly fitting with the recess 171b of the toner accommodation frame 16 and the recess 171d of the side cover 20, respectively. The slide 171 reciprocates in a direction perpendicular to the longitudinal direction indicated by the arrow (vertical in FIG. 33) using an unshown fluid pressure cylinder and guideway, and the projections 171a, 171c can take a position for engagement at a position away from the recesses 171b, 171d.

The slides 171, 173 are disposed at a predetermined position with respect to the longitudinal direction, and are movable oppositely in the longitudinal direction.

The slides 172, 174 having projections 172a, 174a snugly fitting with the recesses 172b, 174b of the side cover 19 move in the direction perpendicular to the longitudinal direction. The moving directions of the slides 172, 174 are parallel with the moving direction of the slides 171, 173. The slides 171, 172 are disposed at accurate positions with respect to the longitudinal direction. The slides 173 and 174 are disposed at accurate positions with respect to the longitudinal direction. The slides 172, 174 are moved in the directions opposite to each other. The slides 172 and 174 reciprocate in a direction perpendicular to the longitudinal direction indicated by the arrow using an unshown fluid pressure cylinder and guideway, and the projections 172a and 174a can take a position for engagement at a position away from the recess 172b and 174b.

The projections 171a, 171c, 172a, 173a, 173c, 174a of the fixing jig 180 never abut the bottom of the recesses 171b, 171d, 172b, 173b, 173d, 174b. The slides 171–174 are close to the gaps g1, g2, g3 and g4 between the drum frame 13 and the side cover 19, 20 connecting from the molten resin material injection portions 254, 255, 256, 257 to the outside, at positions at a position closer toward the process cartridge 15, but are not contacted to the cartridge frame. Here, the gap g1 may be zero.

The description will be made as to a structure for preventing the process cartridge 15 from rotating about an axis in the longitudinal direction.

There are provided connection base plates 262, 270 integrally having projections 268b, 267b engaged with the positioning recesses 19h, 20h of the side cover 19, 20 of the process cartridge 15 and projection 268a, 267a engaged with rotation preventing recesses 19i, 20i of the side cover 19, 20. The connection base plates 262, 270 are movable in a direction perpendicular to the moving direction of the slides 171–174. With this structure, in the temporarily assembled process cartridge 15, the projections 267b, 268b of the connection base plates 262, 270 are engaged with the positioning recesses 19h, 20h provided in the side covers 19, 20. The process cartridge 15 tends to rotate about a center line passing through the projection 267b, 268b of the connection base plates 262, 270, but the engagement between the projections 267a, 268a of the connection base plates 262, 270 with the oval recesses 19i, 20i, so that rotation is prevented. The connection base plates 262, 270 are advanced or retracted in the longitudinal direction by the unshown fluid pressure cylinder and the guideway. The positioning recesses 19h, 20h of the side cover 19, 20 are on one line in the longitudinal direction in the state that the process cartridge 15 is temporarily assembled, in this embodiment. By doing so, the fixing jig 180 can be correctly positioned. However, it is not inevitable that the positioning recesses 19h, 20h are arranged on one longitudinal line.

With the process cartridge 15 having been temporarily assembled, the slides 171–174 are advanced so that positioning in the longitudinal direction is accomplished, and then, the connection base plates 262, 270 are advanced so that positioning in the direction perpendicular to the longitudinal direction and the rotational direction is accomplished. As regards the positioning in the direction perpendicular to the longitudinal direction, the front end is determined by the connection base plates 262, 270 abutting the intermediary connecting jig 269 which is the main body of the fixing jig. At this time, the temporarily assembled process cartridge 15 is not pressed by the connection base plates 262, 270, so that positioning in the longitudinal direction between the drum frame 13 and the toner accommodation frame 16 and the side covers 19, 20 by the slide 171–174 is not influenced.

As shown in FIG. 4, in the process cartridge 15, edges of the side covers 19 and 20 are connected to the peripheral edges of the opposite longitudinal end surfaces 13f of the drum frame 13 (longitudinal direction of the drum frame 13, namely, a direction parallel with the axial direction of the photosensitive drum 11). The edges of the side covers 19, 20 are connected to the peripheral edges of the opposite longitudinal end surfaces 16g of the toner accommodation frame 16.

FIGS. 32 and 33 are sectional views of the connecting portions between the peripheral edges of the end surfaces 13f of the drum frame 13 or the peripheral edges of the end surfaces 16g and, 16g of the toner accommodation frame 16 and the edges of the side covers 19, 20, taken along a plane perpendicular to the inside-outside direction of the edges.

The configurations of the molten resin material injection portions 254, 255, 256, 257 shown in FIG. 33 are similar but the dimensions of different combinations between the frames 13, 16 and side covers 19, 20 are different.

The reference in the longitudinal direction of the process cartridge 15 is the recess 173b of the drum frame 13, and the position of the product in the longitudinal direction is determined by the connecting fixing jig 180. Therefore, gaps x1, x2, x3, x4 are provided between the opposite end surfaces 13f of the drum frame 13 and the opposite fixing jigs 180 and determination of the toner accommodation frame 16 and the side covers 19, 20 in view of the tolerances of the parts such that no interference occurs between the parts or containers even with the worst case within the tolerances. The gaps xi (I=1–4) are the distances between the flange (252a) of the frame 13 or 16 and the rib (260b) of the side covers 19, 20 (FIG. 32).

The above-described gaps Xi xi are approx. 1 mm.

More particularly, the manufacturing tolerances of the drum frame 13, the toner accommodation frame 16 and the side covers 19, 20 per se are determined such that gaps x1, gi are 0–0.2 mm; the gaps x2, g2, x3, g4 are 0–0.9 mm; the gaps x4, g3 are 0–0.9 mm.

In any of these connecting structures shown in FIGS. 32, 33, the frames 13, 16, 19, 20 of the resin material to be connected are temporarily connected in the fixing jig 180. In FIG. 33, the resin material ejected from a molten resin material injection apparatuses 360a, 360b flows through a run-away 259 and a gate 263 in the fixing jig 180 and through the resin material injection flow path 265 in the side cover 19, 20. Then, it is injected into the molten resin material injection portions 254, 255, 256, 257 which are formed by the side covers 19, 20 and the frames 13, 16 and to which the resin material injection flow path 265 is open.

The material to be injected is high impact polystyrene HI-PS of a flame resisting grade, and the drum frame 13, the toner accommodation fame 16 and the side cover 19, 20 are molded from the high impact polystyrene HI-PS material, respectively.

The materials of the drum frame 13, the toner accommodation frame 16 and the side cover 19, 20 and the injection material may be acrylonitrile butadiene styrene copolymer resin material ABS resin material, modified polyphenylene ether resin material mPPE, modified polyphenylene oxide PPO or the like.

The positioning in the process cartridge 13 is carried out in the manner described above, and then the molten resin material is injected into the molten resin material injection portions 254–257, and therefore, the twisting deformation which may occur when the side covers 19, 20 are mounted to the drum frame 13 and to the toner accommodation frame 16 by screws, does not occur. The molten resin material injection portions 254–257 have small cross-sections and are enclosed by ribs and flanges having large cross-sections as compared with the cross-sections of the portions 254–257, and therefore, the rib and the flange provide a sufficiently large thermal capacity against the thermal load of the molten resin material. For this reason, the deformations of the drum frame 13, the toner accommodation frame 16 and the side cover 19, 20 are negligibly small as compared with the screwing.

(Path and Fixing Method of Electrical Contact Parts)

The electrical contact parts are fixed using the frame connecting method by the molten resin material described in the foregoing, by which the electrical contact parts can be firmly fixed, so that margins for the positional deviation or turning-up can be significantly enhanced. The structures will be described in detail.

Referring to FIG. 16 which is a perspective view of the side cover 20, the description will be made as to the charging contact member 76 and the developing device contact member 77 provided on the side cover 20. The charging contact member 76 is, a contact member for applying a bias voltage to the charging roller 12 from the main assembly C of the image forming apparatus. The contact spring portion 76a, in the state in which it is assembled with the side cover 20, is contacted to the contact surface 75b of the charging contact plate 75 at the cleaning frame side shown in FIG. 15 to establish an electrical connection with the charging roller 12. The external contact 76b of the charging contact member 76 is contacted to the charging contact 150 provided in the main assembly of the image forming apparatus when the process cartridge 15 is positioned in the main assembly C of the image forming apparatus. The developing device contact member 77 is a contact member for applying a bias voltage to the developing sleeve 18 from the main assembly C of the image forming apparatus. The spring portion 77a functioning as the electric contact is contacted to the electroconductive developing device contact shaft 78 which is integrally molded with the side cover 20. As to the developing device contact member 77, in the state of being temporarily assembled with the side cover 20, the sleeve contact plate 93 (FIG. 18) which is provided in the developing sleeve and which is electrically connected with the developing sleeve 18 and the free end of the developing device contact shaft 78 of the side cover 20 are contacted to each other, so as to be electrically connected with the developing sleeve 18.

The external contact 77b of the developing device contact member 77 is contacted to the developing device contact 151 (FIG. 27) provided in the main assembly of the image forming apparatus when the process cartridge 15 is positioned to the main assembly C of the image forming apparatus. The description will be made as to the case in which the charging contact member 76 and the developing device contact member 77 are fixed by the molten resin material.

Figure 37:
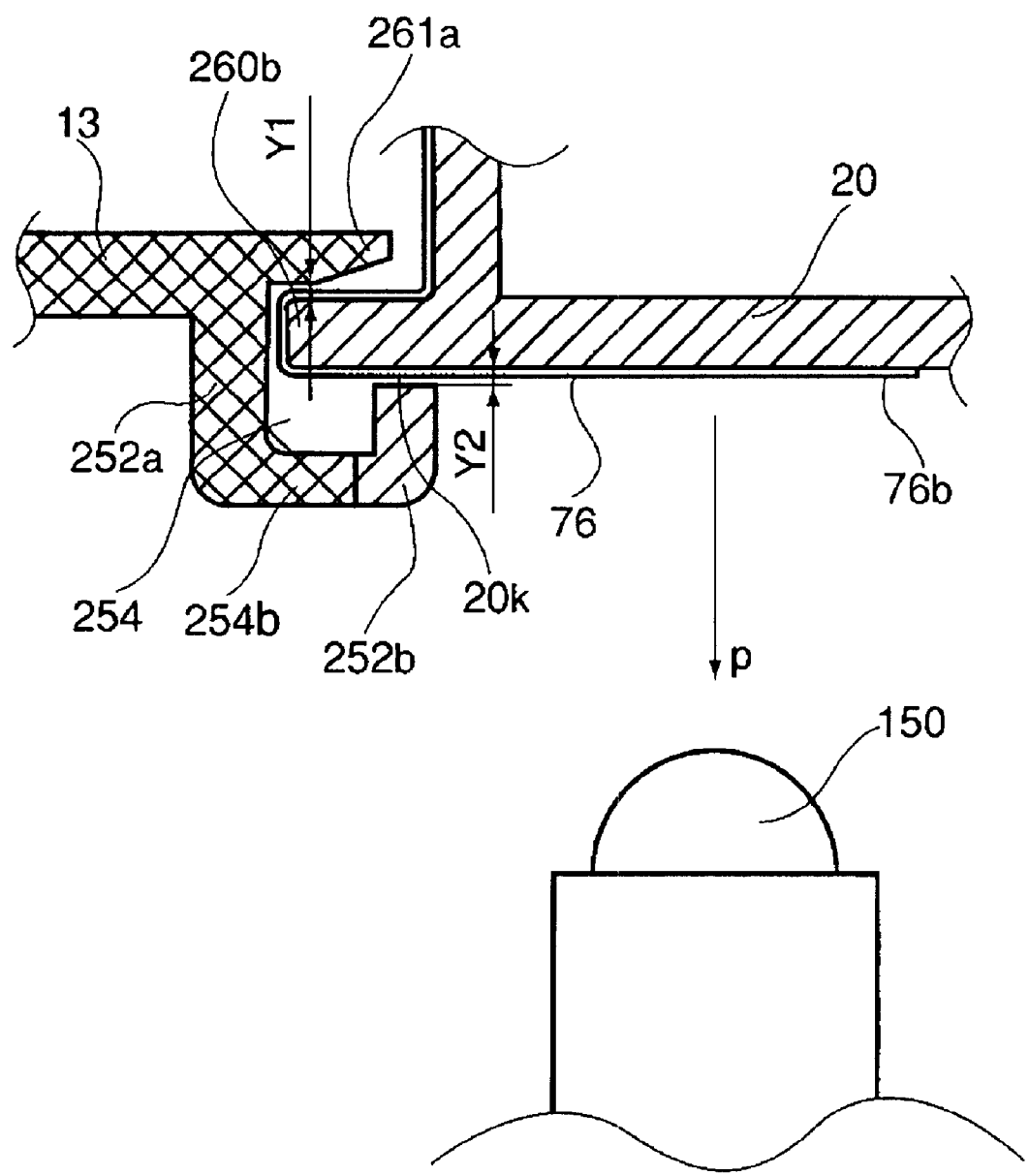
FIG. 37 is a longitudinal sectional view of a side cover and a cleaning frame illustrating contact dispositions according to an embodiment of the present invention.

The side cover 20 is provided with a through-hole for permitting penetration of the charging contact member 76 and the developing device contact member 77 during molding, the through-hole 20k (the same applies to the developing device contact member 77 although FIG. 37 deals with only the charging contact member 76) is formed such that outer surface of the side cover 20 and the surface facing the molten resin material injection portion 254 of the rib 260b are substantially flush with the base portion of the flange 252b of the side cover 20.

Figure 36:
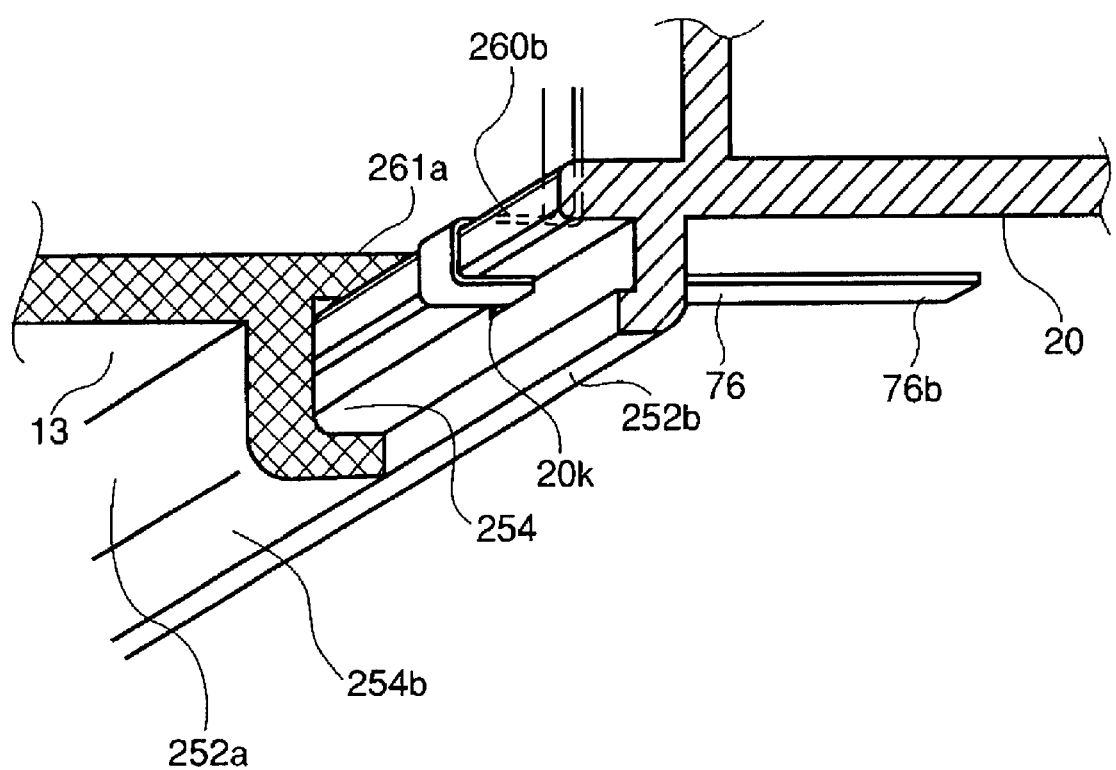
FIG. 36 is a perspective sectional view of a cleaning frame and a side cover illustrating contact dispositions according to an embodiment of the present invention.

FIG. 36 is a perspective view of the charging contact member 76. The charging contact member 76 has such a configuration that it is substantially closely contacted to all around the rib 260b of the side cover 20. The flange 252b of the side cover 20 is provided with a through-hole 20k, and the charging contact member 76 is penetrated through the through-hole 20k, and the external contact 76b is disposed close to the outer surface (lower surface) of the side cover 20. By the temporary assembly, the charging contact member 76 is covered with the flange 252a and the back-up rib 261a. In the frame connecting method described above, the drum frame 13 and the side cover 20 are temporarily assembled using the fixing jig 180, and then, the molten resin material is injected into the molten resin material injection portion 254. At this time, the charging contact member 76 is also fixed by the molten resin material. The hole having an erected portion of the charging contact member 76 as shown in FIG. 16 is engaged with the dowel 20j provided in the side cover 20 before the resin material connection. With this state, they are fixed by the molten resin material, by which the base portion is firmly fixed. By doing so, a stabilized electric conduction is accomplished without the positional deviation or turning-up of the spring portion 76a at the free end of the charging contact member 76. As shown in FIGS. 36, 37, the charging contact member 76 is substantially closely contacted to the rib 260b of the side cover 20, and therefore, the flow of the molten resin material is not impeded.

FIG. 37 is a sectional view of the charging contact member 76. The charging contact member 76, the drum frame 13 and the side cover 20, are spaced with gaps from the flange 252a of the drum frame 13 and the back-up rib 261a so as to avoid the charging contact member 76 abutting the flange 252a of the drum frame 13 and the back-up rib 261a to limit the positional relation between the drum frame 13 and the side cover 20. The gap Y1 including the charging contact member 76 between the rib 260b and the back-uprib 261a is approx. 0.4 mm when the plate thickness of the charging contact member 76 is taken into the consideration, but with this gap, the molten resin material does not leak because of the gap and the pressure of the molten resin material. The gap Y2 between the charging contact member 76 provided in the flange 252b and the through-hole 20k is 0.3 mm approx. at the maximum when the plate thickness of the charging contact member 76 is taken into consideration, and this is sufficiently small to prevent the leakage of the molten resin material.

After the process cartridge 15 is constituted by the injection of the molten resin material, the process cartridge 15 is mounted to the main assembly C of the image forming apparatus. At this time, the entirety of the process cartridge moves in the direction indicated by an arrow p, so that external contact 76b of the charging contact member 76 of the process cartridge is brought into contact to the charging contact 150 of the main assembly of the apparatus, thus establishing the electrical connection. With respect to the developing device contact member 77 for application of the bias voltage to the developing sleeve 18, the relation among the developing device contact member 77, the toner accommodation frame 16 and the side cover 20 is the same as with the foregoing with respect to the molten resin material connecting portion.

As described in the foregoing, the contact members 76, 77 are not concerned with the molding of the side cover 20, the drum frame 13 and the toner accommodation frame 16, so that an insertion step is not required in the molding operation. What is done is to dispose the contact members 76, 77 so as to face the connecting molten resin material when the side cover is connected by the resin material with the frames 13, 16. The manufacturing steps that are in effect are the same as disposing the contact members 76, 77 so as not to face the connecting molten resin material. In addition, the contact members 76, 77 each having one bore with erected portion for one-way motion can be securely fixed. The external contacts for the charging and development are fixed at the portions where the resin material connection is effected, and therefore, the distance from the external contact surface and the fixed portion is small, and the external contacts are protected from the positional deviation or turning-up due to being touched by fingers or the like.

The fixing of the electrical contact parts described in the foregoing, can be employed for the contact parts other than the developing sleeve and the charging roller, and the stabilized contact member can be provided by the fixing method using the molten resin material.

According to the foregoing embodiments, the drum frame and the developer accommodation frame are supported by the frame, and the external charging electrode and the external developing electrode are provided on the frame effective to position the process cartridge relative to the main assembly of the image forming apparatus, and therefore, the positions of the electrodes are correctly determined, thus establishing stabilized electrical connections.

By employing the electrical contact part fixing method using the frame connecting method, according to which high precision in the longitudinal direction of the process cartridge and the reduction of twisting are accomplished, it is not necessary to insert the electrical contact parts during the molding of the parts to be connected. Thus, the margin against the positional deviation or turning-up of the electrical contacts is significantly improved. When the process cartridge is process mounted to the main assembly of the apparatus, the electrical connection is stably established between the process cartridge and the main assembly of the apparatus.

While the invention has been described with reference to the structures disclosed herein, it is not confined to the details set forth and this application is intended to cover such modifications or changes may come within the purpose of the improvements or the scope of the following claims.

What is claimed is:

1. A process cartridge detachably mountable to a main assembly of an electrophotographic image forming apparatus, said process cartridge comprising:

an electrophotographic photosensitive drum;

a developing member configured and positioned to develop an electrostatic latent image formed on said electrophotographic photosensitive drum with a developer;

a charging member configured and positioned to electrically charge said electrophotographic photosensitive drum;

a drum frame supporting said charging member and said electrophotographic photosensitive drum;

a developer accommodation frame having a developer accommodating portion configured to accommodate the developer;

a developing frame supporting said developing member, said developing frame being movable relative to said drum frame and said developer accommodation frame;

a first supporting frame supporting said drum frame and said developer accommodation frame adjacent one longitudinal end of said electrophotographic photosensitive drum, wherein said first supporting frame is positioned relative to the main assembly of the apparatus when said process cartridge is mounted to the main assembly of the apparatus;

a second supporting frame supporting said drum frame and said developer accommodation frame adjacent the other longitudinal end of said electrophotographic photosensitive drum;

a developing bias contact, provided on said first supporting frame, configured and positioned to receive a developing bias voltage applied to said developing member from the main assembly of the apparatus when said process cartridge is mounted to the main assembly of the apparatus; and a charging bias contact, provided on said first supporting frame, configured and positioned to receive a charging bias applied to said charging member from the main assembly of the apparatus when said process cartridge is mounted to the main assembly of the apparatus.

2. A process cartridge according to claim 1, wherein said developing bias contact and said charging bias contact are disposed opposed to each other at one and the other sides with respect to a direction crossing said photosensitive drum, and are provided on said first supporting frame and are exposed such that when said process cartridge is mounted to the main assembly of the apparatus, said developing bias contact and said charging bias contact face downward.

3. A process cartridge according to claim 1 or 2, wherein said drum frame and said developer accommodation frame are fixed to said first supporting frame by resin material at a fixing portion, and said developing bias contact and said charging bias contact are fixed by the resin material at the fixing portion.

4. A process cartridge according to claim 3, wherein said first supporting frame includes a first portion to be supported by the main assembly of the apparatus to position said first supporting frame relative to the main assembly of the apparatus when said process cartridge is mounted to the main assembly of the apparatus.

5. A process cartridge according to claim 1 or 2, wherein said first supporting frame includes a first portion to be supported by the main assembly of the apparatus to position said first supporting frame relative to the main assembly of the apparatus when said process cartridge is mounted to the main assembly of the apparatus.

6. A process cartridge according to claim 5, wherein said second supporting frame includes a second portion to be positioned relative to the main assembly of the apparatus when said process cartridge is mounted to the main assembly of the apparatus, and said second portion to be positioned is in the form of a projection projected from said second supporting frame at a portion of said second supporting frame which becomes a bottom surface when said process cartridge is mounted to the main assembly of the apparatus.

7. A process cartridge according to claim 5, further comprising a coupling configured and positioned to receive a rotational driving force for rotating said photosensitive drum from the main assembly of the apparatus when said process cartridge is mounted to the main assembly of the apparatus, wherein said coupling is rotatably supported in a cartridge frame by a bearing which is supported by both of said drum frame and said first supporting frame.

8. A process cartridge according to claim 7, wherein said first supporting frame is provided at a leading end with respect to a mounting direction in which said process cartridge is mounted to the main assembly of the apparatus.

9. A process cartridge according to claim 5, wherein said first portion to be supported is in the form of a projection projected from said first supporting frame at a portion of said first supporting frame which becomes a bottom surface when said process cartridge is mounted to the main assembly of the apparatus.

10. A process cartridge according to claim 1, wherein said developing frame is supported by said drum frame such that said electrophotographic photosensitive drum and said developing member are substantially parallel with each other, and said developing frame and said developer accommodation frame have respective openings for permitting passage of the developer, and wherein said developing frame and said developer accommodation frame are disposed such that their respective openings are opposed to each other with a gap therebetween.

11. A process cartridge according to claim 10, further comprising process cartridge detecting means for detecting mounting of said process cartridge to the main assembly of the apparatus, and cartridge output/input contacts configured and positioned to output/input voltages between said detecting means and the main assembly of the image forming apparatus, and wherein said cartridge output/input contacts are supported on said first supporting frame.

12. A process cartridge according to claim 11, further comprising a toner seal member covering said opening of said developer accommodation frame, toner seal presence or absence detecting means for detecting the presence or absence of said toner seal member, and toner seal input/output contacts configured and positioned to output/input voltages for said toner seal presence or absence detecting means, wherein said toner seal input/output contacts are supported on said first supporting frame.

13. A process cartridge according to claim 12, further comprising toner amount detecting means for detecting an amount of the developer in said developer accommodation frame, and toner amount detection output/input contacts configured and positioned to output/input voltages between said toner amount detecting means and the main assembly of the image forming apparatus, wherein said toner amount detection output/input contacts are supported on said first supporting frame.

14. A process cartridge according to claim 13, wherein said toner amount detecting means detects the amount of the developer by measuring an electrostatic capacity between said toner amount detecting means and said developing member.

15. A process cartridge according to claim 14, wherein said toner amount detecting means includes a pair of electrodes, and detects the amount of the developer by measuring the electrostatic capacity between the electrodes.

16. A process cartridge according to claim 14, wherein said charging bias contact, said developing bias contact, said cartridge output/input contacts, said toner seal input/output contacts, and said toner amount detection output/input contacts are disposed on a lower surface of said first supporting frame, and wherein the lower surface is a surface facing downward when said process cartridge is mounted to the main assembly of the apparatus.

17. A process cartridge according to claim 16, wherein said charging bias contact, said cartridge output/input contacts, said toner seal input/output contacts and said toner amount detection output/input contacts are arranged substantially on a line.

18. A process cartridge according to claim 17, wherein the line extends in a direction crossing said electrophotographic photosensitive drum.

19. A process cartridge according to claim 1, wherein said developing member is supported on said developing frame, and an end of said developing member is elastically contacted to a developing electrode electrically connected with said developing bias contact.

20. A process cartridge detachably mountable to a main assembly of an electrophotographic image forming apparatus, said process cartridge comprising:
   an electrophotographic photosensitive drum;
   a charging member configured and positioned to electrically charge said electrophotographic photosensitive drum;
   a developing member configured and positioned to develop an electrostatic latent image formed on said electrophotographic photosensitive drum with a developer;
   a drum frame supporting said charging member and said electrophotographic photosensitive drum;
   a developer accommodation frame configured and positioned to accommodate the developer; and
   a supporting frame supporting said drum frame and said developer accommodation frame adjacent one longitudinal end of said electrophotographic photosensitive drum,
   wherein said process cartridge is positioned relative to and supported by the main assembly of the image forming apparatus, by said supporting frame, and
   wherein a charging bias contact configured and positioned to supply a charging bias voltage to said charging member and a developing bias contact configured and positioned to supply a developing bias voltage to said developing member are supported on said supporting frame.

21. A process cartridge according to claim 20, further comprising a developing frame supporting said developing member, wherein said developing frame is supported by said drum frame such that said electrophotographic photosensitive drum and said developing member are substantially parallel with each other, and said developing frame and said developer accommodation frame have respective openings for permitting passage of the developer, and wherein said developing frame and said developer accommodation frame are disposed such that their respective openings are opposed to each other with a gap therebetween.

22. A process cartridge according to claim 21, further comprising process cartridge detecting means for detecting mounting of said process cartridge to the main assembly of the apparatus, and cartridge output/input contacts configured and positioned to output/input voltages between said detecting means and the main assembly of the image forming apparatus, and wherein said cartridge output/input contacts are supported on said supporting frame.

23. A process cartridge according to claim 22, further comprising a toner seal member covering said opening of said developer accommodation frame, toner seal presence or absence detecting means for detecting the presence or absence of said toner seal member, and toner seal input/output contacts configured and positioned to output/input voltages for said toner seal presence or absence detecting means, wherein said toner seal output/input contacts are supported on said supporting frame.

24. A process cartridge according to claim 23, further comprising toner amount detecting means for detecting an amount of the developer in said developer accommodation frame, and toner amount detection output/input contacts configured and positioned to output/input voltages between said toner amount detecting means and the main assembly of the image forming apparatus, wherein said toner amount detection output/input contacts are supported on said supporting frame.

25. A process cartridge according to claim 24, wherein said toner amount detecting means detects the amount of the developer by measuring an electrostatic capacity between said toner amount detecting means and said developing member.

26. A process cartridge according to claim 25, wherein said toner amount detecting means includes a pair of electrodes, and detects the amount of the developer by measuring the electrostatic capacity between the electrodes.

27. A process cartridge according to claim 25, wherein the charging bias contact, the developing bias contact, said cartridge output/input contacts, said toner seal input/output contacts, and said toner amount detection output/input contacts are disposed on a lower surface of said supporting frame, and wherein the lower surface is a surface facing downward when said process cartridge is mounted to the main assembly of the apparatus.

28. A process cartridge according to claim 27, wherein the charging bias contact, said cartridge output/input contacts, said toner seal input/output contacts and said toner amount detection output/input contacts are arranged substantially on a line.

29. A process cartridge according to claim 28, wherein the line extends in a direction crossing said electrophotographic photosensitive drum.

30. A process cartridge according to claim 20, wherein said developing member is supported on a developing frame, and an end of said developing member is elastically contacted to a developing electrode electrically connected with the developing bias contact.

31. An electrophotographic image forming apparatus for forming an image on a recording material, to which a process cartridge is detachably mountable, said apparatus comprising:
   a. mounting means for mounting the process cartridge, the process cartridge including:
   an electrophotographic photosensitive drum;
   a charging member configured and positioned to electrically charge the electrophotographic photosensitive drum;
   a developing member configured and positioned to develop an electrostatic latent image formed on the electrophotographic photosensitive drum with a developer;
   a drum frame supporting the charging member and the electrophotographic photosensitive drum;
   a developer accommodation frame configured to accommodate the developer;
   a developing frame supporting the developing member, the developing frame being movable relative to the drum frame and the developer accommodation frame;
   a first supporting frame supporting the drum frame and the developer accommodation frame adjacent one longitudinal end of the electrophotographic photosensitive drum, wherein the first supporting frame is positioned relative to the main assembly of said apparatus when the process cartridge is mounted to a main assembly of said apparatus;

a second supporting frame supporting the drum frame and the developer accommodation frame adjacent the other longitudinal end of the electrophotographic photosensitive drum;

a developing bias contact, provided on the first supporting frame, configured and positioned to receive a developing bias voltage applied to the developing member from the main assembly of said apparatus when the process cartridge is mounted to the main assembly of said apparatus; and a charging bias contact, provided on the first supporting frame, configured and positioned to receive a charging bias applied to the charging member from the main assembly of said apparatus when the process cartridge is mounted to the main assembly of said apparatus;

b. a main assembly charging bias contact and a main assembly developing bias contact contactable with the charging bias contact and the developing bias contact, respectively, when the process cartridge is mounted to the main assembly of said apparatus;

c. a voltage source electrically connected with said main assembly charging bias contact and said main assembly developing bias contact; and d. feeding means for feeding the recording material.

32. An electrophotographic image forming apparatus for forming an image on a recording material, to which a process cartridge is detachably mountable, said apparatus comprising:

a. mounting means for mounting the process cartridge, the process cartridge including:

an electrophotographic photosensitive drum;

a charging member configured and positioned to electrically charge the electrophotographic photosensitive drum;

a developing member configured and positioned to develop an electrostatic latent image formed on the electrophotographic photosensitive drum with a developer;

a drum frame supporting the charging member and the electrophotographic photosensitive drum;

a developer accommodation frame configured and positioned to accommodate the developer; and a supporting frame supporting the drum frame and the developer accommodation frame adjacent one longitudinal end of the electrophotographic photosensitive drum, wherein the process cartridge is positioned relative to and supported by the main assembly of said image forming apparatus, by the supporting frame, and wherein a charging bias contact configured and positioned to supply a charging bias voltage to the charging member and a developing bias contact configured and positioned to supply a developing bias voltage to the developing member are supported on the supporting frame;

b. a main assembly charging bias contact and a main assembly developing bias contact contactable with the charging bias contact and the developing bias contact, respectively, when the process cartridge is mounted to the main assembly of said apparatus;

c. a voltage source electrically connected with said main assembly charging bias contact and said main assembly developing bias contact; and d. feeding means for feeding the recording material.

33. A connecting method for connecting at least two frames of resin material, comprising:

(a) a temporary connecting step of temporarily connecting a first resin material frame and a second resin material frame;

(b) a step of preparing a fixing jig for fixing the first resin material frame after said temporary connecting step;

(c) a frame positioning step of positioning the frames by engaging portions of the first resin material frame and the second resin material frame with a positioning engaging portion of the fixing jig; and (d) a resin material injection step of injecting a molten resin material into a location between opposing surfaces of the first resin material frame and the second resin material frame positioned by said frame positioning step to connect the first resin material frame with the second resin material frame;

wherein an electrical contact part, disposed between the opposing surfaces of the first resin material frame and the second resin material frame, is fixed by the molten resin material.

34. A method according to claim 33, wherein the electrical contact part is substantially in close contact with a wall surface of a flow passage for the molten resin material constituted by the opposing surfaces of the first resin material frame and the second resin material frame.

* * * * *

UNITED STATES PATENT AND TRADEMARK OFFICE
CERTIFICATE OF CORRECTION

PATENT NO. : 6,934,485 B2
DATED : August 23, 2005
INVENTOR(S) : Shigeo Miyabe et al.

It is certified that error appears in the above-identified patent and that said Letters Patent is hereby corrected as shown below:

Title page,
Item [56], References Cited, U.S. PATENT DOCUMENTS, "6,226,476 B1 1/2001 Nagashima et al." should read -- 6,226,476 B1 5/2001 Miyabe et al. --.

Column 5,
Line 53, "functions" should read -- function --.
Line 57, "and, 13a" should read -- and 13a --.

Column 6,
Line 39, "too" should read -- too, --.
Line 64, "an" should read -- a --.

Column 7,
Lines 16, 19 and 24, "guide 131." should read -- guide 13$l$. --.
Line 46, "a" should read -- an --.

Column 8,
Line 7, "flange)" should read -- flange --.

Column 9,
Line 21, "an" should read -- a --.

Column 13,
Line 20, "D cut" should read -- D-cut --.

Column 15,
Line 20, "regulated" should be deleted.
Line 44, "said" should be deleted.

Column 17,
Line 34, "FIG. 4" should read -- FIG. 14 --.

Column 19,
Line 5, "The," should read -- The --.
Line 64, "portion 131" should read -- portion 13$l$ --.

Column 20,
Line 66, "FIGS. 15. the" should read -- FIG. 15. The --.

UNITED STATES PATENT AND TRADEMARK OFFICE
CERTIFICATE OF CORRECTION

PATENT NO. : 6,934,485 B2
DATED : August 23, 2005
INVENTOR(S) : Shigeo Miyabe et al.

It is certified that error appears in the above-identified patent and that said Letters Patent is hereby corrected as shown below:

Column 21,
Line 34, "contacts 7a," should read -- contacts 79a, --.
Line 39, "of" should read -- of the --.
Line 40, "the presence-absence" should read -- presence-absence --.
Line 43, "electrode 82 are" should read -- electrode 82 is --.
Lines 45 and 51, "electrodes 82" should read -- electrode 82 --.

Column 22,
Line 22, "connected" should read -- connected to --.
Lines 28, 35 and 41, "portion 201" should read -- portion 20*l* --.
Line 34, "201" should read -- portion 20*l* --.

Column 24,
Line 21, "users" should read -- user's --.
Line 43, "and, 20g" should read -- and 20g --.

Column 26,
Line 15, "moves" should be deleted.

Column 27,
Line 25, "Cconnection" should read -- Connection --.

Column 28,
Line 42, "to" should be deleted.

Column 29,
Line 66, "3. since should read -- 3. Since --.

Column 31,
Line 3, "20i, 20h 20i" should read -- 20i; 20h, 20i --.

Column 33,
Line 7, "recess 19h" should read -- 19i --.

Column 35,
Line 44, "Xi" should be deleted.
Line 63, "fame 16" should read -- frame 16 --.

Column 36,
Line 32, "is, a" should read -- is a --.

UNITED STATES PATENT AND TRADEMARK OFFICE
CERTIFICATE OF CORRECTION

PATENT NO. : 6,934,485 B2
DATED : August 23, 2005
INVENTOR(S) : Shigeo Miyabe et al.

It is certified that error appears in the above-identified patent and that said Letters Patent is hereby corrected as shown below:

Column 37,
Line 44, "back-uprib" should read -- back up rib --.

Signed and Sealed this

Fourth Day of April, 2006

JON W. DUDAS
*Director of the United States Patent and Trademark Office*